US011463860B2

(12) United States Patent
Maier et al.

(10) Patent No.: US 11,463,860 B2
(45) Date of Patent: *Oct. 4, 2022

(54) METHOD AND SYSTEM FOR AN EMERGENCY LOCATION INFORMATION SERVICE (E-LIS) FOR PROXY NETWORK DEVICES

(71) Applicant: Everbridge, Inc., Burlington, MA (US)

(72) Inventors: Nicholas M. Maier, Gardnerville, NV (US); Gerald R. Eisner, Pickerington, OH (US)

(73) Assignee: Everbridge, Inc., Burlington, MA (US)

( * ) Notice: Subject to any disclaimer, the term of this patent is extended or adjusted under 35 U.S.C. 154(b) by 4 days.

This patent is subject to a terminal disclaimer.

(21) Appl. No.: 17/106,634

(22) Filed: Nov. 30, 2020

(65) Prior Publication Data

US 2021/0084480 A1 Mar. 18, 2021

Related U.S. Application Data

(63) Continuation-in-part of application No. 16/715,607, filed on Dec. 16, 2019, now Pat. No. 10,856,127, which is a continuation-in-part of application No. 15/491,608, filed on Apr. 19, 2017, now Pat. No. 10,511,950, which is a continuation-in-part of application No. 14/806,008, filed on Jul. 22, 2015, now Pat. No. 9,635,534, and a continuation-in-part of application No. 14/579,760, filed on Dec. 22, 2014, now Pat. No. 9,094,816, which is a
(Continued)

(51) Int. Cl.
*H04W 4/90* (2018.01)
*H04W 4/029* (2018.01)

(52) U.S. Cl.
CPC .............. *H04W 4/90* (2018.02); *H04W 4/029* (2018.02)

(58) Field of Classification Search
CPC ....... H04W 4/90; H04W 76/50; H04W 4/029; H04W 4/30; H04W 4/38; H04W 88/06; H04M 1/72538; H04M 1/72541; H04M 2250/12; H04M 2250/52; B63B 45/00; B63C 9/00; G08B 21/182; G08B 25/002; G08B 25/10
USPC ................... 455/404.2, 404.1, 456.3; 379/45
See application file for complete search history.

(56) References Cited

U.S. PATENT DOCUMENTS 6,019,184 A 2/2000 Nagai
6,363,138 B1 3/2002 Aprile
(Continued)

OTHER PUBLICATIONS

US FFC document, "*Consumer Guide: What you need to know about text-to-911*," http://transition.fcc.gov/cgb/consumerfacts/text-to-911-consumer-guide.pdf.
(Continued)

*Primary Examiner* — Margaret G Mastrodonato
(74) *Attorney, Agent, or Firm* — Downs Rachlin Martin PLLC

(57) ABSTRACT

An emergency location information service (E-LIS) for network devices connected to proxy network devices. The proxy network devices are both analog and digital network devices. The proxy network devices send unique identification information for the network device connected to it and request either a location-by-reference (indirect location information) component or location-by-reference (direct location information) component to identify the network device for when an emergency event occurs.

21 Claims, 41 Drawing Sheets

Related U.S. Application Data continuation-in-part of application No. 14/303,842, filed on Jun. 13, 2014, now Pat. No. 8,918,075, which is a continuation-in-part of application No. 13/831,426, filed on Mar. 14, 2013, now Pat. No. 8,755,767, which is a continuation-in-part of application No. 13/098,981, filed on May 2, 2011, now Pat. No. 8,442,482, which is a continuation-in-part of application No. 11/803,671, filed on May 15, 2007, now Pat. No. 7,937,067, said application No. 13/831,426 is a continuation-in-part of application No. 12/844,972, filed on Jul. 28, 2010, now Pat. No. 8,442,481.

(60) Provisional application No. 60/800,774, filed on May 16, 2006, provisional application No. 60/800,775, filed on May 16, 2006, provisional application No. 60/800,776, filed on May 16, 2006, provisional application No. 60/800,777, filed on May 16, 2006, provisional application No. 61/229,414, filed on Jul. 29, 2009, provisional application No. 61/230,154, filed on Jul. 31, 2009.

(56) References Cited

U.S. PATENT DOCUMENTS

| | | |
|---|---|---|
| 6,411,700 B1 | 6/2002 | Rojas |
| 6,424,840 B1 | 7/2002 | Fitch et al. |
| 6,445,786 B2 | 9/2002 | Rojas |
| 6,473,504 B2 | 10/2002 | Rojas |
| 6,504,924 B2 | 1/2003 | Rojas |
| 6,625,272 B2 | 9/2003 | Rojas |
| 6,665,611 B1 | 12/2003 | Oran et al. |
| 6,687,495 B2 | 2/2004 | Bhatia et al. |
| 6,927,727 B2 | 8/2005 | Cleghorn |
| 6,940,950 B2 | 9/2005 | Dickinson et al. |
| 6,952,182 B2 | 10/2005 | Spilker, Jr. et al. |
| 6,983,313 B1 | 1/2006 | Korkea-Aho |
| 7,042,396 B2 | 5/2006 | Omura et al. |
| 7,098,787 B2 | 8/2006 | Miller |
| 7,110,746 B2 | 9/2006 | Herzog et al. |
| 7,113,794 B2 | 9/2006 | Annamalai |
| 7,126,536 B2 | 10/2006 | Rabinowitz et al. |
| 7,130,385 B1 | 10/2006 | Moon |
| 7,177,399 B2 | 2/2007 | Dawson et al. |
| 7,218,938 B1 | 5/2007 | Lau et al. |
| 7,251,312 B2 | 7/2007 | D'Evelyn et al. |
| 7,260,186 B2 | 8/2007 | Zhu et al. |
| 7,272,386 B2 | 9/2007 | Meer |
| 7,330,464 B2 | 2/2008 | Brouwer et al. |
| 7,372,405 B2 | 5/2008 | Rabinowitz et al. |
| 7,397,424 B2 | 7/2008 | Houri |
| 7,411,940 B2 | 8/2008 | Gass |
| 7,471,244 B2 | 12/2008 | Omura et al. |
| 7,639,792 B2 | 12/2009 | Qui et al. |
| 7,796,998 B1 | 9/2010 | Zellner et al. |
| 7,937,067 B2 | 5/2011 | Maier et al. |
| 8,442,481 B2 | 5/2013 | Maier et al. |
| 8,442,482 B2 | 5/2013 | Maier et al. |
| 8,463,765 B2 | 6/2013 | Lesavich |
| 8,755,767 B2 | 6/2014 | Maier et al. |
| 8,918,075 B2 | 12/2014 | Maier et al. |
| 9,037,564 B2 | 5/2015 | Lesavich et al. |
| 9,094,816 B2 | 7/2015 | Maier et al. |
| 9,137,250 B2 | 9/2015 | Lesavich et al. |
| 9,361,479 B2 | 6/2016 | Lesavich et al. |
| 9,569,771 B2 | 2/2017 | Lesavich et al. |
| 9,635,934 B1 | 4/2017 | Maier et al. |
| 10,511,590 B1 | 12/2019 | Maier et al. |
| 10,588,004 B2 | 3/2020 | Eisner |
| 10,856,127 B2 | 12/2020 | Maier et al. |
| 2002/0012423 A1 | 1/2002 | Rojas |
| 2002/0012427 A1 | 1/2002 | Rojas |
| 2002/0054669 A1 | 5/2002 | Rojas |
| 2002/0080945 A1 | 6/2002 | Rojas |
| 2002/0144294 A1 | 10/2002 | Rabinowitz et al. |
| 2003/0156063 A1 | 8/2003 | Spilker et al. |
| 2005/0090225 A1 | 4/2005 | Muehleisen et al. |
| 2005/0105496 A1 | 5/2005 | Ambrosino |
| 2005/0169248 A1 | 8/2005 | Truesdale et al. |
| 2006/0179463 A1 | 8/2006 | Chisholm et al. |
| 2007/0013516 A1 | 1/2007 | Freitag et al. |
| 2008/0076392 A1 | 3/2008 | Khetawat et al. |
| 2008/0076393 A1 | 3/2008 | Khetawat et al. |
| 2008/0076411 A1 | 3/2008 | Khetawat et al. |
| 2008/0076412 A1 | 3/2008 | Khetawat et al. |
| 2008/0076419 A1 | 3/2008 | Khetawat et al. |
| 2008/0076420 A1 | 3/2008 | Khetawat et al. |
| 2008/0076425 A1 | 3/2008 | Khetawat et al. |
| 2008/0089316 A1 | 4/2008 | Reams |
| 2008/0176582 A1 | 7/2008 | Ghai et al. |
| 2008/0186955 A1 | 8/2008 | Puckett |
| 2008/0200143 A1 | 8/2008 | Qiu et al. |
| 2008/0253535 A1 | 10/2008 | Sherry et al. |
| 2008/0259908 A1 | 10/2008 | Hines et al. |
| 2008/0261596 A1 | 10/2008 | Khetawat et al. |
| 2008/0261619 A1 | 10/2008 | Hines et al. |
| 2008/0267172 A1 | 10/2008 | Hines et al. |
| 2008/0305792 A1 | 12/2008 | Khetawat et al. |
| 2009/0003312 A1 | 1/2009 | Velazquez et al. |
| 2009/0094235 A1 | 4/2009 | White et al. |
| 2010/0297981 A1 | 11/2010 | Ballantyne et al. |
| 2010/0311385 A1 | 12/2010 | Hurwitz |
| 2010/0317317 A1 | 12/2010 | Maier et al. |
| 2011/0009086 A1 | 1/2011 | Poremba |
| 2011/0207429 A1 | 8/2011 | Maier et al. |
| 2011/0208710 A1 | 8/2011 | Lesavich |
| 2012/0225635 A1 | 9/2012 | Esbensen |
| 2012/0278622 A1 | 11/2012 | Lesavich et al. |
| 2013/0203376 A1 | 8/2013 | Maier et al. |
| 2014/0189752 A1 | 7/2014 | Leavich et al. |
| 2014/0295786 A1 | 10/2014 | Maier et al. |
| 2015/0334545 A1 | 11/2015 | Maier et al. |
| 2015/0351695 A1 | 12/2015 | Cronin |
| 2015/0379301 A1 | 12/2015 | Lesavich et al. |
| 2016/0321654 A1 | 11/2016 | Lesavich et al. |
| 2017/0238129 A1 | 8/2017 | Maier et al. |
| 2018/0206100 A1 | 7/2018 | Eisner et al. |
| 2020/0128383 A1 | 4/2020 | Maier et al. |
| 2020/0187150 A1 | 6/2020 | Eisner |
| 2020/0351623 A1 | 11/2020 | Eisner |

OTHER PUBLICATIONS

US FCC document, "*What you need to know about text-to-911,*" http://www.fcc.gov/text-to-911.

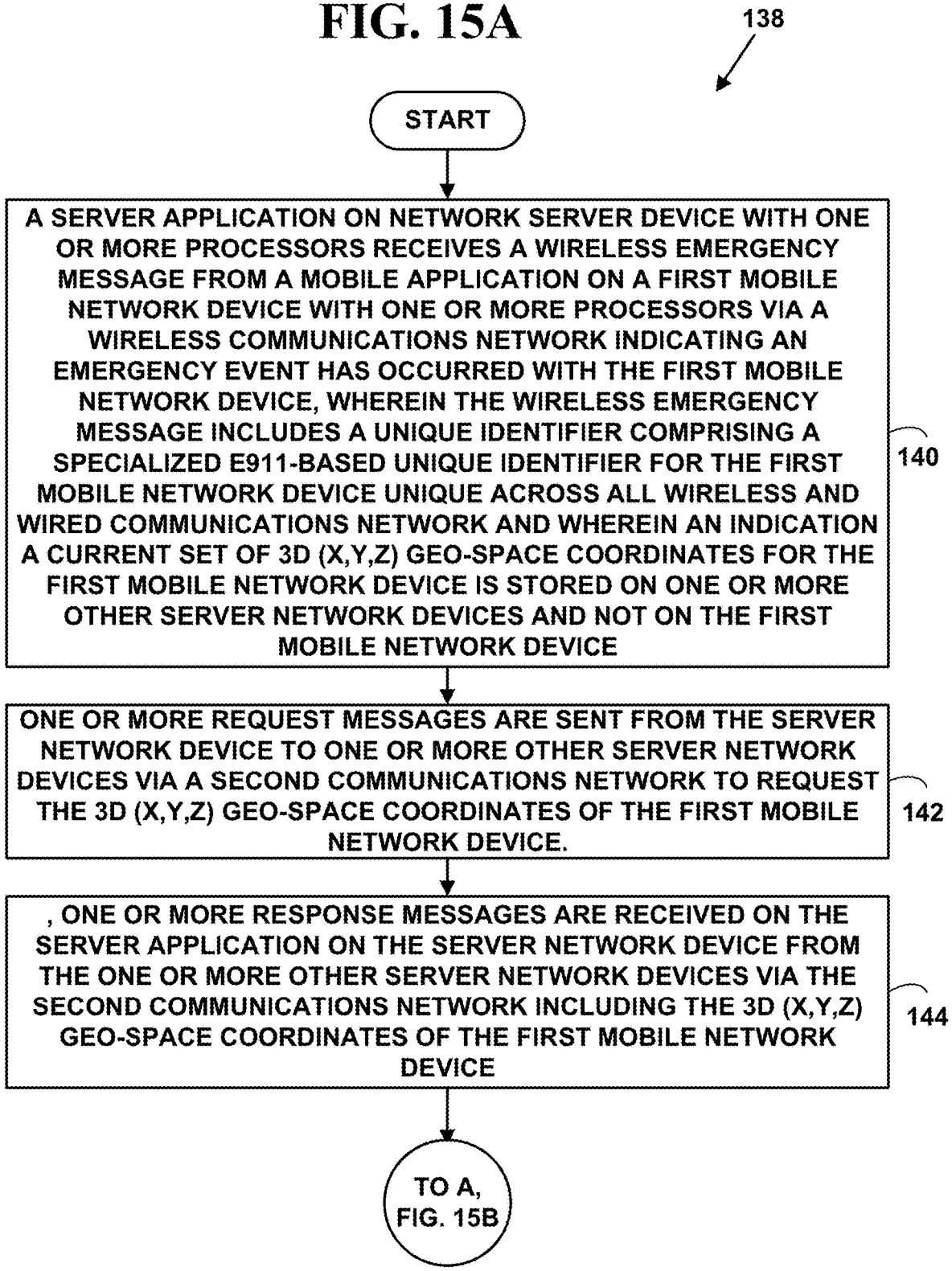

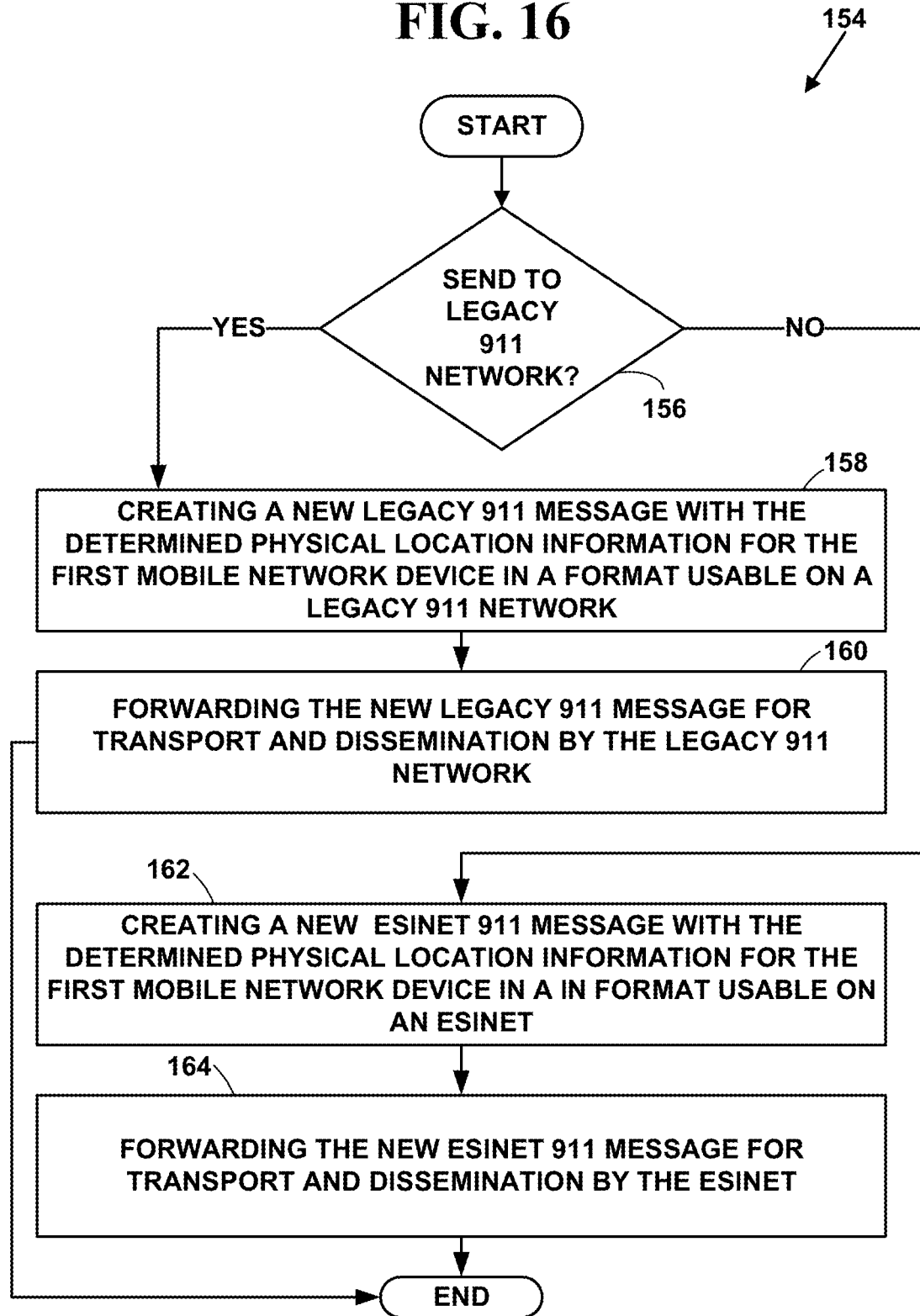

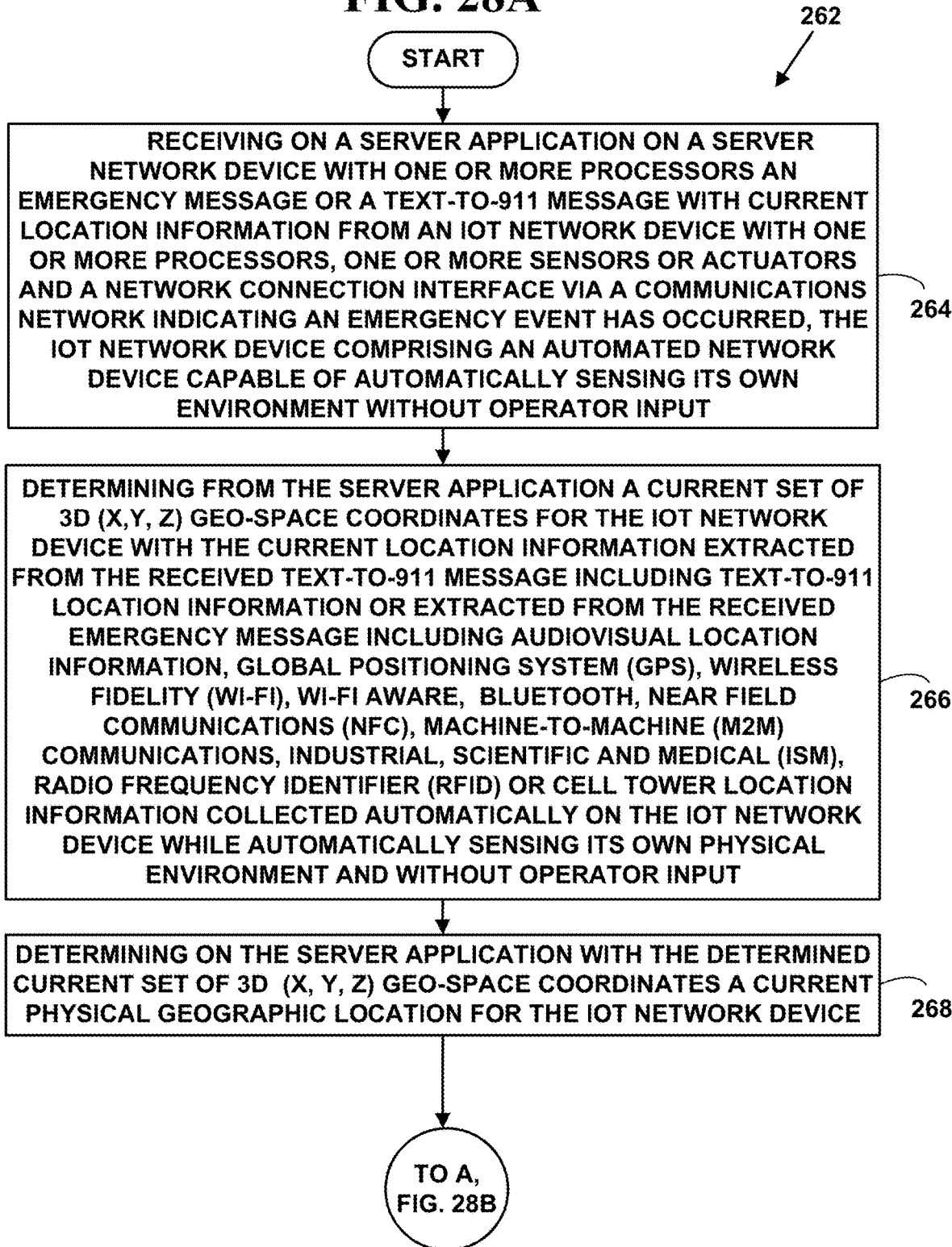

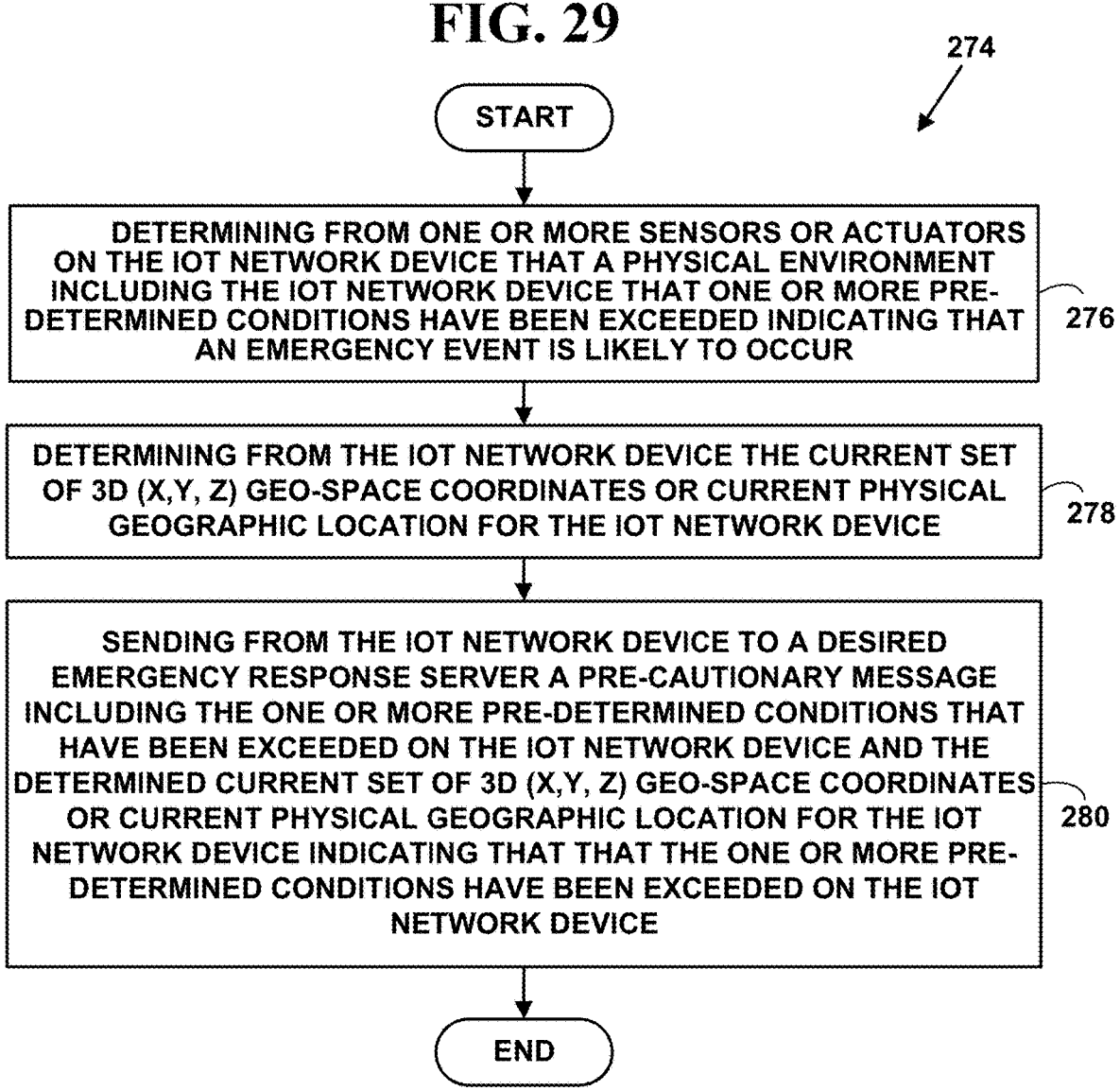

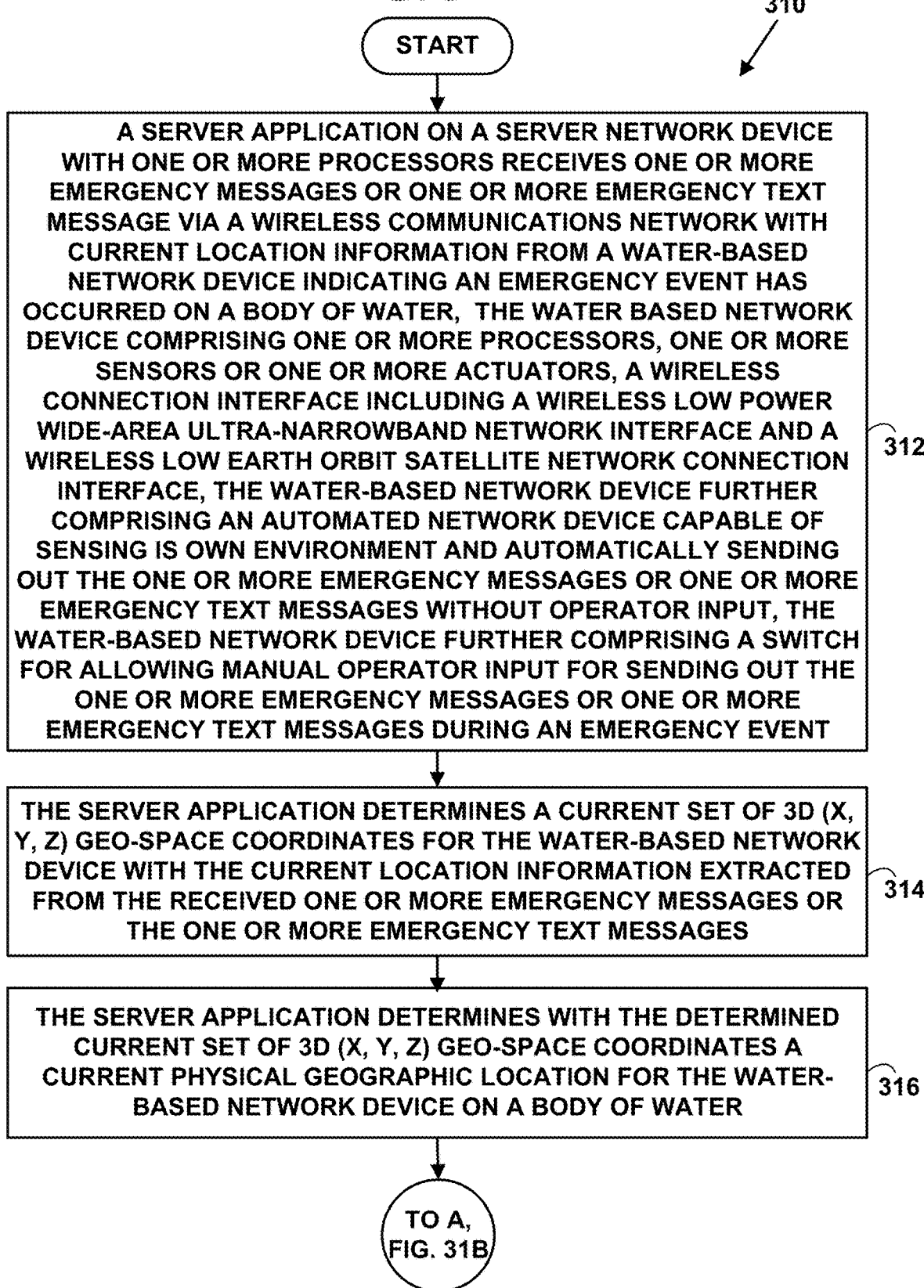

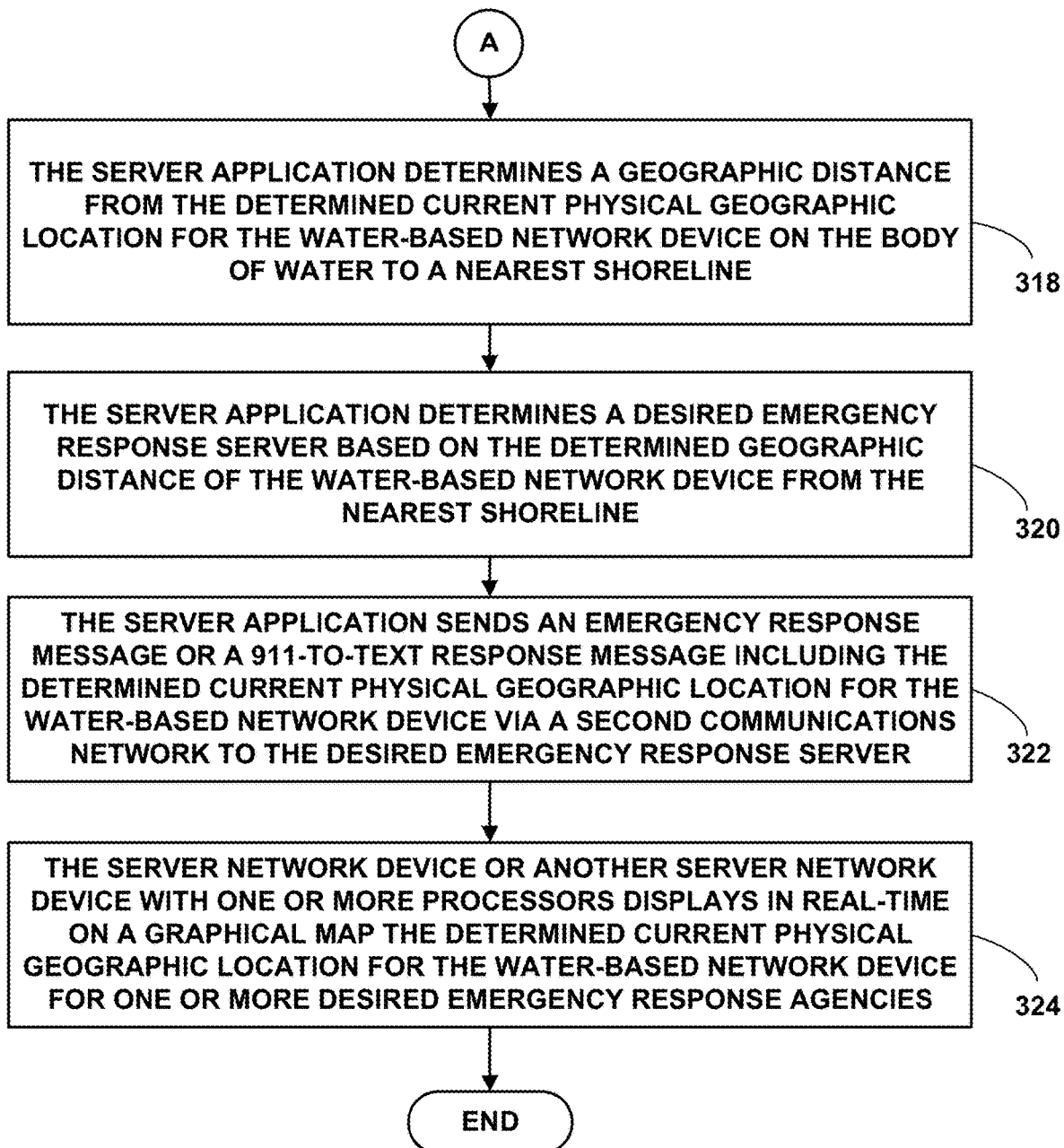

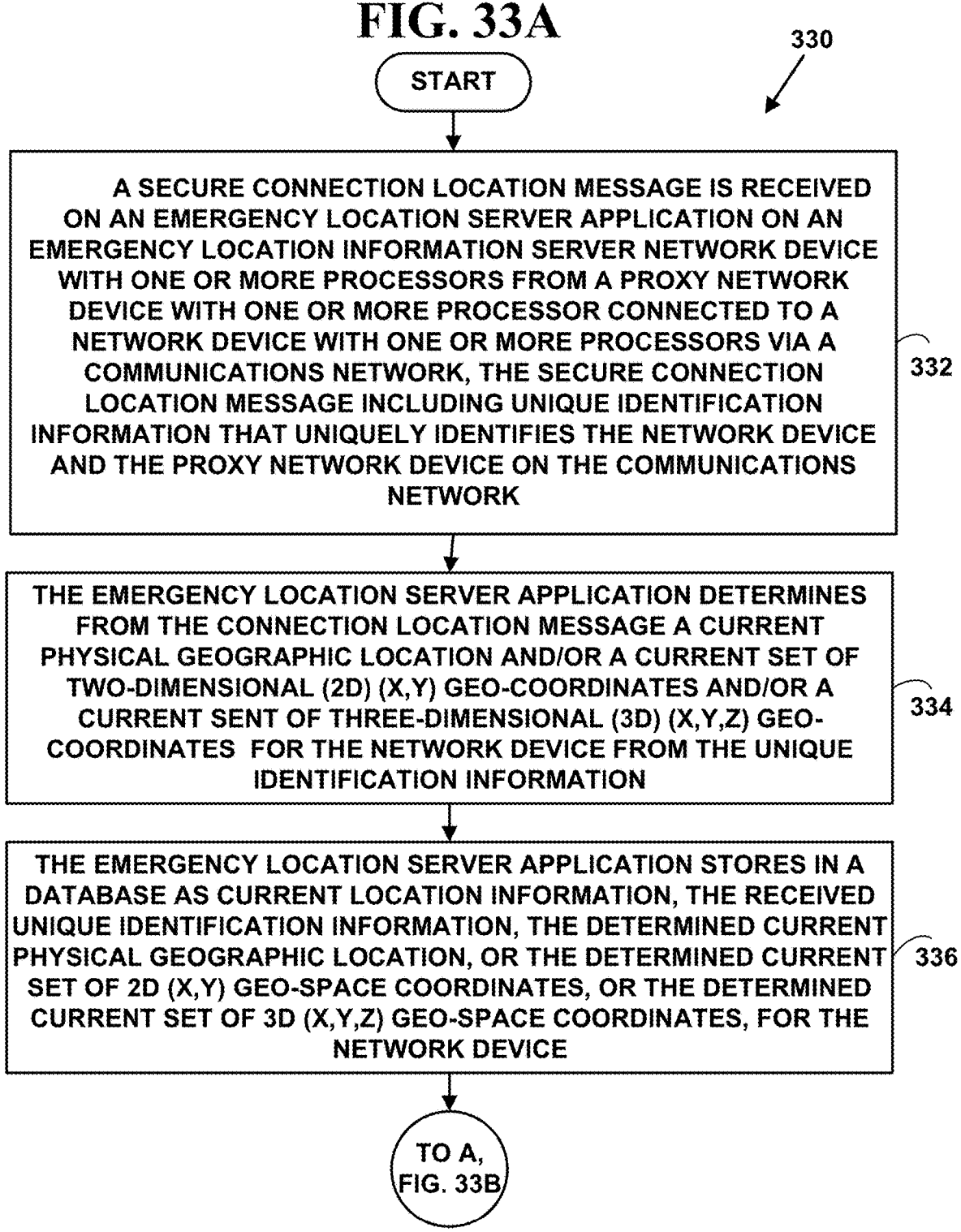

FIG. 33B

| |
|---|
| THE EMERGENCY LOCATION SERVER APPLICATION SECURELY SENDS A CONNECTION RESPONSE MESSAGE FROM ON THE SERVER NETWORK DEVICE TO THE PROXY NETWORK DEVICE VIA THE COMMUNICATIONS NETWORK, THE SECURE CONNECTION RESPONSE MESSAGE INCLUDING A PRE-DETERMINED EMERGENCY LOCATION INDICATOR THE PROXY NETWORK DEVICE WILL USE IF THE NETWORK DEVICE SENDS AN EMERGENCY MESSAGE INDICATING THAT AN EMERGENCY EVENT HAS OCCURRED, WHEREIN THE PRE-DETERMINED EMERGENCY LOCATION INDICATOR INCLUDES LOCATION-BY-REFERENCE EMERGENCY LOCATION INFORMATION OR LOCATION-BY-VALUE EMERGENCY LOCATION INFORMATION, WHEREIN THE LOCATION-BY-REFERENCE EMERGENCY LOCATION INFORMATION INCLUDES A DATABASE KEY INTO THE DATABASE TO ACCESS THE STORED LOCATION INFORMATION FOR THE NETWORK DEVICE, AND WHEREIN THE LOCATION-BY-VALUE EMERGENCY LOCATION INFORMATION INCLUDES A LOCATION COMPONENT INCLUDING ADDITONAL LOCATION INFORMATION FOR THE NETWORK DEVICE, THE DETERMINED CURRENT PHYSICAL GEOGRAPHIC LOCATION, OR THE DETERMINED SET OF 2D (X,Y) GEO-SPACE, OR THE DETERMINED SET OF 3D (X,Y,Z) GEO-SPACE COORDINATES, FOR THE NETWORK DEVICE | 338

| |
|---|
| AN EMERGENCY MESSAGE IS SECURELY RECEIVED ON THE EMERGENCY LOCATION APPLICATION ON THE EMERGENCY LOCATION INFORMATION SERVER NETWORK DEVICE FROM THE PROXY NETWORK DEVICE VIA THE COMMUNICATIONS NETWORK, THE EMERGENCY MESSAGE INCLUDING THE UNIQUE IDENTIFICATION INFORMATION AND PRE-DETERMINED EMERGENCY LOCATION INDICATOR SENT TO THE PROXY NETWORK DEVICE IN A GEO-LOCATION HEADER INCLUDED WITH THE CONNECTION RESPONSE MESSAGE | 340

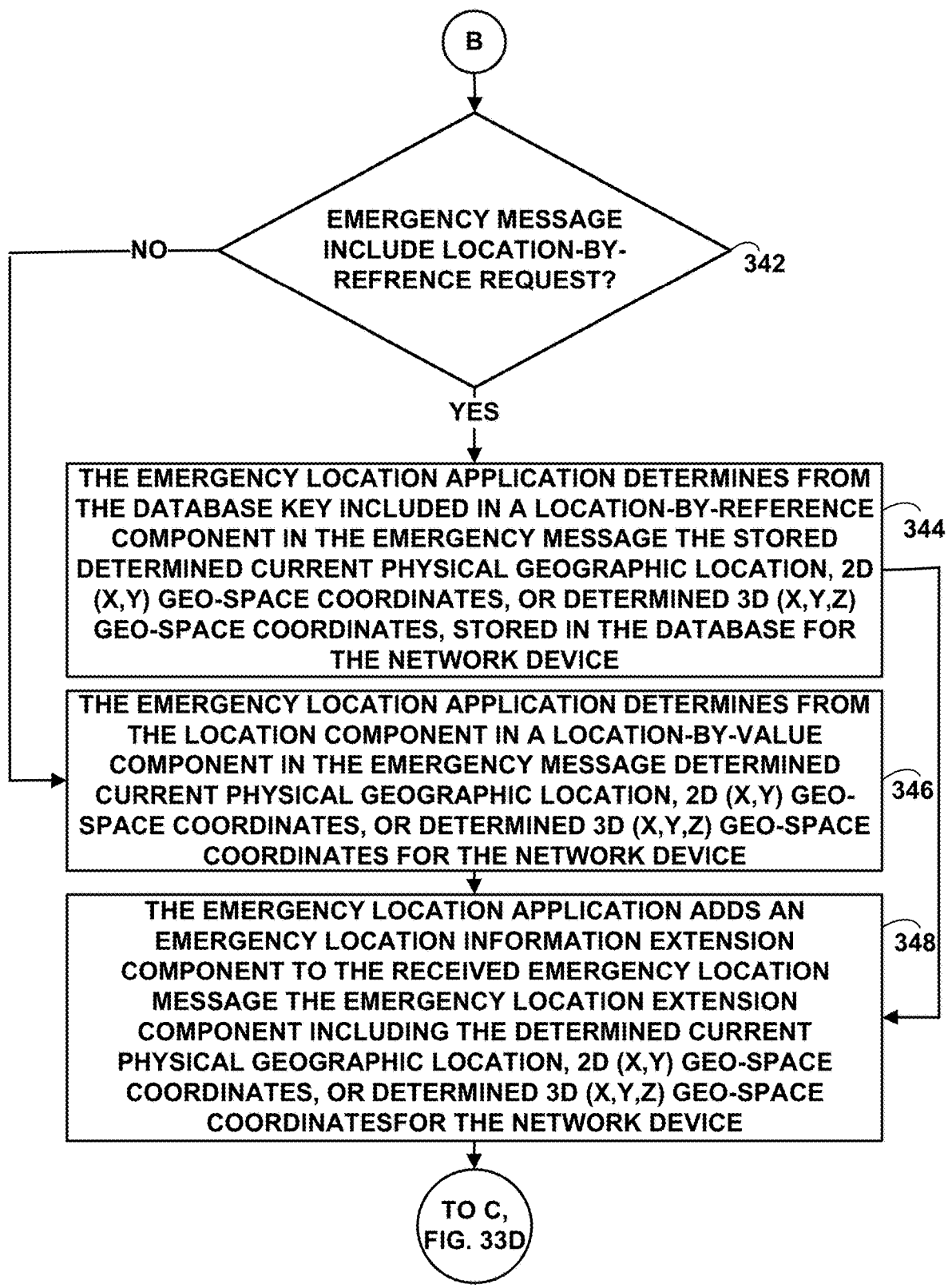

FIG. 33D (C)

350 — THE RECEIVED EMERGENCY MESSAGE EMERGENCY WITH THE LOCATION INFORMATION EXTENSION COMPONENT IS SENT IN REAL-TIME FROM THE EMERGENCY LOCATION APPLICATION ON THE EMERGENCY LOCATION INFORMATION SERVER NETWORK DEVICE TO ONE OR MORE DETERMINED EMERGENCY RESPONSE SERVER NETWORK DEVICES WITH ONE OR MORE PROCESSORS VIA THE COMMUNICATIONS NETWORK INDICATING THAT AN EMERGENCY EVENT HAS OCCURRED WITH THE NETWORK DEVICE

352 — THE EMERGENCY LOCATION APPLICATION DISPLAYS IN REAL-TIME ON THE ONE OR MORE DETERMINED EMERGENCY RESPONSE SERVER NETWORK DEVICES OR ANOTHER SERVER NETWORK DEVICE WITH ONE OR MORE PROCESSORS ON A GRAPHICAL MAP THE DETERMINED CURRENT PHYSICAL GEOGRAPHIC LOCATION FOR NETWORK DEVICE FOR ONE OR MORE DESIRED EMERGENCY RESPONSE AGENCIES

END

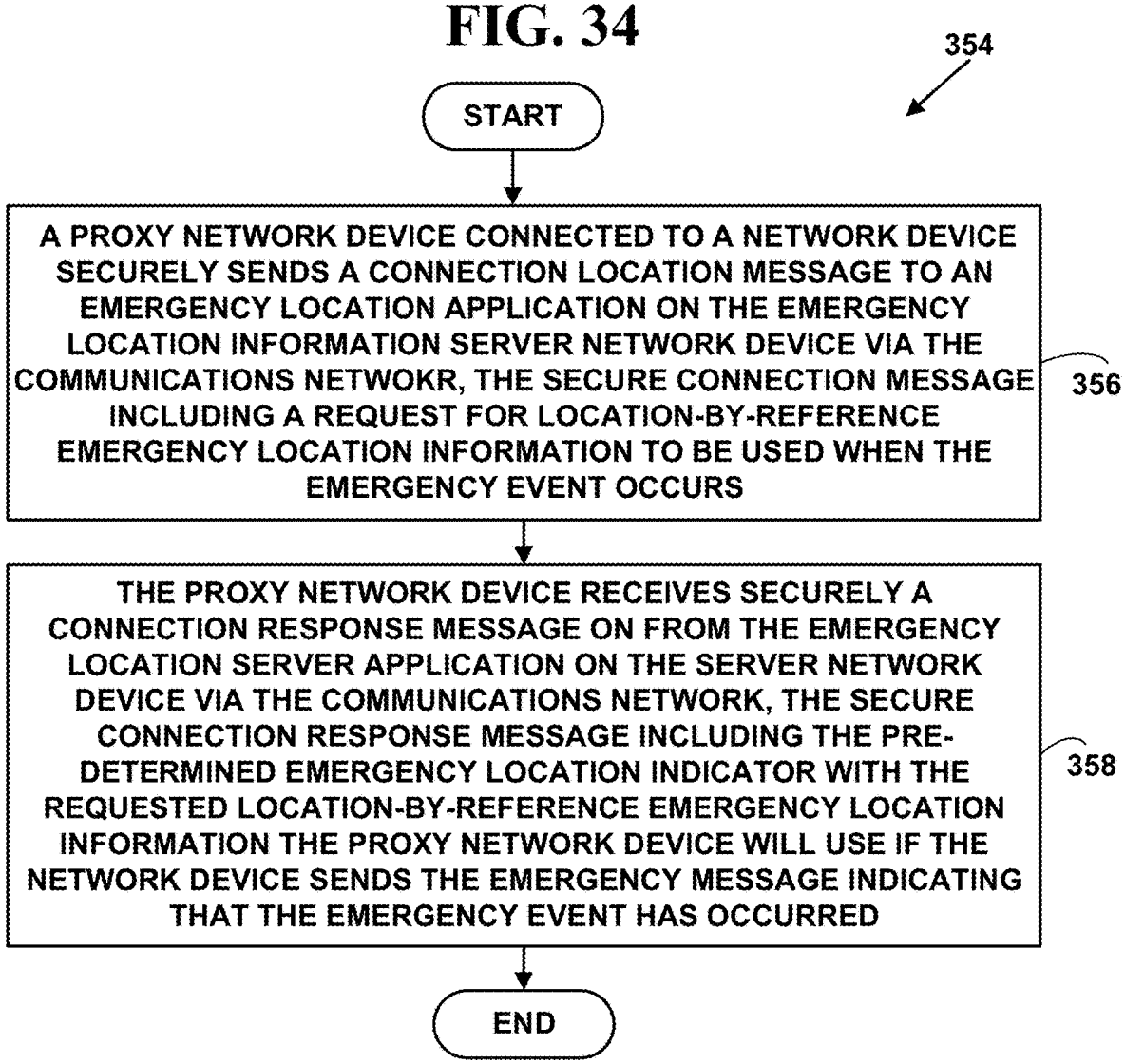

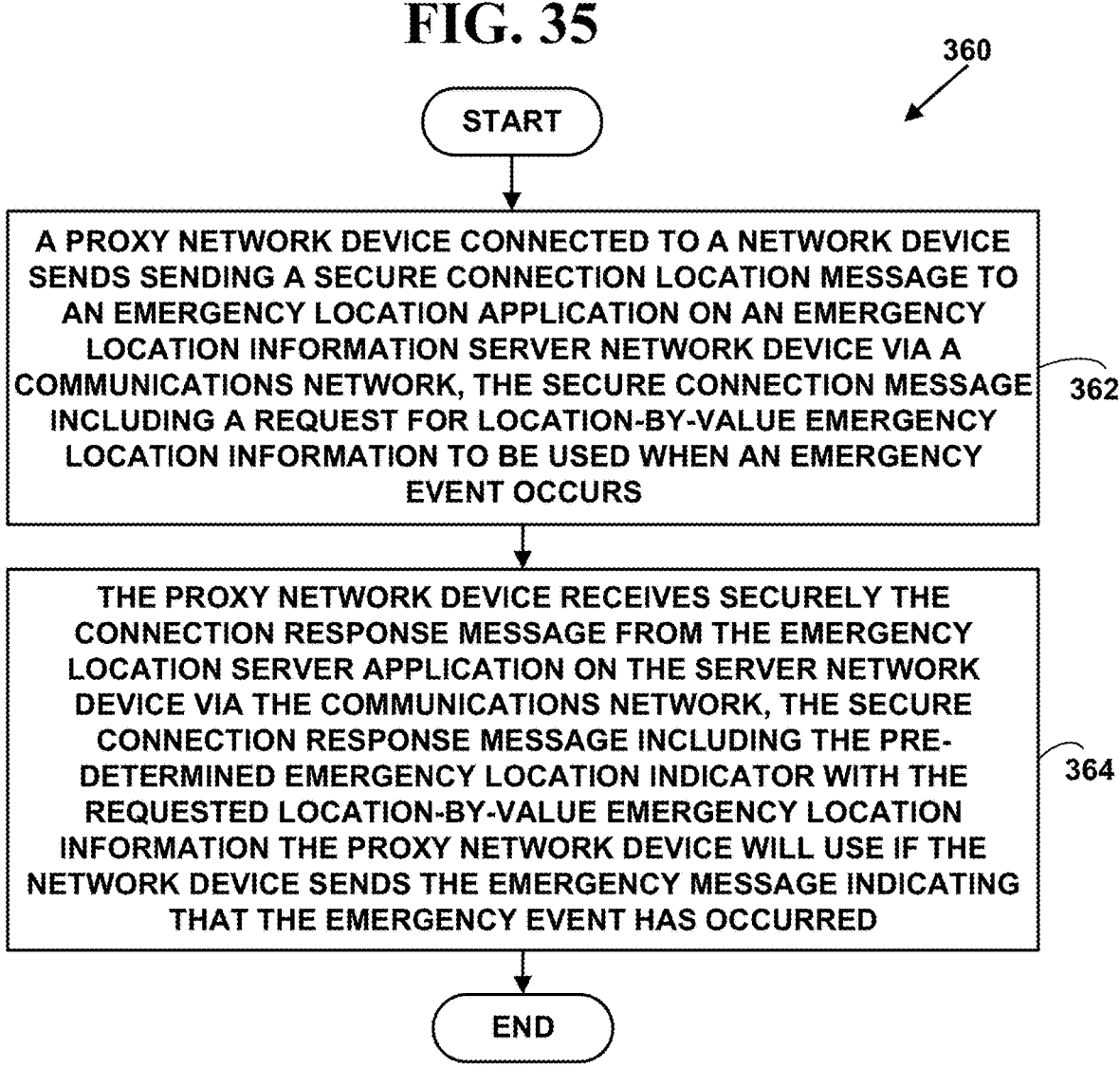

METHOD AND SYSTEM FOR AN EMERGENCY LOCATION INFORMATION SERVICE (E-LIS) FOR PROXY NETWORK DEVICES

CROSS REFERENCES TO RELATED APPLICATIONS

This U.S. utility patent application is a Continuation-In-Part (CIP) of U.S. utility patent application Ser. No. 16/715,607, filed Dec. 16, 2019, which issued as U.S. Pat. No. 10,856,127, on Dec. 1, 2020, which is a CIP of U.S. utility patent application Ser. No. 15/491,608, filed on Apr. 19, 2017, that issued as U.S. Pat. No. 10,511,950, on Dec. 17, 2019, which is a CIP of U.S. utility patent application Ser. No. 14/806,068 filed on Jul. 22, 2015, that issued into U.S. Pat. No. 9,935,534, on Apr. 25, 2017, which is a CIP of U.S. utility patent application Ser. No. 14/579,760, filed on Dec. 22, 2014, that issued as U.S. Pat. No. 9,094,816, on Jul. 28, 2015, which is a CIP of U.S. patent application Ser. No. 14/303,842, filed on Jun. 13, 2014, that issued as U.S. Pat. No. 8,918,075, on Dec. 23, 2014, which is a CIP of U.S. utility patent application Ser. No. 13/831,426, filed Mar. 14, 2013, which issued as U.S. Pat. No. 8,755,767, on Jun. 17, 2014, which is a CIP of U.S. utility patent application Ser. No. 13/098,981, filed May 2, 2011, which issued and U.S. Pat. No. 8,442,482 on May 14, 2013, which is a CIP of U.S. utility patent application Ser. No. 11/803,671, filed May 15, 2007, which issued as U.S. Pat. No. 7,937,067, on May 3, 2011, which is an application that claims priority to U.S. Provisional patent application Nos. 60/800,774, 60/800,775, 60/800,776, and 60/800,777, all filed May 16, 2006, U.S. utility patent application Ser. No. 13/831,426, is also a CIP of U.S. utility application Ser. No. 12/844,972 filed Jul. 28, 2010, which is an application claiming priority to U.S. Provisional patent application No. 61/229,414 filed Jul. 29, 2009 and 61/230,154 filed Jul. 31, 2009, the contents of all of these cited applications and issued patents are incorporated herein by reference.

FIELD OF INVENTION

This application relates to automatic processing of location information. More specifically, it relates to a method and system for an emergency location information service for proxy network devices such as analog terminal adapters, wireless base stations and other proxy network devices.

BACKGROUND OF THE INVENTION

In many emergency situations it is of great importance to be able to quickly and accurately locate individuals. For example, in the event of a vehicular accident, public safety personnel may need to operate within an unfamiliar wooded area on short notice, in conditions of poor visibility due to smoke, flame or darkness, in a body of water, or a device using a proxy device to communicate. Accurate location information is vital to coordinate rescue operations and ensure the safety of rescue personnel. Police or military personnel may be faced with similar circumstances, in which accurate and timely location information can help avoid friendly-fire incidents and coordinate action against a criminal or enemy force.

Individuals faced with an emergency involving immediate danger to life or health of themselves or a colleague need to be able to accurately provide their location to emergency/rescue personnel, preferably without human intervention to enable rescue in the case where the individual in need is incapacitated, or all attention must be devoted to his/her protection. In all these circumstances, rapid and automated acquisition of the location of an individual to within a few meters can be critical in saving lives.

In addition, there are times when an individual or an object is in a rural area, in a body of water or behind a proxy device needs to be located in an emergency. A mobile device an individual may be carrying may not be able to communicate because of poor signal strength to the mobile device in the rural area, in a body of water or behind a proxy device.

Prior art methods of accomplishing such location do not simultaneously meet the requirements of rapid location determination, automation, and accuracy. Navigation employing conventional maps and visual observation or dead reckoning are not readily automated and thus require time and attention by a human observer. Manual navigation may be vitiated in the case where visibility is impacted by flame or smoke, or where personnel are under hostile fire and unable to establish their location by patient observation.

Enhanced 911, (E911) is a location technology that enables mobile, or cellular phones and other mobile device such personal digital/data assistants (PDAs) to process 911 emergency calls and enable emergency services to locate a physical geographic position of the device and thus the caller. When a person makes a 911 call using a traditional phone with wires, the call is routed to the appropriate public safety answering point (PSAP) that then distributes the emergency call to the proper emergency services. The PSAP receives the caller's phone number and the exact location of the phone from which the call was made. Prior to 1996, 911 callers using a mobile phone would have to access their service providers in order to get verification of subscription service before the call was routed to a PSAP. In 1996 the Federal Communications Commission (FCC) ruled that a 911 call must go directly to the PSAP without receiving verification of service from a specific cellular service provider. The call must be handled by any available service carrier even if it is not the cellular phone customer's specific carrier.

The FCC has rolled out E911 in two phases. In 1998, Phase I required that mobile phone carriers identify the originating call's phone number and the location of the signal tower, or cell. In 2001, Phase II required that each mobile phone company doing business in the United States must offer either handset- or network-based location detection capability so that the caller's location is determined by the geographic location of the cellular phone within 100 meter accuracy and not the location of the tower that is transmitting its signal. The FCC refers to this as Automatic Location Identification (ALI).

In addition to traditional cellular telephones, advances in technology have expanded the number and types of devices that are capable of initiating an emergency call for service that is routed to the appropriate PSAP based on the caller's location. Devices include, but are not limited to: computer programs that are executed on computing devices (Soft Phone), cellular telephones that are capable of data communications, wearable embedded devices, devices embedded into home appliances, intelligent building control and monitoring systems, and intelligent roadways. The concept of an "Internet of Things" will allow any connected device to initiate communications with another device, service, or person, including a system within a PSAP.

The Internet of things (IoT) is an inter-networking of physical devices, appliances, controllers buildings, and other items embedded with electronics, software, sensors, actuators, and network connectivity that enable these objects to collect and exchange data and interact with a communications network like the Internet, etc.

In 2013, the Global Standards Initiative on Internet of Things (IoT-GSI) defined the IoT as "an infrastructure of an information society." The IoT allows objects to be sensed or controlled remotely across existing network infrastructure, creating opportunities for more direct integration of the physical world into computer-based systems, and resulting in improved efficiency, accuracy and economic benefit in addition to reduced human intervention.

Each IoT "thing" is uniquely identifiable through its embedded computing system but is able to interoperate within the existing Internet infrastructure. Experts estimate that the IoT will comprise almost 50 billion devices by 2020.

There are many problems associated with determining a location of a network device and a caller who needs to place an E911 call or a person who sends a text to E911 in an emergency situation.

One problem is the network device and caller may be located in a remote area, rural area in in the event of a natural disaster or terrorist attack when a local infrastructure may be compromised or an adequate communication signal not available to send an emergency message.

Another problem is that many E911 calls a misrouted to the wrong PSAP. This can delay the dispatch of emergencies services to the caller. Another problem is that existing mobile technology makes it difficult to accurately locate mobile devices.

Another problem is that triangulation based on time of arrival at multiple mobile-communications base stations (TDOA) has inadequate coverage and is insufficiently accurate unless supplemented by signals provided by local radios placed outside the facility by public safety personnel.

Another problem is that conventional radio-frequency-based location methods do a poor job of providing topological location within a building: that is, location relative to floors, walls, doors, partitions, stairways, and other features whose spatial extent is small but whose significance to a person's ability to move is great.

Another problem is that many wearable mobile devices are not "location-aware." Location-aware devices are cognizant of their current geographic location. Mobile telephones and Global Positioning System ("GPS") devices may be aware of their current geographic location. GPS devices typically determine their current geographic location by communicating with satellites. However, mobile telephones may only determine their current geographic location by communicating with a particular mobile phone interface or telephony switch that provides coverage to a geographic location such as a telephony "cell" but not an exact current geographic location within the cell.

Another problem is that mobile devices are being allowed to send Short Message Services (SMS) text-to-911 messages to contact emergency services when an emergency occurs. The current physical location of such mobile devices sending text-to-911 messages needs to be determined.

Another problem is network devices connected to the IoT need often to be located when an emergency occurs. There is currently no accurate way to locate such IoT devices in an emergency situation.

Another problem is that network devices connected to the IoT often can provide useful information as an emergency situation is developing. There is currently no way to collect such information from IoT devices.

Another problem is that a network device may be connected to a network via proxy network device. One such proxy network device is an analog terminal adapter (ATA). Another such proxy network device is a Digital Enhanced Cordless Telecommunications (DECT) wireless base station. Such proxy network devices are not aware of their physical location or other location information and do not provide such location information when an emergency event occurs.

Thus, there exists a need for a method of obtain emergency location information from proxy network devices such as analog terminal adapters and wireless base stations.

SUMMARY OF THE INVENTION

In accordance with preferred embodiments of the invention, some of the problems associated with locating proxy network devices when an emergency event occurs are overcome. A method and system for providing emergency location information service (E-LIS) for proxy network devices is presented.

An emergency location information service (E-LIS) for network devices connected to proxy network devices. The proxy network devices are both analog and digital network devices. The proxy network devices send unique identification information for the network device connected to it and request either a location-by-reference (indirect location information) component or location-by-reference (direct location information) component to identify the network device when an emergency event occurs.

The foregoing and other features and advantages of preferred embodiments of the present invention will be more readily apparent from the following detailed description. The detailed description proceeds with references to the accompanying drawings.

BRIEF DESCRIPTION OF THE DRAWINGS

Preferred embodiments of the present invention are described with reference to the following drawings, wherein:

FIGS. 15A and 15B are a flow diagram illustrating a method for an emergency location information system (E-LIS);

FIG. 16 is a flow diagram illustrating a method for an emergency location information system (E-LIS);

FIGS. 28A and 28B are a flow diagram illustrating a method for an emergency location information system (E-LIS) with an IoT network device;

FIG. 29 is a flow diagram illustrating a method for an emergency location information system (E-LIS) with an IoT network device;

FIGS. 31A and 31B are a flow diagram illustrating a method for an emergency location information system (E-LIS) with a water-based network device;

FIGS. 33A, 33B, 33C and 33D are a flow diagram illustrating a method for an emergency location information system (E-LIS) for a network device connected to proxy network device;

FIG. 34 is flow diagram illustrating a method for an emergency location information system (E-LIS) for a network device connected to proxy network device; and FIG. 35 is a flow diagram illustrating a method for an emergency location information system (E-LIS) for a network device connected to proxy network device.

DETAILED DESCRIPTION OF THE INVENTION

Exemplary Electronic Emergency Information Message Processing System

Figure 1:
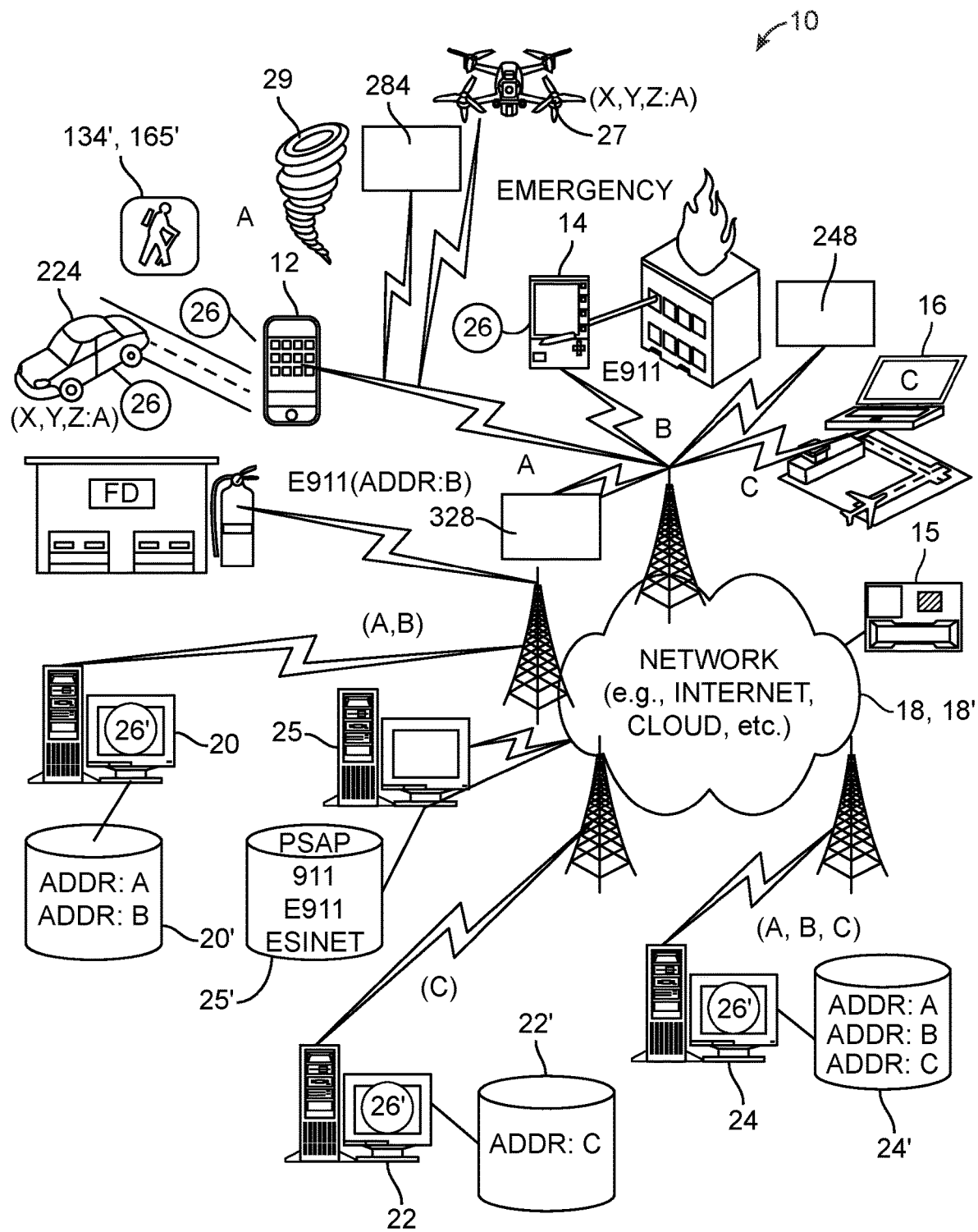
FIG. 1 is a block diagram illustrating an exemplary electronic information processing system.

FIG. 1 is a block diagram illustrating an exemplary communications system 10. The exemplary communications system 10 includes, but is not limited to, one or more target network devices 12, 14, 16, and/or one or more IoT network devices 248 (only three of which are illustrated) each with one or more processors. The target network devices 12, 14, 16, 27, 158, 150, 162, 167, 227 and/or one or more IoT network devices 248, and/or one or more water-based network devices 284, include, but are not limited to, wearable devices (e.g., glasses, watches, wrist bands, smart clothing, jewelry, etc.), UAVs, driverless vehicles, mobile phones, non-mobile phones, smart phones, analog phones, tablet computers, portable gaming platforms (GAMEBOY and DSI by Nintendo, PSP by Sony, etc.), non-portable gaming platforms (e.g., XBOX by Microsoft, Wii by Nintendo, PLAY STATION, by Sony, etc.) non-mobile computers, wireless devices, wired devices, game devices, laptop computers, personal information devices, personal digital/data assistants (PDA), hand-held devices, network appliances, Internet appliances, cable television set-top boxes, Internet television set-top boxes, satellite television boxes, two-way pagers, cellular telephones that are capable of data communications, wearable embedded devices, devices embedded into home appliances, intelligent building control and monitoring systems, unmanned aerial vehicles, autonomous driverless vehicles, and intelligent roadways, etc. However, the present invention is not limited to these target electronic devices and more, fewer or others types of target electronic devices can also be used. The target network devices 12, 14, 16 and/or one or more IoT network devices 248 and/or water-based network device 284 function as client devices in some instances and server devices in other instances. The target network devices 12, 14, 16 and/or one or more IoT network devices 248 include wireless or wired communications.

In one embodiment the one or more target network devices 12, 14, 16 and/or the IoT network devices 248 and/or the water-based network devices 284 are "smart" devices. A smart device is aware of its location in (X, Y, Z) space or (X, Y, Z) geo-space and/or (X, Y) space and/or (X, Y) geo-space. In another embodiment, the target network device 12, 14, 16 are "dumb" device. A dumb device is not aware of its location in geo-space. A dumb device is typically in contact with proxy server device that is aware of the dumb device's location in geo-space.

In one specific exemplary embodiment, the one or more target network devices 12, 14, 16 and/or the IoT network devices 248 also include smart phones such as the iPhone by Apple, Inc., Blackberry Storm and other Blackberry models by Research In Motion, Inc. (RIM), Droid by Motorola, Inc. HTC, Inc. other types of smart phones, other types of mobile and non-mobile phones, etc. However, the present invention is not limited to such devices, and more, fewer or other types of smart phones can be used to practice the invention.

A "smart phone" is a mobile phone that offers more advanced computing ability and connectivity than a contemporary basic feature phone. Smart phones and feature phones may be thought of as handheld computers integrated with a mobile telephone, but while most feature phones are able to run applications based on platforms such as Java ME, a smart phone usually allows the user to install and run more advanced applications. Smart phones and/or tablet computers run complete operating system software providing a platform for application developers assessable through a specialized Application Programming Interface (API).

The operating systems include the iPhone OS, Android, Windows, etc. iPhone OS is a proprietary operating system for the Apple iPhone. Android is an open source operating system platform backed by Google, along with major hardware and software developers (such as Intel, HTC, ARM, Motorola and Samsung, etc.), that form the Open Handset Alliance. Windows is an operating system for mobile device by Microsoft.

The one or more target network devices 12, 14, 16 and/or one or more IoT network devices 248 also include tablet computers 16 such as the iPad, by Apple, Inc., the HP Tablet, by Hewlett Packard, Inc., the Playbook, by RIM, Inc., the Tablet, by Sony, Inc., the Surface by Microsoft, etc.

In a preferred embodiment, the one or more target network devices 248 and/or water-based network devices 284 include an Internet of Things (IoT) network device with one or more processors, one or more sensors and/or one or more actuators and a network connection interface.

An "actuator" is a component of the IoT network device 248 and/or water-based network device 284 that is responsible for moving or controlling a mechanism or system.

An actuator requires a control signal and a source of energy. The control signal is relatively low energy and may be electric voltage or current, pneumatic or hydraulic pressure, or even human power. The supplied main energy source may be electric current, hydraulic fluid pressure, pneumatic pressure or other energy source. When the control signal is received, the actuator responds by converting the energy into mechanical motion.

A "sensor" is an electronic component, module, or subsystem whose purpose is to detect events or changes in its environment (e.g., temperature, pressure, altitude, elevation, speed, acceleration, etc.) and send the information to other electronics and one or more processors. The water-based network devices 284 include one or more sensors and/or more or more actuators to detect events or changes in its environment.

The IoT network devices 248 include but are not limited to, security cameras, doorbells with real-time video cameras, baby monitors, televisions, set-top boxes, lighting, heating (e.g., smart thermostats, etc.), ventilation, air conditioning (HVAC) systems, and appliances such as washers, dryers, robotic vacuums, air purifiers, ovens, refrigerators, freezers, toys, game platform controllers, game platform attachments (e.g., guns, googles, sports equipment, etc.), and/or other IoT devices.

In one embodiment, the IoT network devices 248, and/or water-based network devices 284 include an application 26. In one embodiment, the application 26 is a software application. However, the present invention is not limited to this embodiment and the application 26 can be firmware, hardware or a combination thereof. In one embodiment, the application 26 exists only on the IoT network devices 248. In another embodiment, application 26' exists only on server network devices. In another embodiment, a portion of the application 26 exists on the IoT network devices 248 and another portion 26' exists one or more server network devices 20, 22, 24. In another embodiment, application 26/26' includes a portion of a social media application (e.g., FACEBOOK, TWITTER, etc.) However, the present invention is not limited to these embodiments and other embodiments and other combinations can also be used to practice the invention.

The IoT network devices 248 include plural devices in smart buildings. A "smart building" is any structure that uses automated network devices and processes to automatically control the building's operations including heating, ventilation, air conditioning, lighting, security, other systems, etc. IoT network devices 248 in smart buildings can be used to determine an exact location of a person, animal, and/or an object in a smart building using the methods and systems described herein.

In one embodiment, the one or more target network devices 12, 14, 16 and/or the IoT network devices 248 include an internal accelerometer. An "accelerometer" is a device that measures an acceleration of the device and a change of velocity of the target network devices. Many smart phones, digital audio players, wearable mobile devices and personal digital assistants contain accelerometers for user interface control; often the accelerometer is used to present landscape or portrait views of the device's screen, based on the way the device is being held. The accelerometer can be used to detect crash-strength G-forces and automatically translate and provide location 3D (X, Y, Z) geo-space and/or 2D (X, Y) geo-space location into a current physical location for emergency response personal.

In one embodiment, the one or more target network devices 12, 14, 16 and/or the IoT network devices 248 include an internal hardware temperature sensor that indicates when the device has exceeded a certain pre-determined temperature. This internal temperature sensor is used with a corresponding to detect emergency events such as fires, weather (e.g., tornado, hurricane, blizzard, etc.) events, etc. that include a dramatic change in temperature. In one embodiment, the temperature sensor include and Infrared temperature sensor. However, the present invention is not limited to such embodiments and other types of internal and external temperature sensors can also be used to practice the invention.

In one embodiment, the one or more target network devices 12, 14, 16 and/or the IoT network devices 248 include a biometric sensor for collecting biometric identifiers. Biometric identifiers are distinctive, measurable characteristics used to label and describe individuals. Biometric identifiers include physiological and behavioral characteristics of a person. Physiological characteristics are related to the shape of the body. Examples include, but are not limited to, biometric information, including, but not limited to, fingerprints, vein patterns, facial recognition, DNA, palm print, hand geometry, iris recognition, retina recognition, heart rhythm and/or odors, scent. Behavioral characteristics are related to the pattern of behavior of a person, including but not limited to typing rhythm, gait, and voice. Some researchers have coined the term "behaviometrics" to describe the latter class of biometrics.

In another embodiment, In one embodiment, the one or more target network devices 12, 14, 16 and/or the IoT network devices 248 and/or water-based network device 284 include an external device (e.g., one or more sensors and/or actuators, etc.) that is plugged into the In one embodiment, the one or more target network devices 12, 14, 16 and/or the IoT network devices 248 and/or water-based network devices 284 that include an integration of a variety of motion, magnetic, pressure, humidity, moisture, temperature, depth (e.g., water, fluid, etc.), air bag deployment (not on water-based network device 284), and/or altimeter sensors with a processing unit and dedicated smart device application software to provide location information when an emergency event is detected via such sensors.

The network devices 12, 14, 16, include an application 26. In one embodiment, the application 26 is a software application. However, the present invention is not limited to this embodiment and the application 26 can be firmware, hardware or a combination thereof. In one embodiment, the application 26 exists only on the target network devices 12, 14, 16. In another embodiment, application 26' exists only on server network devices. In another embodiment, a portion of the application 26 exists on the target network devices 12, 14, 16 and another portion 26' exists one or more server network devices 20, 22, 24. In another embodiment, application 26/26' includes a portion of a social media application (e.g., FACEBOOK, TWITTER, etc.) However, the present invention is not limited to these embodiments and other embodiments and other combinations can also be used to practice the invention.

In one embodiment of the invention, the application 26 is a smart application for a smart phone. A smart network device application includes interactions with an operating system on a smart phone. In another embodiment, the application 26 is a smart application for the tablet computer. The interactions for the application 26 are typically completed through an Application Programming Interface (API).

The one or more target network devices 12, 14, 16 and/or the IoT network devices 248 are in communications with a communications network 18. The communications network 18 includes, but is not limited to, the Internet, an intranet, a wired Local Area Network (LAN), a wireless LAN (Wi-LAN), a Wide Area Network (WAN), a Metropolitan Area Network (MAN), Public Switched Telephone Network (PSTN), Software Defined Network (SDN), mesh networks, Bluetooth networks, cloud and/or other types and combinations of wired 18' and wireless communications networks 18 providing voice, video and data communications with wired or wireless communication protocols.

In one embodiment, the communications network 18 includes a cloud communications network 18' comprising plural different cloud component networks, a public (e.g. Internet, PSTN, etc.), private (e.g., LAN, WAN, etc.), hybrid (e.g., Internet plus private LAN, etc.), and/or community (e.g., Internet plus, private LAN, plus PSTN, etc.) networks.

"Cloud computing" is a model for enabling, on-demand network access to a shared pool of configurable computing resources (e.g., public and private networks, servers, storage, applications, and services) that are shared, rapidly provisioned and released with minimal management effort or service provider interaction. The cloud communications network 18' provides emergency location of mobile network devices and automated vehicles as cloud services.

This exemplary cloud computing model for emergency location services promotes availability for shared resources and comprises: (1) cloud computing essential characteristics; (2) cloud computing service models; and (3) cloud computing deployment models. However, the present invention is not limited to this cloud computing model and other cloud computing models can also be used to practice the invention.

Exemplary cloud computing essential characteristics appear in Table A. However, the present invention is not limited to these essential characteristics and more, fewer or other characteristics can also be used to practice the invention.

TABLE A

1. On-demand emergency location services. Emergency location servers 20, 22, 24, 25 can unilaterally provision computing capabilities, such as server time and network storage, as needed automatically without requiring human interaction with each network server on the cloud communications network 18'.
2. Broadband network access. Emergency location service capabilities are available over plural broadband communications networks and accessed through standard mechanisms that promote use by heterogeneous thin or thick client platforms 26, 26' (e.g., mobile phones, smart phones 14, tablet computers 12, laptops 16, PDAs, wearable devices, 158, 150, 162, 167, automated vehicles 224, IoT network devices, 246, etc.). The broadband network access includes high speed network access such as 3G and/or 4G wireless and/or wired and broadband and/or ultra-broadband (e.g., WiMAX, etc.) network access.
3. Resource pooling. Emergency location computing resources are pooled to serve multiple requesters 12, 14, 16, 158, 150, 162, 167, 224, using a multi-tenant model, with different physical and virtual resources dynamically assigned and reassigned according to emergency location demand. There is location independence in that a requester of emergency location services has no control and/or knowledge over the exact location of the provided by the emergency location resources but may be able to specify location at a higher level of abstraction (e.g., country, state, or data center). Examples of pooled resources include storage, processing, memory, network bandwidth, virtual server network device and virtual target network devices.
4. Rapid elasticity. Capabilities can be rapidly and elastically provisioned, in some cases automatically, to quickly scale out and rapidly released to quickly scale for emergency location services during a large emergency event (e.g., terrorist attack, weather event, natural disaster, etc.) To the emergency location system providers, the emergency location service capabilities available for provisioning appear to be unlimited and can be used in any quantity at any time.
5. Measured Services. Cloud computing systems automatically control and optimize resource use by leveraging a metering capability at some level of abstraction appropriate to the type of emergency location service (e.g., storage, processing, bandwidth, custom emergency location applications 26, 26', etc.). Emergency location service usage is monitored, controlled, and reported providing transparency for both the emergency location service providers 20, 22, 24, 25 and emergency location requesters 12, 14, 16, 158, 150, 162, 167, 224, 246 of the utilized emergency location service.

In one exemplary embodiment, the emergency location application 26, 26' offers cloud services providing emergency location information. The application 26, 26' offers a cloud computing Infrastructure as a Service (IaaS), including a cloud software infrastructure service, a cloud Platform as a Service (PaaS) including a cloud software platform service and/or offers specific cloud Software services as a Service (SaaS) including a specific cloud SaaS service for providing emergency location information. The IaaS, PaaS and SaaS include one or more of cloud services comprising networking, cloud database storage, cloud server network devices, cloud proxy network devices, virtualization, operating system, middleware, run-time, data and/or application services, or plural combinations thereof, on the cloud communications network 18'.

Plural server network devices 20, 22, 24, 25 (only four of which are illustrated) each with one or more processors and include one or more associated databases 20', 22', 24', 25'. The plural server network devices 20, 22, 24, 25 are in communications with the one or more target network devices 12, 14, 16 and/or one or more IoT network devices 248 via the communications network 18. The plural server network devices 20, 22, 24, 25 include, but are not limited to, wireless or wired or data communications servers, wireless access points, proxy servers and other types of server devices. Selected ones of the server network devices (e.g., 25, etc.) include Public Safety Answering Point (PSAP) servers, legacy 911 servers, E911 servers, etc.

The communications network 18 may include one or more gateways, routers, bridges, switches. A gateway connects computer networks using different network protocols and/or operating at different transmission capacities. A router receives transmitted messages and forwards them to their correct destinations over the most efficient available route. A bridge is a device that connects networks using the same communications protocols so that information can be passed from one network device to another. A switch is a device that filters and forwards packets between network segments. Switches typically operate at the data link layer and sometimes the network layer and therefore support virtually any packet protocol.

In one embodiment, the target network devices 12, 14, 16 and/or one or more IoT network devices 248 and the server network devices 20, 22, 24 include a location application 26 with plural software modules. The multiple software modules may be implemented in firmware, hardware or any combination thereof. In one embodiment, the target network devices 12, 14, 16 and/or one or more IoT network devices 248 may include a plug-in 28 for a browser with plural software modules. In another embodiment, the plural target network devices 12, 14, 16 and/or one or more IoT network devices 248 and plural server devices 20, 22, 24 do not include a location application or browser plug-in.

The one or more target network devices 12, 14, 16 and one or more IoT network devices 248 and one or more server network devices 20, 22, 24 communicate with each other and other network devices with near field communications (NFC) and/or machine-to-machine (M2M) communications.

"Near field communication (NFC)" is a set of standards for smartphones and similar devices to establish radio communication with each other by touching them together or bringing them into close proximity, usually no more than a few centimeters. Present and anticipated applications include contactless transactions, data exchange, and simplified setup of more complex communications such as Wi-Fi. Communication is also possible between an NFC device and an unpowered NFC chip, called a "tag" including radio frequency identifier (RFID) tags.

NFC standards cover communications protocols and data exchange formats, and are based on existing radio-frequency identification (RFID) standards including ISO/IEC 14443 and FeliCa. These standards include ISO/IEC 1809 and those defined by the NFC Forum, all of which are incorporated by reference.

"Machine to machine (M2M)" refers to technologies that allow both wireless and wired systems to communicate with other devices of the same ability. M2M uses a device to capture an event (such as option purchase, etc.), which is relayed through a network (wireless, wired cloud, etc.) to an application (software program), that translates the captured event into meaningful information. Such communication was originally accomplished by having a remote network of machines relay information back to a central hub for analysis, which would then be rerouted into a system like a personal computer.

However, modern M2M communication has expanded beyond a one-to-one connection and changed into a system of networks that transmits data many-to-one and many-to-many to plural different types of devices and appliances. The expansion of IP networks across the world has made it far easier for M2M communication to take place and has lessened the amount of power and time necessary for information to be communicated between machines.

The communications network 18 also includes a Public safety answering point (PSAP) to AutoMatic location identification (ALI) (PAM) interface. A PAM interface is an interface that uses a proprietary protocol to retrieve the caller's Automatic Network Identification (ANI) and/or Automatic Location Identification (ALI) from another ALI system or from a Dynamic ANI/ALI Provider for display at the appropriate PSAP upon the answer of a 911/E911 call.

The communications network 18 also includes a Common Alerting Protocol (CAP). CAP is an XML-based data format for exchanging public warnings and emergencies between alerting technologies. CAP allows a warning message to be consistently disseminated simultaneously over many warning systems to many applications. CAP increases warning effectiveness and simplifies the task of activating a warning for responsible officials.

The IoT devices 248 can include Emergency Position Indicating Radio Beacon (EPIRBs), personal locator beacon (PLB), emergency locator beacon (ELB), and emergency locator transmitter (ELT) sensors and/or actuators.

A personal locator beacon (PLB) is one type water-based network device used when boating, kayaking, fishing, scuba diving, swimming, on or in any body of water including a lake, river, ocean, etc. Designed to direct search and rescue teams to a location in the event of an accident or emergency, they can be used anywhere on the planet, including the north and south poles.

When activated, a PLB transmits power signals at 406 MHz (a distress frequency monitored by the U.S. National Oceanic Atmospheric Association (NOAA), U.S. Air Force Rescue Coordination Center (AFRCC), U.S. Navy and U.S. Coast Guard. The 406 MHz wireless signals communicate with a network of American, Canadian, Russian, and French satellites.

After receiving the transmission from the PLB, the satellites create a triangular fix on a geographic location of the PLB, so search and rescue operations can quickly begin.

GPS compatible PLBs have the benefit of also delivering GPS coordinates instead of having to wait for a geographic location to be calculated by the satellites.

ERIBs are tracking transmitters which aid in the detection and location of boats, aircraft, and people in distress. A personal locator beacon (PLB) is particular type of EPIRB that is typically smaller, has a shorter battery life and unlike a proper EPIRB is registered to a person rather than a vessel. The terms emergency locator beacon (ELB) and emergency locator transmitter (ELT) are used interchangeably with EPIRB only when used on aircraft.

Strictly, they are radio beacons many of which interface with worldwide offered service of Cospas-Sarsat, the international satellite system for search and rescue (SAR). Transmitters broadcasting on 406 MHz are recognized. When manually activated, or automatically activated upon immersion or impact, such beacons send out a distress signal. The signals are monitored worldwide and the location of the distress is detected by non-geostationary satellites using the Doppler effect for trilateration, and in more recent EPIRBs also by GPS.

Individuals can receive standardized alerts from many sources and configure their applications to process and respond to the alerts, as desired. Alerts from the Department of Homeland Security, the Department of the Interior's United States Geological Survey, and the Department of Commerce's National Oceanic and Atmospheric Administration (NOAA), Cospas-Sarsat and state and local government agencies can all be received in the same format, by the same application. That application can, for example, sound different alarms based on the information received.

By normalizing alert data across threats, jurisdictions, and warning systems, CAP also can be used to detect trends and patterns in warning activity, such as trends that might indicate an undetected hazard or hostile act. From a procedural perspective, CAP reinforces a research-based template for effective warning message content and structure.

The CAP data structure is backward-compatible with existing alert formats including the Specific Area Message Encoding (SAME) used in Weather radio and the broadcast Emergency Alert System as well as new technology such as the Commercial Mobile Alert System (CMAS).

The communications network 18 also includes a Wireless Emergency Service Protocol E2 Interface for interoperable operation of the E2 interface over Transmission Control Protocol (TCP)/Internet Protocol (IP) (TCP/IP). This interface is between the Mobile Positioning Center (MPC)/Global Mobile Location Center (GMLC) and the Emergency Management Systems (EMSE) as defined in R45.2's TIA/EIA/J-STD-036-A.

The communications network 18 may also include one or more servers or access points (AP) including wired and wireless access points (WiAP) (e.g., 20).

The communications network 18 includes data networks using the Transmission Control Protocol (TCP), User Datagram Protocol (UDP), Internet Protocol (IP) and other data protocols.

The communications network 18 may also include wired interfaces connecting portions of a PSTN or cable television network that connect the target network devices 12, 14, 16 and/or IoT network devices 248 via the Public Switched Telephone Network (PSTN) or a cable television network (CATV) including high definition television (HDTV) that connect the target network devices 12, 14, 16 and/or IoT network devices 248 via one or more twisted pairs of copper wires, digital subscriber lines (e.g. Digital Subscriber Line (DSL), Asymmetric DSL (ADSL), Variable-speed DSL (VDSL), etc.) coaxial cable, fiber optic cable, other connection media or other connection interfaces. The PSTN is any public switched telephone network provided by AT&T, CenturyLink, FairPoint, Frontier, Sprint, Verizon, and other Local Exchange Carriers, etc.

The communications network 18 may also include digital and analog cellular services, Commercial Mobile Radio Services (CMRS), including, mobile radio, paging and other wireless services. The communications network 18 includes a cellular telephone network, Personal Communications Services network ("PCS"), Packet Cellular Network ("PCN"), Global System for Mobile Communications, ("GSM"), Generic Packet Radio Services ("GPRS"), Cellular Digital Packet Data ("CDPD"). The communications network 18 includes a Wireless Application Protocol ("WAP") or Digital Audio Broadcasting ("DAB"), 802.xx.xx, Global Positioning System ("GPS") and GPS map, Digital GPS ("DGPS") or other type of wireless network.

The wireless network includes, but is not limited to Code Division Multiple Access ("CDMA"), Time Division Multiple Access ("TDMA"), 3G, 4G, 5G, LTE and/or other switched wireless technologies.

PCS networks include network that cover a range of wireless, digital communications technologies and services, including cordless phones, mobile phones, voice mail, paging, faxing, mobile personal PDAs, etc. PCS devices are typically divided into narrowband and broadband categories.

Narrowband devices which operate in the 900 MHz band of frequencies, typically provide paging, data messaging, faxing, and one- and two-way electronic messaging capabilities. Broadband devices, which operate in the 1850 MHz to 1990 MHz range typically provide two-way voice, data, and video communications. Other wireless technologies such as GSM, CDMA and TDMA are typically included in the PCS category.

GSM is another type of digital wireless technology widely used throughout Europe, in Australia, India, Africa, Asia, and the Middle East. GSM use is growing in the U.S. GSM is a wireless platform based on TDMA to digitize data. GSM includes not only telephony and Short Message Services ("SMS") but also voice mail, call forwarding, fax, caller ID, Internet access, and e-mail.

However, present invention is not limited to the frequencies and/or bandwidths described and slower, faster and other frequencies and/or bandwidths currently know or to be developed can be used to practice the invention.

SMS or "text messaging" is type of communications service that enables a user to allow private message communications with another user. GSM typically operates at three frequency ranges: 900 MHz (GSM 900) in Europe, Asia and most of the rest of the world; 1800 MHz (GSM 1800 or DCS 1800 or DCS) in a few European countries; and 1900 MHz (GSM 1900 also called PCS 1900 or PCS) in the United States. GSM also operates in a dual-band mode including 900/1800 MHz and a tri-band mode include 900/1800/1900 Mhz.

Short Message Service (SMS) is a text messaging service component of phone, Web, or mobile communication systems. It uses standardized communications protocols to allow fixed line or mobile phone or wearable mobile devices to exchange short text messages.

SMS as used on modern handsets originated from radio telegraphy in radio memo pagers using standardized phone protocols. These were defined in 1985 as part of the GSM series of standards as a means of sending messages of up to 160 characters to and from GSM mobile handsets. Though most SMS messages are mobile-to-mobile text messages, support for the service has expanded to include other mobile technologies, such as CDMA networks, as well as satellite and landline networks.

GPRS is a standard for wireless communications, which runs at speeds up to 150 kilo-bits-per-second ("kbit/s"). GPRS, which supports a wide range of bandwidths is an efficient use of limited bandwidth and is particularly suited for sending and receiving small bursts of data such as e-mail and Web browsing, as well as large volumes of data.

CDPD is a wireless standard providing two-way, 19.2-Kbps or higher packet data transmission over existing cellular telephone channels. A Packet Cellular Network ("PCN") includes various types of packetized cellular data.

The communications network 18 may also include a "mesh network" or a "mesh sensor network." A mesh network is a self-organizing networks built from plural nodes that may spontaneously create an impromptu network, assemble the network themselves, dynamically adapt to device failure and degradation, manage movement of nodes, and react to changes in task and network requirements. The plural nodes are reconfigurable smart sensor nodes that are self-aware, self-reconfigurable and autonomous.

A mesh network is a network that employs one of two connection arrangements, full mesh topology or partial mesh topology. In the full mesh topology, each node is connected directly to each of the others. In the partial mesh topology, nodes are connected to only some, not all, of the other nodes. A mesh network is a network where the nodes are in close proximity (e.g., about few feet to about 100 feet, or about 1 meter to about 30 meters, etc.).

Preferred embodiments of the present invention include network devices and interfaces that are compliant with all or part of standards proposed by the Institute of Electrical and Electronic Engineers (IEEE), International Telecommunications Union-Telecommunication Standardization Sector (ITU), European Telecommunications Standards Institute (ETSI), Internet Engineering Task Force (IETF), U.S. National Institute of Security Technology (NIST), American National Standard Institute (ANSI), Wireless Application Protocol (WAP) Forum, Data Over Cable Service Interface Specification (DOCSIS) Forum, Bluetooth Forum, the ADSL Forum, the Federal Communications Commission (FCC), the 3rd Generation Partnership Project (3GPP), and 3GPP Project 2, (3GPP2) and Open Mobile Alliance (OMA). However, network devices based on other standards could also be used.

An operating environment for network devices and interfaces of the present invention include a processing system with one or more high speed Central Processing Unit(s) ("CPU") or other types of processors and a memory. In accordance with the practices of persons skilled in the art of computer programming, the present invention is described below with reference to acts and symbolic representations of operations or instructions that are performed by the processing system, unless indicated otherwise. Such acts and operations or instructions are referred to as being "computer-executed," "CPU executed" or "processor executed."

It will be appreciated that acts and symbolically represented operations or instructions include the manipulation of electrical signals by the CPU. An electrical system represents data bits which cause a resulting transformation or reduction of the electrical signals, and the maintenance of data bits at memory locations in a memory system to thereby reconfigure or otherwise alter the CPU's operation, as well as other processing of signals. The memory locations where data bits are maintained are physical locations that have particular electrical, magnetic, optical, or organic properties corresponding to the data bits.

The data bits may also be maintained on a computer readable medium including magnetic disks, optical disks, organic memory, and any other volatile (e.g., Random Access Memory ("RAM")) or non-volatile (e.g., Read-Only Memory ("ROM")) mass storage system readable by the CPU. The computer readable medium includes cooperating or interconnected computer readable medium, which exist exclusively on the processing system or be distributed among multiple interconnected processing systems that may be local or remote to the processing system. In one embodiment, the data bits are stored with one or more encryption and/or security methods described herein.

The Open Systems Interconnection ("OSI") reference model is a layered architecture that standardizes levels of service and types of interaction for network devices exchanging information through a communications network. The OSI reference model separates network device-to-network device communications into seven protocol layers, or levels, each building—and relying—upon the standards contained in the levels below it. The OSI reference model includes from lowest-to-highest, a physical, data-link, network, transport, session, presentation and application layer. The lowest of the seven layers deals solely with hardware links; the highest deals with software interactions at the application-program level.

The Internet Protocol reference model is a layered architecture that standardizes levels of service for the Internet Protocol suite of protocols. The Internet Protocol reference model comprises in general from lowest-to-highest, a link, network, transport and application layer.

In one embodiment of the present invention, the wireless and/or wired interfaces used for the plural target network devices 12, 14, 16 include but are not limited to, an IEEE 802.11a, 802.11ac, 802.11b, 802.11g, 802.11n, "Wireless Fidelity" ("Wi-Fi"), Wi-Fi Aware, "Worldwide Interoperability for Microwave Access" ("WiMAX"), ETSI High Performance Radio Metropolitan Area Network (HIPERMAN), "RF Home" Zigbee, Bluetooth, Infrared, Industrial, Scientific and Medical (ISM), a Radio Frequency Identifier (RFID), Real-Time Text (RTT), or other long range or short range wireless and/or wired interfaces may be used to practice the invention.

802.11b defines a short-range wireless network interface. The IEEE 802.11b standard defines wireless interfaces that provide up to 11 Mbps wireless data transmission to and from wireless devices over short ranges. 802.11a is an extension of the 802.11b and can deliver speeds up to 54M bps. 802.11g deliver speeds on par with 802.11a. However, other 802.11xx interfaces can also be used and the present invention is not limited to the 802.11 protocols defined. The IEEE 802.11a, 802.11an, 802.11b, 802.11g and 802.11n standards are incorporated herein by reference.

Wi-Fi is another type of 802.11xx interface, whether 802.11b, 802.11a, dual-band, etc. Wi-Fi devices include an RF interfaces such as 2.4 GHz for 802.11b or 802.11g and 5 GHz for 802.11a.

Wi-Fi Aware is a new capability for energy-efficient, proximity-based service discovery among Wi-Fi capable devices. The technology in Wi-Fi Aware enables network devices to discover other devices, applications, and information nearby before making a Wi-Fi connection. Wi-Fi Aware makes contextual awareness more immediate and useful, enabling personalized applications (e.g., 26, 26', etc.) that continuously scan surroundings, anticipate actions, and notify of services and selected preferences. Wi-Fi Aware devices go through a process of discovery and synchronization, establishing a common "heartbeat" that enables very power efficient operation. Devices form clusters and exchange small messages about services available nearby, enabling immediate discovery. Wi-Fi Aware's ability to send and receive tiny messages before establishing a network 18, 18' connection further enables a two-way conversation among network devices in emergency and non-emergency situations whose current physical geographic locations and/or 2D/3D geo-space information may be known and available. This capability not only enables a network device to discover nearby information and services, but request additional information, such as emergency location information—all without establishing, an Internet, PSTN, or other network connections 18, 18'. The Wi-Fi Aware reference document, wp_Wi-Fi_Aware_Industry_20150714_v2, Jul. 14, 2015, is incorporated herein by reference.

In one embodiment, the applications 26, 26' include Wi-Fi Aware capabilities. In one embodiment the wireless interfaces include Wi-Fi Aware wireless interface capabilities. However, the present invention is not limited to these embodiments and the invention can be practiced without Wi-Fi Aware capabilities.

WiMAX is an industry trade organization formed by communications component and equipment companies to promote and certify compatibility and interoperability of broadband wireless access equipment that conforms to the IEEE 802.16xx and ETSI HIPERMAN. HIPERMAN is the European standard for MANs.

The IEEE The 802.16a, 802.16c, 802.16d 802.16e and 802.16g standards are wireless MAN technology standard that provides a wireless alternative to cable, DSL and T1/E1 for last mile broadband access. It is also used as complimentary technology to connect IEEE 802.11xx hot spots to the Internet.

The IEEE 802.16a standard for 2-11 GHz is a wireless MAN technology that provides broadband wireless connectivity to fixed, portable and nomadic devices. It provides up to 50-kilometers of service area range, allows users to get broadband connectivity without needing direct line of sight with the base station, and provides total data rates of up to 280 Mbps per base station, which is enough bandwidth to simultaneously support hundreds of businesses with T1/E1-type connectivity and thousands of homes with DSL-type connectivity with a single base station. The IEEE 802.16g provides up to 100 Mbps.

The IEEE 802.16e standard is an extension to the approved IEEE 802.16/16a/16g standard. The purpose of 802.16e is to add limited mobility to the current standard which is designed for fixed operation.

The ESTI HIPERMAN standard is an interoperable broadband fixed wireless access standard for systems operating at radio frequencies between 2 GHz and 11 GHz.

The IEEE 802.16a, 802.16d, 802.16e and 802.16g standards are incorporated herein by reference. More information on WiMAX can be found at the URL "www.wimaxforum.org." WiMAX can be used to provide a wireless local loop (WLP).

The ETSI HIPERMAN standards TR 101 031, TR 101 475, TR 101 493-1 through TR 101 493-3, TR 101 761-1 through TR 101 761-4, TR 101 762, TR 101 763-1 through TR 101 763-3 and TR 101 957 are incorporated herein by reference. More information on ETSI standards can be found at the URL "www.etsi.org."

IEEE 802.15.4 (Zigbee) is low data rate network standard used for mesh network devices such as sensors, interactive toys, smart badges, remote controls, and home automation. The 802.15.4 standard provides data rates of 250 kbps, 40 kbps, and 20 kbps., two addressing modes; 16-bit short and 64-bit IEEE addressing, support for critical latency devices, such as joysticks, Carrier Sense Multiple Access/Collision Avoidance, (CSMA-CA) channel access, automatic network establishment by a coordinator, fully handshaked protocol for transfer reliability, power management to ensure low power consumption for multi-month to multi-year battery usage and up to 16 channels in the 2.4 GHz ISM band (Worldwide), 10 channels in the 915 MHz (US) and one channel in the 868 MHz band (Europe). The IEEE 802.15.4-2003 standard is incorporated herein by reference. More information on 802.15.4 and ZigBee can be found at the URL "www.ieee802.org" and "www.zigbee.org" respectively.

Bluetooth (IEEE 802.15.1a) is a short-range radio frequency technology aimed at simplifying communications among network devices and between network devices. Bluetooth wireless technology supports both short-range point-to-point and point-to-multipoint connections. The Bluetooth Specification, GL 11r02, March 2005, prepared by the Bluetooth SIG, Inc. and the IEEE 802.15.1a standard are incorporated herein by reference.

Infra data association (IrDA) is a short-range radio wireless Bluetooth or wireless infrared communications. Industrial, Scientific and Medical (ISM) are short-range radio wireless communications interfaces operating at 400 MHz, 800 MHz, and 900 Mhz. ISM sensors may be used to provide wireless information to practice the invention.

An RFID is an automatic identification method, relying on storing and remotely retrieving data using devices called RFID tags or transponders. An RFID tag is a small object that can be attached to or incorporated into a product, animal, or person. RFID tags contain antennas to enable them to receive and respond to radio-frequency queries from an RFID transceiver. Passive tags require no internal power source, whereas active tags require a power source. RFID sensors and/or RFID tags are used to provide wireless information to practice the invention.

Passive tags are powered by received radiation from a reading device and require no internal source of power; thus, they can be manufactured at very low cost and require no ongoing maintenance as long as they are not removed or physically damaged. Passive tags can only be read by a reader device in close proximity to the tag, which is an advantage in RFID-based in-building location services.

RFID Passive tags can be manufactured in a sticker-like form factor and held in place by adhesive, providing very low installation cost; however, such an arrangement is not heat-resistant, and conventional mechanical mounting employing screws or cover plates is advisable for at least a minimal subset of all installed tags.

RFID Passive tags are typically capable of providing a 96-bit number to a tag reader: 96 bits allow $2^{96}=10^{29}$ (100 billion billion billion) possible codes, ample to allow unique identification of every significant location within a building.

RFID active tags may also be employed for location awareness. Active tags have longer range and can include more sophisticated functionality. In the context of this invention, active tags may be programmed to validate their location from time to time, either by reference to Global Positioning System (GPS) signals using very long integration times, or by interrogation of other RFID tags in their vicinity.

A RFID tag which finds itself in an incorrect or unverified location is programmed to turn itself off, thus avoiding spurious location data being provided to a user; responses to incorrect location may also include emitting a distress signal which can be detected by a reader during building maintenance, or contacting a central location by direct wireless communications or mesh networking employing the multiplicity of companion ID tags, in order to induce maintenance personnel to diagnose and repair the problem with the subject tag.

RFID Active tags are also deployed in a mesh network that would allow information to pass from tag to tag. This type of network would allow tag and reader information to be passed from location to location and possibly from floor to floor to move the information to a central location or to the building wall ultimately making it easier to access. Active tag networks have significant functional advantages, but are relatively expensive and maintenance-intensive compared to passive tags.

Real-Time Text (RTT) is text transmitted instantly as it is being typed or created. Recipients can immediately read the message while it is being written, without waiting. Real-time text is used for conversational text, in collaboration, and in live captioning. RTT technologies include TDD/TTY devices for the deaf, live captioning for TV, a feature enhancement in instant messaging, captioning for telephony/video teleconferencing, telecommunications relay services including Internet Protocol-relay, transcription services including Remote CART, TypeWell, collaborative text editing, streaming text applications, and next-generation 9-1-1/1-1-2 emergency services.

In one embodiment, the physical location information includes Global Positioning System (GPS) information, street address information, two-dimensional (2D) geo-space (e.g., X, Y) (e.g., building, floor), three-dimensional (3D) (X, Y, Z) (e.g., building, floor, floor location (e.g., room, office, desk, cubicle, etc.)) or other physical location information (e.g., longitude, latitude, street address, etc.).

The Global Positioning System (GPS) is a space-based global navigation satellite system (GNSS) that provides reliable location and time information in all weather and at all times and anywhere on or near the Earth. A GPS receiver calculates its position by precisely timing signals sent by GPS satellites. A GPS receiver uses the messages it receives to determine a transit time of each message and computes a distance to each GPS satellite 168. These distances along with the satellites' locations are used with the possible aid of triangulation, depending on which algorithm is used, to compute a current physical position of the GPS receiver. This position is then displayed, perhaps with a moving map display (e.g., at a street level, etc.) and/or latitude and longitude (X, Y) and/or elevation and/or speed, height, depth, acceleration, de-acceleration, velocity, temperature, barometric pressure information, other pressure information and/or other information for the (Z) coordinate may also be included. Many GPS units also show derived information such as travel direction and speed, calculated from position changes. The GPS coordinates include standard GPS, GPS map, Digital GPS (DGPS) and/or other types of GPS information.

In one embodiment, (Z) component of the 3D physical location information includes, but is not limited to, temperature, pressure, depth, altitude, elevation, speed, acceleration information. For example, a target network device 12, 14, 16, may be located at latitude and longitude (X, Y) and at with a temperature, pressure, depth, altitude, elevation, speed, and/or acceleration of (Z), etc.

The target network devices 12, 14, 16 and/or one or more IoT network devices 248 include a protocol stack with multiple layers based on the Internet Protocol or OSI reference model. The protocol stack is used for, but not limited to, data networking. The protocol stack includes, but is not limited to, TCP, UDP, IP, Hypertext Transfer Protocol (HTTP), Simple Mail Transfer Protocol (SMTP), Post Office Protocol version 3 (POP3), Internet Mail Access Protocol (IMAP), Voice-Over-IP (VoIP), Session Initiation Protocol (SIP), Service Location Protocol (SLP), Session Description Protocol (SDP), Real-time Protocol (RTP), H.323, H.324, Domain Name System (DNS), Authentication Authorization and Accounting (AAA), instant-messaging (IM), Text-over-IP (ToIP), Internet Protocol version 4 (IPv4), Internet Protocol Version 6 (IPv6), Hybrid dual-stack IPv6/IPv4 and other protocols.

TCP provides a connection-oriented, end-to-end reliable protocol designed to fit into a layered hierarchy of protocols that support multi-network applications. For more information on TCP 58 see IETF RFC-793, incorporated herein by reference.

UDP provides a connectionless mode of communications with datagrams in an interconnected set of networks. For more information on UDP see ITEF RFC-768, incorporated herein by reference.

IP is an addressing protocol designed to route traffic within a network or between networks. For more information on IP 54 see IETF RFC-791, incorporated herein by reference. An IP address includes four sets of numbers divided by period (e.g., x.x.x.x) in the range of zero to 255. An IP address is a unique string of numbers that identifies a device on an IP based network.

HTTP is a standard protocol for communications on the World Wide Web. For more information on HTTP, see IETF RFC-2616, incorporated herein by reference.

Hyper Text Transfer Protocol (HTTP) Enabled Location Delivery (HELD) is a protocol to retrieve a location of a network device either directly in the form of a Presence Information Data Format Location Object (PIDF-LO) document (by value LbV) or indirectly as a unique location Uniform Resource Identifier (URI) (by reference LbR). For more information on HELD, see IETF RFC-5985, incorporated herein by reference. For more information on URI, see IETF RFC-3986, incorporated herein by reference.

HELD+ is an extension of the HELD protocol that adds additional emergency location information features. See IETF RFC-7480, and RFC-7852, both of which are incorporated by reference. In one embodiment, the HELD+ extensions to the HELD protocol are defined in IETF RFCs. In another embodiment, the HELD+ extensions to the HELD protocol are defined and used by individual companies providing emergency location services including, but limited to those extensions illustrated in Tables 3-5. However, the present invention is not limited to this embodiment and other embodiments, with other types of HELD+ extensions can be used to practice the invention.

SMTP is a protocol for sending e-mail messages between devices including e-mail servers. For more information on SMTP, see IETF RFC-821 and RFC-2821, incorporated herein by reference.

POP3 is a protocol for a protocol used to retrieve e-mail from a mail server. For more information on POP3, see IETF RFC-1939, incorporated herein by reference.

IMAP is a protocol for retrieving e-mail messages from a server. For more information on IMAP, see IETF RFC-1730, incorporated herein by reference.

Media Access Control (MAC) is a data link layer protocol. A MAC address is a physical address of a device connected to a communications network, expressed as a 48-bit hexadecimal number. A MAC address is permanently assigned to each unit of most types of networking hardware, such as network interface cards (NICs) (e.g., Ethernet cards, etc.) by manufacturers at the factory.

VoIP is a set of facilities for managing the delivery of voice information using IP 28 packets. In general, VoIP is used to send voice information in digital form in discrete data packets (i.e., IP 28 packets) over data networks 18 rather than using traditional circuit-switched protocols used on the PSTN. VoIP is used on both wireless and wired data networks.

VoIP typically comprises several applications (e.g., SIP, SLP, SDP, H.323, H.324, DNS, AAA, etc.) that convert a voice signal into a stream of packets (e.g., IP 28 packets) on a packet network and back again. VoIP allows voice signals to travel over a stream of data packets over a communications network 18.

SIP supports user mobility by proxying and re-directing requests to a mobile node's current location. Mobile nodes can register their current location. SIP is not tied to any particular conference control protocol. SIP is designed to be independent of a lower-layer transport protocol and can be extended. For more information on SIP, see IETF RFC-2543 and IETF 3261, the contents of both of which are incorporated herein by reference.

SLP provides a scalable framework for the discovery and selection of network services. Using SLP, network devices using the Internet need little or no static configuration of network services for network based applications. For more information on SLP see IETF RFC-2608, incorporated herein by reference.

SDP is a protocol for describing multimedia sessions for the purposes of session announcement, session invitation, and other forms of multimedia session initiation. For more information on SDP, see IETF RFC-2327, incorporated herein by reference RTP is a protocol for end-to-end network transport functions suitable for applications transmitting real-time data, such as audio, video or simulation data, over multicast or unicast network services. For more information on RTP, see IETF RFC-1889, incorporated herein by reference.

H.323 is one of main family of video conferencing recommendations for IP networks. The ITU-T H.323 standards entitled "Packet-based multimedia communications systems" dated February 1998, September 1999, November 2000 and July 2003 are incorporated herein by reference.

H.324 is a video conferencing recommendation using Plain Old Telephone Service (POTS) lines. The ITU-T H.324 standards entitled "Terminal for low bit-rate multimedia communication" dated February 1998 and March 2002 are incorporated herein by reference.

A Domain Name System (DNS) provides replicated distributed secure hierarchical databases that hierarchically store resource records under domain names. For more information on the DNS see IETF RFC-1034, RFC-1035, RFC-1591, RFC-2606 and RFC-2929, the contents of all of which are incorporated herein by reference.

Authentication Authorization and Accounting (AAA) includes a classification scheme and exchange format for accounting data records (e.g., for call billing, etc.). For more information on AAA applications, see, IETF RFC-2924, the contents of which are incorporated herein by reference.

VoIP services typically need to be able to connect to traditional circuit-switched voice networks such as those provided by the PSTN. Thus, VoIP is typically used with the H.323 protocol and other multimedia protocols. H.323 and H.324 terminals such as multimedia computers, handheld devices, PDAs or other devices such as non-mobile and mobile phones connect to existing wired and wireless communications networks 18 as well as private wired and wireless networks.

H.323 and H.324 terminals implement voice transmission functions and typically include at least one voice codec (e.g., ITU-T CODECS, G.711, G.723, G.726, G.728, G.729, GSM, etc.) that sends and receives packetized voice data and typically at least one video codec (e.g., MPEG, etc.) that sends and receives packetized video data).

An Instant Message (IM) is a "short," real-time or near-real-time message that is sent between two or more end user devices such (computers, personal digital/data assistants (PDAs) mobile phones, etc.) running IM client applications. An IM is typically a short textual message. Examples of IM messages include America Online's Instant (AIM) messaging service, Microsoft Network (MSN) Messenger, Yahoo Messenger, and Lycos ICQ Instant Messenger, IM services provided by telecom providers such as T-Mobile, Verizon, Sprint, and others that provide IM services via the Internet and other wired and wireless communications networks. In one embodiment of the present invention, the IM protocols used meet the requirements of Internet Engineering Task Force (IETF) Request For Comments (RFC)-2779, entitled "Instant Messaging/Presence Protocol Requirements." However, the present invention is not limited to such an embodiment and other IM protocols not compliant with IETF RFC 2779 may also be used.

Text-over-IP (ToIP) is defined IETF RFC 5194, the contents of which are incorporated herein by reference. ToIP is a framework for implementation of all required functions based on the Session Initiation Protocol (SIP) and the Real-Time Transport Protocol (RTP. This ToIP framework is specifically designed to be compatible with Voice-over-IP (VoIP), Video-over-IP, and Multimedia-over-IP (MoIP) environments. This ToIP framework also builds upon, and is compatible with, the high-level user requirements of deaf, hard-of-hearing and speech-impaired users as described in IETF RFC 3351. It also meets real-time text requirements of mainstream users. ToIP also offers an IP equivalent of analog text telephony services as used by deaf, hard-of-hearing, speech-impaired, and mainstream users. The Session Initiation Protocol (SIP) is the protocol of choice for all the necessary control and signaling required for the ToIP framework.

Internet Protocol version 6 (IPv6) is the latest version of the Internet Protocol (IP), the communications protocol that provides an identification and location system for computers on networks and routes traffic across the Internet. IPv6 was developed by the IETF to deal with the long-anticipated problem of IPv4 address exhaustion. IPv6 is described in IETF RFC 2460, incorporated herein by reference. IPv6 uses a 128-bit address, allowing $2^{128}$, or approximately $3.4 \times 10^{38}$ addresses, or more than $7.9 \times 10^{28}$ times as many as IPv4, which uses 32-bit addresses. IPv4 provides approximately 4.3 billion addresses.

Internet Protocol Version 4 (IPv4) was the first publicly used version of the Internet Protocol. IPv4 was developed as a research project by the Defense Advanced Research Projects Agency (DARPA), a United States Department of Defense agency, before becoming the foundation for the Internet and the World Wide Web. It is currently described by IETF publication RFC 791 (September 1981), the contents of which is incorporated by reference, which replaced an earlier definition (RFC 760, January 1980). IPv4 included an addressing system that used numerical identifiers consisting of 32 bits.

Hybrid dual-stack IPv6/IPv4 implementations recognize a special class of addresses, the IPv4-mapped IPv6 addresses. In these addresses, the first 80 bits are zero, the next 16 bits are one, and the remaining 32 bits are the IPv4 address.

Television Services

In one embodiment, the application 26, 26' provides emergency location services from television services via the communications network 18, 18'. These television services include digital television services, including, but not limited to, cable television, satellite television, high-definition television, three-dimensional, televisions and other types of network devices.

However, the present invention is not limited to such television services and more, fewer and/or other television services can be used to practice the invention.

Internet Television Services

In one embodiment, the application 26, 26' provides emergency location services from various Internet based television services via the communications network 18, 18'. The television services include Internet television, Web-TV, and/or Internet Protocol Television (IPTV) and/or other broadcast television services.

"Internet television" allows users to choose a program or the television show they want to watch from an archive of programs or from a channel directory. The two forms of viewing Internet television are streaming content directly to a media player or simply downloading a program to a viewer's set-top box, game console, computer, or other mesh network device.

"Web-TV" delivers digital content via non-mesh broadband and mobile networks. The digital content is streamed to a viewer's set-top box, game console, computer, or other mesh network device.

"Internet Protocol television (IPTV)" is a system through which Internet television services are delivered using the architecture and networking methods of the Internet Protocol Suite over a packet-switched network infrastructure, e.g., the Internet and broadband Internet access networks, instead of being delivered through traditional radio frequency broadcast, satellite signal, and cable television formats.

However, the present invention is not limited to such Internet Television services and more, fewer and/or other Internet Television services can be used to practice the invention.

Social Networking Services

In one embodiment, the application 26, 26' provides emergency location services from various social network services via the communications network 18, 18' to/from one or more social networking web-sites and/or applications (e.g., FACEBOOK, LINKEDIN, SNAPCHAT, YOUTUBE, TWITTER, MY-SPACE, MATCH.COM, E-HARMONY, GROUPON, SOCIAL LIVING, PINTREST, INSTAGRAM, etc.). The social networking web-sites also include, but are not limited to, social couponing sites, dating web-sites, blogs, RSS feeds, and other types of information web-sites in which messages can be left or posted for a variety of social activities. Such social networking sites include plural different proprietary and public social networking communications protocols for communications between a user and the social networking sites. Such social networking protocols may be used to send emergency messages.

However, the present invention is not limited to the social networking services described and other public and private social networking services can also be used to practice the invention.

Security and Encryption

Devices and interfaces of the present invention may include security and encryption for secure communications. Wireless Encryption Protocol (WEP) (also called "Wired Equivalent Privacy) is a security protocol for WiLANs defined in the IEEE 802.11b standard. WEP is cryptographic privacy algorithm, based on the Rivest Cipher 4 (RC4) encryption engine, used to provide confidentiality for 802.11b wireless data.

RC4 is cipher designed by RSA Data Security, Inc. of Bedford, Mass., which can accept encryption keys of arbitrary length, and is essentially a pseudo random number generator with an output of the generator being XORed with a data stream to produce encrypted data.

One problem with WEP is that it is used at the two lowest layers of the OSI model, the physical layer and the data link layer, therefore, it does not offer end-to-end security. One another problem with WEP is that its encryption keys are static rather than dynamic. To update WEP encryption keys, an individual has to manually update a WEP key. WEP also typically uses 40-bit static keys for encryption and thus provides "weak encryption," making a WEP device a target of hackers.

The IEEE 802.11 Working Group is working on a security upgrade for the 802.11 standard called "802.11i." This supplemental draft standard is intended to improve WiLAN security. It describes the encrypted transmission of data between systems 802.11X WiLANs. It also defines new encryption key protocols including the Temporal Key Integrity Protocol (TKIP). The IEEE 802.11i draft standard, version 4, completed Jun. 6, 2003, is incorporated herein by reference.

The 802.11i is based on 802.1x port-based authentication for user and device authentication. The 802.11i standard includes two main developments: Wi-Fi Protected Access (WPA) and Robust Security Network (RSN).

WPA uses the same RC4 underlying encryption algorithm as WEP. However, WPA uses TKIP to improve security of keys used with WEP. WPA keys are derived and rotated more often than WEP keys and thus provide additional security. WPA also adds a message-integrity-check function to prevent packet forgeries.

RSN uses dynamic negotiation of authentication and selectable encryption algorithms between wireless access points and wireless devices. The authentication schemes proposed in the draft standard include Extensible Authentication Protocol (EAP). One proposed encryption algorithm is an Advanced Encryption Standard (AES) encryption algorithm.

Dynamic negotiation of authentication and encryption algorithms lets RSN evolve with the state of the art in security, adding algorithms to address new threats and continuing to provide the security necessary to protect information that WiLANs carry.

The NIST developed a new encryption standard, the Advanced Encryption Standard (AES) to keep government information secure. AES is intended to be a stronger, more efficient successor to Triple Data Encryption Standard (3DES). More information on NIST AES can be found at the URL "www.nist.gov/aes."

DES is a popular symmetric-key encryption method developed in 1975 and standardized by ANSI in 1981 as ANSI X.3.92, the contents of which are incorporated herein by reference. 3DES is the encrypt-decrypt-encrypt (EDE) mode of the DES cipher algorithm 3DES is defined in the ANSI standard, ANSI X9.52-1998, the contents of which are incorporated herein by reference. DES modes of operation are used in conjunction with the NIST Federal Information Processing Standard (FIPS) for data encryption (FIPS 46-3, October 1999), the contents of which are incorporated herein by reference.

The NIST approved a FIPS for the AES, FIPS-197. This standard specified "Rijndael" encryption as a FIPS-approved symmetric encryption algorithm that may be used by U.S. Government organizations (and others) to protect sensitive information. The NIST FIPS-197 standard (AES FIPS PUB 197, November 2001) is incorporated herein by reference.

The NIST approved a FIPS for U.S. Federal Government requirements for information technology products for sensitive but unclassified (SBU) communications. The NIST FIPS Security Requirements for Cryptographic Modules (FIPS PUB 140-2, May 2001) is incorporated herein by reference.

RSA is a public key encryption system which can be used both for encrypting messages and making digital signatures. The letters RSA stand for the names of the inventors: Rivest, Shamir and Adleman. For more information on RSA, see U.S. Pat. No. 4,405,829, now expired and incorporated herein by reference.

"Hashing" is the transformation of a string of characters into a usually shorter fixed-length value or key that represents the original string. Hashing is used to index and retrieve items in a database because it is faster to find the item using the shorter hashed key than to find it using the original value. It is also used in many encryption algorithms.

Secure Hash Algorithm (SHA), is used for computing a secure condensed representation of a data message or a data file. When a message of any length $<2^{64}$ bits is input, the SHA-1 produces a 160-bit output called a "message digest." The message digest can then be input to other security techniques such as encryption, a Digital Signature Algorithm (DSA) and others which generates or verifies a security mechanism for the message. SHA-512 outputs a 512-bit message digest. The Secure Hash Standard, FIPS PUB 180-1, Apr. 17, 1995, is incorporated herein by reference.

Message Digest-5 (MD-5) takes as input a message of arbitrary length and produces as output a 128-bit "message digest" of the input. The MD5 algorithm is intended for digital signature applications, where a large file must be "compressed" in a secure manner before being encrypted with a private (secret) key under a public-key cryptosystem such as RSA. The IETF RFC-1321, entitled "The MD5 Message-Digest Algorithm" is incorporated here by reference.

Providing a way to check the integrity of information transmitted over or stored in an unreliable medium such as a wireless network is a prime necessity in the world of open computing and communications. Mechanisms that provide such integrity check based on a secret key are called "message authentication codes" (MAC). Typically, message authentication codes are used between two parties that share a secret key in order to validate information transmitted between these parties.

Keyed Hashing for Message Authentication Codes (HMAC), is a mechanism for message authentication using cryptographic hash functions. HMAC is used with any iterative cryptographic hash function, e.g., MD5, SHA-1, SHA-512, etc. in combination with a secret shared key. The cryptographic strength of HMAC depends on the properties of the underlying hash function. The IETF RFC-2101, entitled "HMAC: Keyed-Hashing for Message Authentication" is incorporated here by reference.

An Electronic Code Book (ECB) is a mode of operation for a "block cipher," with the characteristic that each possible block of plaintext has a defined corresponding cipher text value and vice versa. In other words, the same plaintext value will always result in the same cipher text value. Electronic Code Book is used when a volume of plaintext is separated into several blocks of data, each of which is then encrypted independently of other blocks. The Electronic Code Book has the ability to support a separate encryption key for each block type.

Diffie and Hellman (DH) describe several different group methods for two parties to agree upon a shared secret in such a way that the secret will be unavailable to eavesdroppers. This secret is then converted into various types of cryptographic keys. A large number of the variants of the DH method exist including ANSI X9.42. The IETF RFC-2631, entitled "Diffie-Hellman Key Agreement Method" is incorporated here by reference.

However, the present invention is not limited to the security or encryption techniques described and other security or encryption techniques can also be used.

The HyperText Transport Protocol (HTTP) Secure (HTTPs), is a standard for encrypted communications on the World Wide Web. HTTPs is actually just HTTP over a Secure Sockets Layer (SSL). For more information on HTTP, see IETF RFC-2616 incorporated herein by reference.

The SSL protocol is a protocol layer which may be placed between a reliable connection-oriented network layer protocol (e.g. TCP/IP) and the application protocol layer (e.g. HTTP). SSL provides for secure communication between a source and destination by allowing mutual authentication, the use of digital signatures for integrity, and encryption for privacy.

The SSL protocol is designed to support a range of choices for specific security methods used for cryptography, message digests, and digital signatures. The security method are negotiated between the source and destination at the start of establishing a protocol session. The SSL 2.0 protocol specification, by Kipp E. B. Hickman, 1995, is incorporated herein by reference Transport Layer Security (TLS) provides communications privacy over the Internet. The protocol allows client/server applications to communicate over a transport layer (e.g., TCP) in a way that is designed to prevent eavesdropping, tampering, or message forgery. For more information on TLS see IETF RFC-2246, incorporated herein by reference.

Device Based Location

Figure 2:
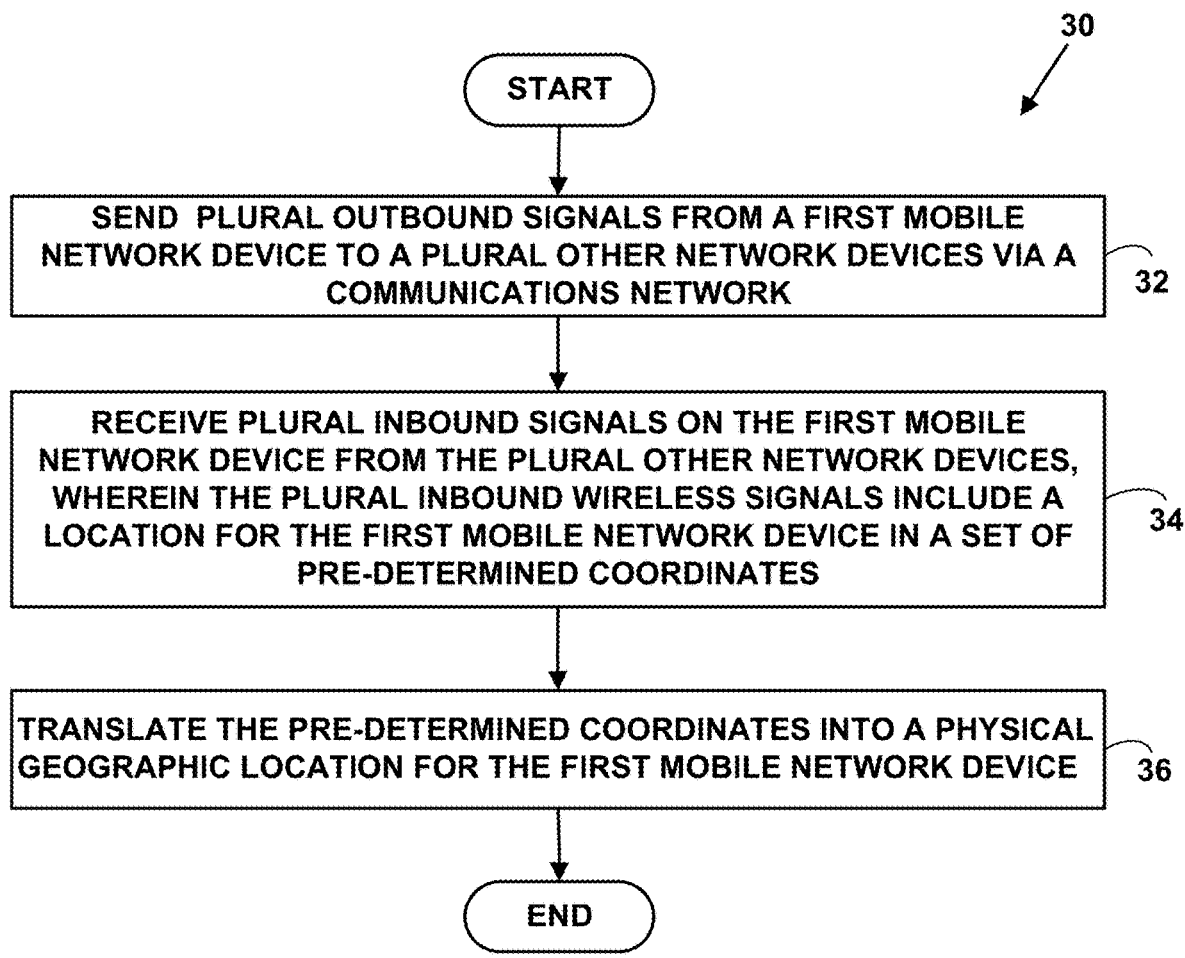
FIG. 2 is a flow diagram illustrating a method for locating a device.

FIG. 2 is a flow diagram illustrating a Method 30 for locating a device. At Step 32, plural outbound signals are sent from a first mobile network device to a plural other network devices via a communications network. At Step 34, the first mobile network device receives plural inbound wireless signals from the plural other network devices. The plural inbound wireless signals include a location for the first mobile network device in a set of pre-determined coordinates. At Step 36, the pre-determined coordinates are translated into a physical geographic location for the first mobile network device.

Method 30 is illustrated with one exemplary embodiment. However, the present invention is not limited to such an embodiment and other embodiments can also be used to practice the invention.

In such an exemplary embodiment at Step 32, plural outbound signals are sent from a first mobile network device 12, 14, 16 to a plural other network devices 20, 22, 24 via a communications network 18. In one embodiment, the plural outbound signals are plural outbound wireless signals. In one embodiment the plural outbound signals include SIP messages with geo-location headers and/or message bodies which may include SDP messages.

At Step 34, the first mobile network device 12, 14, 16 receives plural inbound wireless signals from the plurality of other network devices 20, 22, 24. In one embodiment the plural inbound wireless signals include HELD, HELD+, SIP or SDP protocol messages with a geo-location information.

The plural inbound wireless signals include a location for the first mobile network device 12, 14, 16 in a set of pre-determined coordinates. In one embodiment, the set of pre-determined coordinates are three dimensional (3D) (X, Y, Z) (i.e., horizontal (e.g., east, west, etc.), vertical (e.g., north, south, etc.) and/or height, depth, elevation, speed, velocity, acceleration, de-acceleration, temperature, barometric and/or other pressure components) and/or two dimensional (2D) (X, Y) space coordinates (i.e., horizontal and vertical components), which are also called "geo-coordinates."

In one embodiment, the 3D coordinates also include three dimensional Cartesian coordinates. A Cartesian coordinate system is a coordinate system that specifies each point uniquely in a plane by a pair of numerical coordinates, which are the signed distances from the point to two fixed perpendicular directed lines, measured in the same unit of length. Each reference line is called a coordinate axis or just axis of the system, and the point where they meet is its origin, usually at ordered pair (0, 0). The coordinates can also be defined as the positions of the perpendicular projections of the point onto the two axes, expressed as signed distances from the origin. However, the present invention is not limited to Cartesian coordinates and other 3D coordinates can also be used to practice the invention.

At Step 36, the pre-determined coordinates are translated into a physical geographic location for the first mobile network device including, but not limited to, a location in an urban or rural area, a desk and/or cubicle in a room on a building floor, a building floor in a building, a building on a street, enterprise, campus, village, town, city, state, country or continent or other global region, etc. As described herein, the physical geographic address is not a physical or data link layer address, but instead a location-based address.

In one embodiment, the location information is constantly updated in real-time (e.g., milliseconds, seconds, etc.) In another embodiment, the location information is updated in non-real-time time frames (e.g., hours, days, etc.). If the first mobile network device moves, a notification is sent to the other network devices 20, 22, 24 via the communications network.

In one embodiment, the location information is updated via a triggered event such as a change in IP address, etc. However, the present invention is not limited to such an embodiment and the invention can be practiced without this type of location information update.

Thus, the target device 12, 14, 16 always knows its geo-location. If the target device 12, 14, 16 is a dumb device, a location server 20, 22, 24 acts a proxy for the dumb device and the location server, 22, 22, 24 always know the geo-location of the dumb device even though the dumb device may not know its own location.

In one embodiment, the first mobile network device 12, 14 includes application 26 as software on a Universal Serial Bus (USB) device that is plugged into the device. In one embodiment, the USB device includes a wireless radio transceiver chip. In another embodiment, the first mobile network device 12, 14 may already include a wireless radio transceiver. In such an embodiment, the USB device may only include application 26.

In one embodiment, The USB port provides the power to the transceiver chip. The transceiver chip uses low power "heartbeat" communications with wireless transceivers that are strategic located throughout an enterprise, building, campus, village, town, city, state, country or continent or other global region. Software application 26 in the USB device processes the return signals from the other wireless transceivers in such way as to determine the location of the first mobile network device 12, 14, 16 in geo-space.

Emergency Device Based Location

Figure 3:
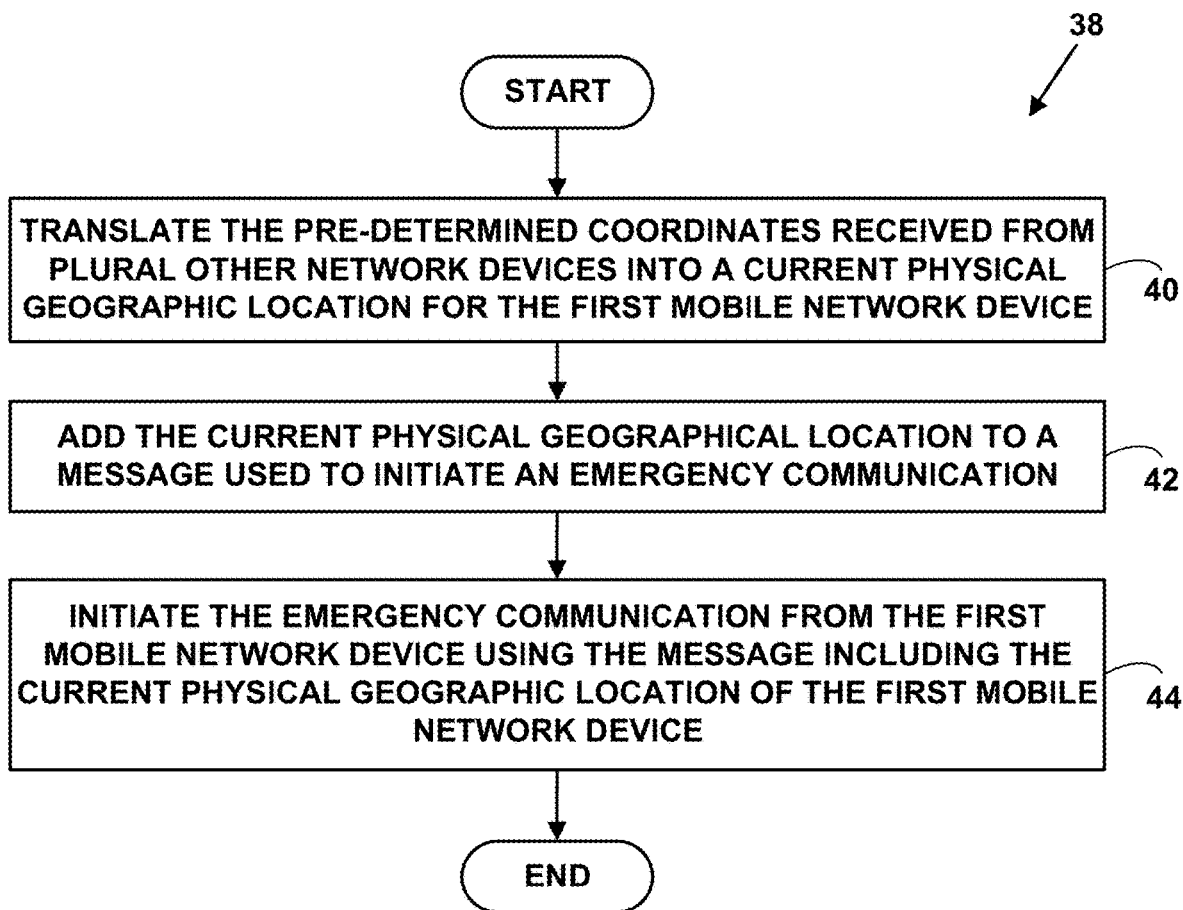
FIG. 3 is a flow diagram illustrating a method for locating a device in an emergency.

FIG. 3 is a flow diagram illustrating a Method 38 for locating a device in an emergency. At Step 40, a set of pre-determined coordinates received from plural other network devices are translated into a current physical geographic location for a first mobile network device. At Step 42, the physical geographical location is added to a message used to initiate an emergency communication. At Step 44, the emergency communication is initiated from the first mobile network device using the message including the physical geographic location of the first mobile network device.

Method 38 is illustrated with one exemplary embodiment. However, the present invention is not limited to such an embodiment and other embodiments can also be used to practice the invention.

In such an exemplary embodiment at Step 40, a set of coordinates in geo-space received from plural other network devices 20, 22, 24 are translated into a current physical geographic location for a first mobile network device, 12, 14 16.

In one embodiment, the current physical geographic location for the first mobile network device 12, 14, 16, includes, but not limited to, a room on a building floor, a building floor in a building, a building on a street, enterprise, campus, village, town, city, state, country or continent or other global region, etc.

At Step 42, the current physical geographical location is added to a SIP geo-location header and/or message body used to initiate an E911 emergency communication.

E911 stands for "Enhanced 911" which is a system that provides a data event (i.e., including location information, etc.) along with a voice event (i.e., an emergency voice call, etc.) or a data event (e.g., text-to-911, etc.).

At Step 44, the E911 emergency communication is initiated from the first mobile network device 12, 14, 16 using the SIP geo-location header and/or message body including the physical geographic location of the first mobile network device 12, 14, 16.

Figure 4:
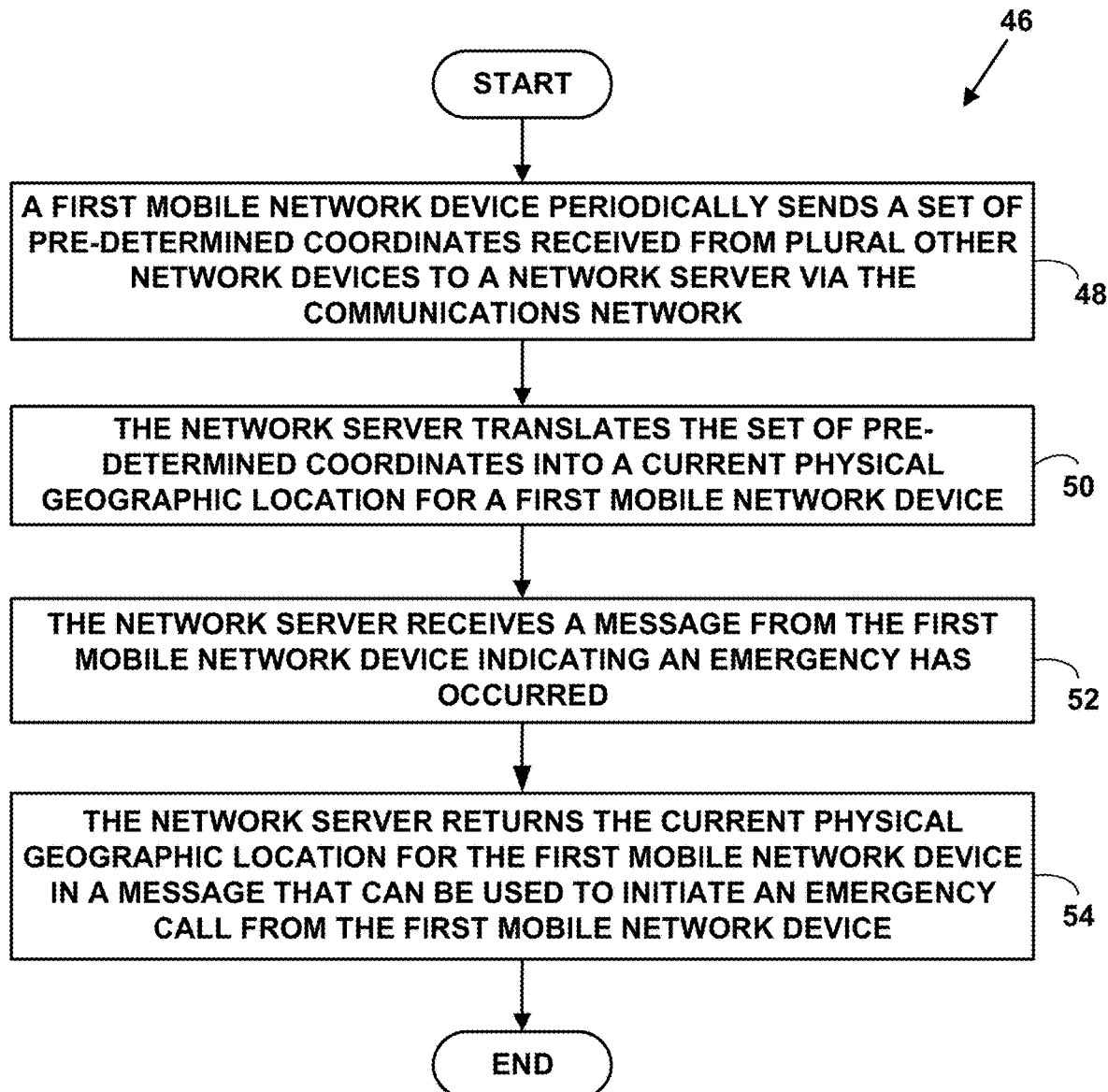
FIG. 4 is a flow diagram illustrating a method for locating a device.

FIG. 4 is a flow diagram illustrating a Method 46 for locating a device. At Step 48, a first mobile network device periodically sends a set of pre-determined coordinates received from plural other network devices to a network server via a communications network. At Step 50, the network server translates the set of pre-determined coordinates into a current physical geographic location for a first mobile network device. At Step 52, the network server receives an emergency message from the first mobile network device indicating an emergency has occurred. At Step 54, the network server returns the current physical geographic location for the first mobile network device in a message.

Method 46 is illustrated with one exemplary embodiment. However, the present invention is not limited to such an embodiment and other embodiments can also be used to practice the invention.

In such an exemplary embodiment at Step 48, a first mobile network device 12, 14, 16 periodically sends a set of geo-space coordinates received from plural other network devices 20, 22 to a network server 24 via the communications network 18.

For example, the first mobile network device 12, 14, 16 periodically updates, either on a scheduled basis or on an event basis (e.g., physical movement of the device) its r geo-coordinates to a centralized location tracing management system 24 using HTTP, IP, cellular, RFID, 802.xx.xx, or other wireless or other data transmission protocols.

At Step 50, the network server 24 translates the set of geo-space coordinates into a current physical geographic location for a first mobile network device 12, 14, 16.

The centralized management tracing system 24 translates the geo-space coordinates into a current physical geographic location that can be responded to by emergency responders such a police, fire, military, etc. The centralized management tracing system 24 also provides access to current physical geographic location information via the communications network 18 with a web-interface or other interface useable by emergency personnel.

At Step 52, the network server 24 receives an emergency message from the first mobile network device 12, 14, 16 indicating an emergency event has occurred.

In one embodiment, at Step 54, the network server 24 returns the current physical geographic location for the first mobile network device 12, 14, 16 in a SIP geo-location header and/or message body that can be used to initiate an E911 emergency call from the first mobile network device 12, 14, 16.

In another embodiment, upon an emergency call, the centralized management tracing system 24 provides the current physical geographic location of the first network device 12, 14, 16 back to the first mobile network device in a message other than a SIP geo-location header and/or message body (e.g., IP, IM, cellular, 802.xx.xx, RFID, etc.).

In another embodiment, the centralized management tracing system 24 also provides the current physical geographic location of the first mobile network device 12, 14, 16 to emergency personnel using a variety of methods including, but not limited to those illustrated in Table 1.

TABLE 1 a. Providing a SIP messages to initiate an E911 communications to communications network 18 for the first mobile network device 12, 14, 16, that describes the physical location of the first mobile network device 12, 14, 16; or
b. Updating tables in call servers and network edge devices on the communications network 18 used by the 911, E911 and/or Next Generation (NG)-911 system to process an E911 communications from a mobile network device to allow the first mobile network device 12, 14, 16, to be located when it initiates an E911 communications.

Locating a Device Using Existing Wireless Networks

Figure 5:
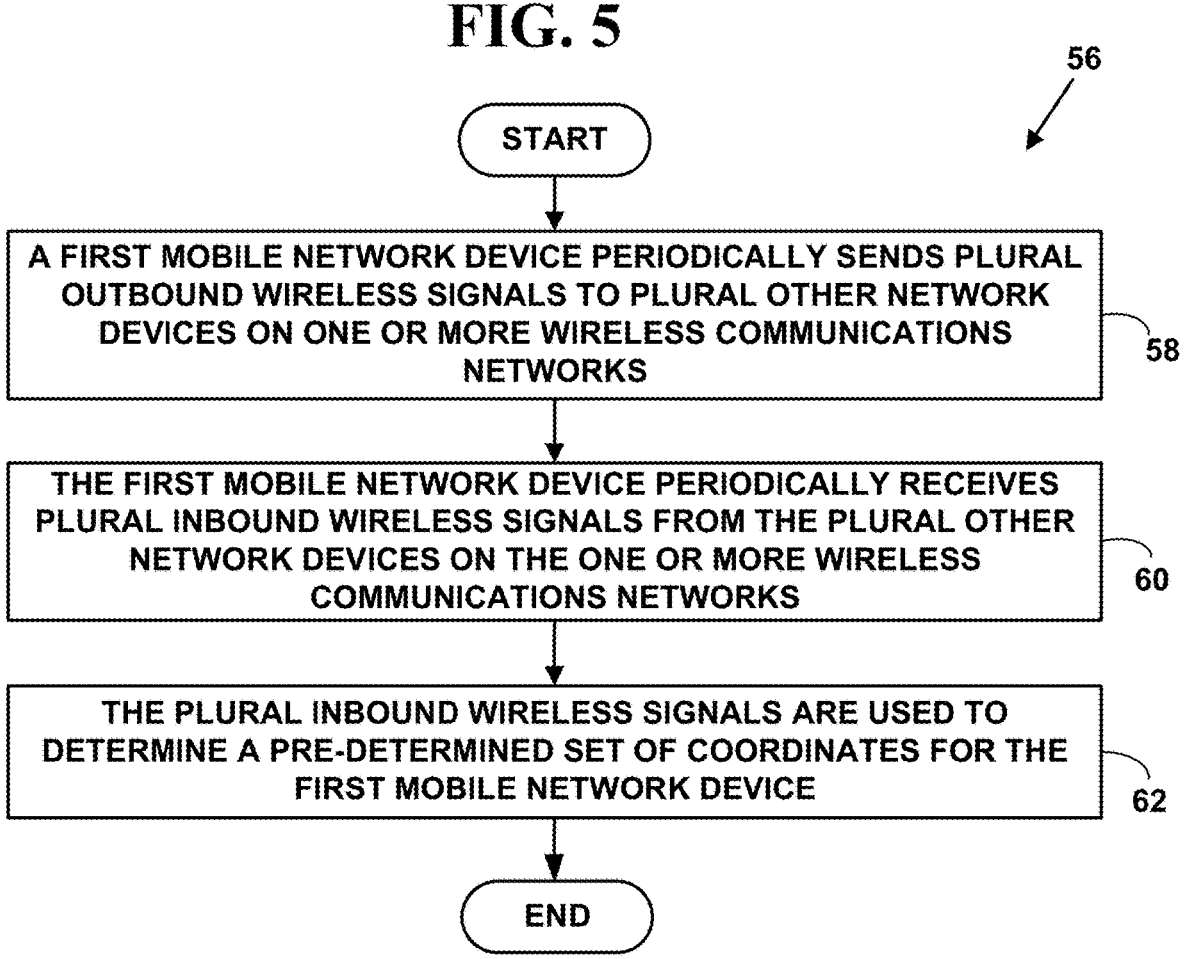
FIG. 5 is a flow diagram illustrating a method for locating a device using existing wireless networks.

FIG. 5 is a flow diagram illustrating a Method 56 for locating a device using existing wireless networks. At Step 58, a first mobile network device periodically sends plural outbound wireless signals to plural other network devices on one or more wireless communications networks. At Step 60, the first mobile network device periodically receives plural inbound wireless signals from the plural other network devices on the one or more wireless communications networks. At Step 62, the plural inbound wireless signals are used to determine a pre-determined set of coordinates for the first mobile network device.

Method 56 is illustrated with one exemplary embodiment. However, the present invention is not limited to such an embodiment and other embodiments can also be used to practice the invention.

In such an exemplary embodiment at Step 58, a first mobile network device 12, 14, 16 periodically sends plural outbound wireless signals to plural other network devices 20, 22, 24 on one or more wireless communications networks 18.

At Step 60, the first mobile network device 12, 14, 16 periodically receives plural inbound wireless signals from the plural other network devices 20, 22, 24 on the one or more wireless communications networks 18.

At Step 62, the plural inbound wireless signals are used to determine a set of coordinates in geo-space for the first mobile network device 12, 14, 16.

In one embodiment, a transceiver chip in the first mobile network device 12, 14, 16, is used to poll existing Wi-Fi, Wi-Fi Aware, WiMax, 802.xx.xx, cellular, Bluetooth beacons, RFID, mesh and other wireless networks to determine its geo-space. The application 26 uses a variety of methods to determine location in geo-space including triangulation, signal strength, orthogonality, etc. The location is constantly updated and the first mobile network device 12, 14, 16 always knows its geo-location.

"Triangulation" is the process of determining a location of a point by measuring angles to it from known points at either end of a fixed baseline, rather than measuring distances to the point directly (e.g., trilateration). The point can then be fixed as the third point of a triangle with one known side and two known angles.

"Orthogonality" is process of relating two signal at right angles to one another (i.e., perpendicularity, etc.), and the generalization of this relation into N-dimensions; and to a variety other relations non-overlapping, independent objects of some kind.

In one embodiment, the plural inbound wireless signals are used for Peer-to-Peer location determination of other network devices on the communications network.

Figure 6:
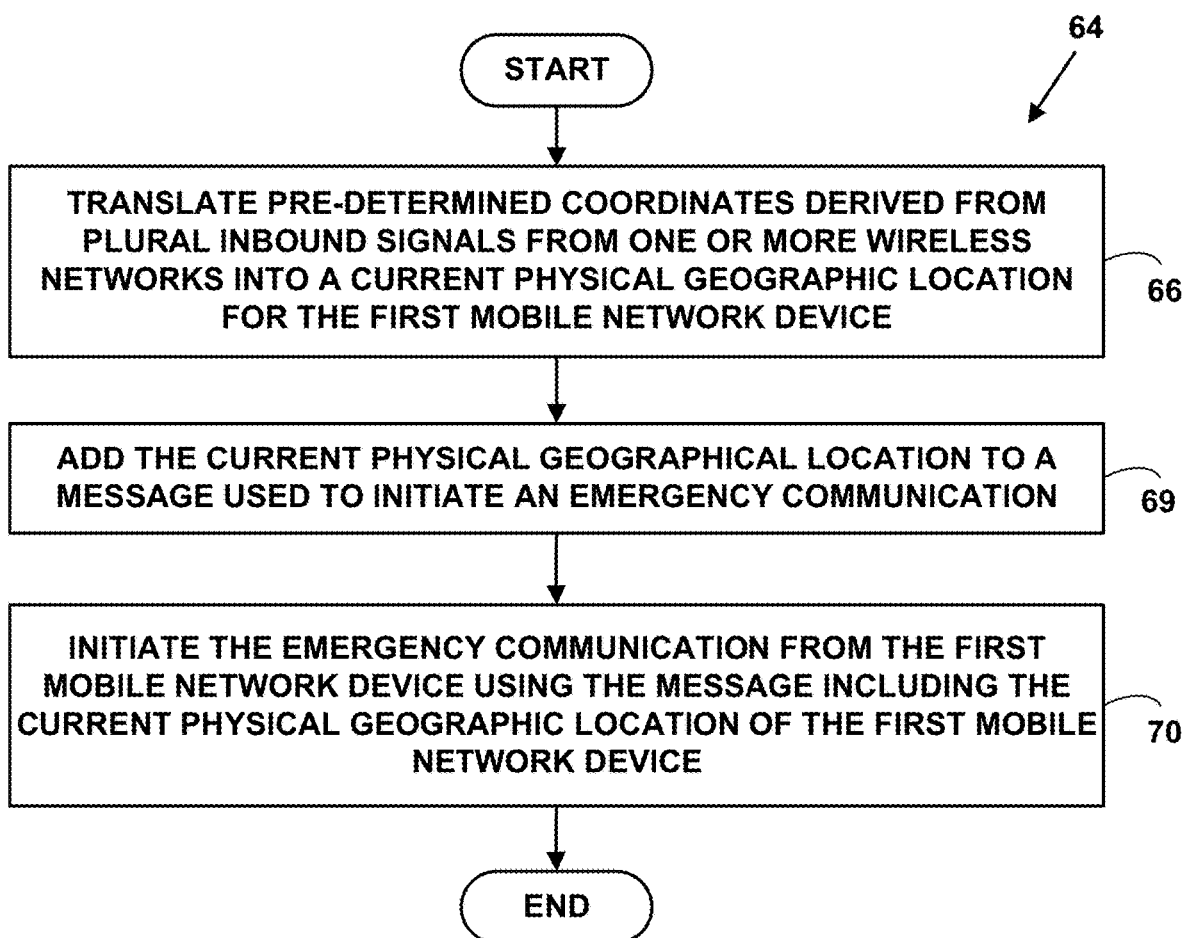
FIG. 6 is a flow diagram illustrating a method for locating a device in an emergency.

FIG. 6 is a flow diagram illustrating a Method 64 for locating a device in an emergency. At Step 66, a set of pre-determined coordinates determined from plural received inbound wireless signals are translated into a current physical geographic location for a first mobile network device. At Step 68, the physical geographical location is added to a message used to initiate an emergency communication. At Step 70, the emergency communication is initiated from the first mobile network device using the message including the physical geographic location of the first mobile network device.

Method 64 is illustrated with one exemplary embodiment. However, the present invention is not limited to such an embodiment and other embodiments can also be used to practice the invention.

In such an exemplary embodiment at Step 66 a set of coordinates in geo-space is determined from plural received inbound wireless signals are translated into a current physical geographic location for a first mobile network device 12, 14, 16.

At Step 68, the physical geographical location is added to a SIP geolocation header and/or message body used to initiate an emergency E911 communication.

At Step 70, the E911 emergency communication is initiated from the first mobile network device 12, 14, 16 using the SIP geo-location header and/or message body including the physical geographic location of the first mobile network device 12, 14, 16.

Figure 7:
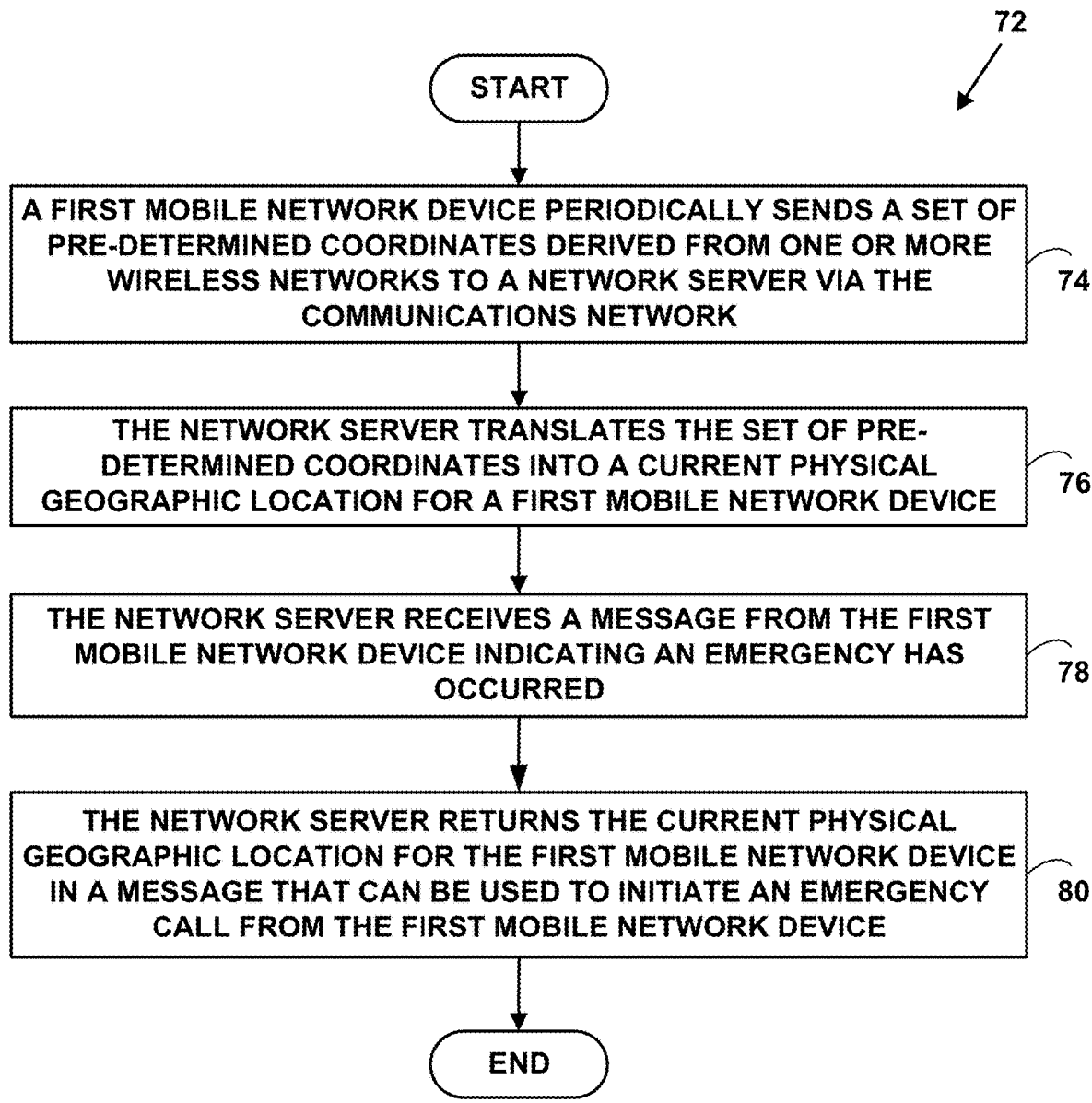
FIG. 7 is a flow diagram illustrating a method for locating a device in an emergency.

FIG. 7 is a flow diagram illustrating a Method 72 for locating a device in a emergency. At Step 74, a first mobile network device periodically sends a set of pre-determined coordinates derived from one or more other wireless networks to a network server via a communications network. At Step 76, the network server translates the set of pre-determined coordinates into a current physical geographic location for a first mobile network device. At Step 78, the network server receives an emergency message from the first mobile network device indicating an emergency has occurred. At Step 80, the network server returns the current physical geographic location for the first mobile network device in a message.

Method 72 is illustrated with one exemplary embodiment. However, the present invention is not limited to such an embodiment and other embodiments can also be used to practice the invention.

In such an exemplary embodiment at Step 74, a first mobile network device 12, 14, 16 periodically sends a set of coordinates in geo-space derived from one or more other wireless communications networks 18.

For example, the first mobile network device 12, 14, 16 periodically updates, either on a scheduled basis or on an event basis (e.g., physical movement of the device) its geo-coordinates to a centralized location tracing management system 24 using HTTP, IP, SIP, SDP, or other wireless or other data transmission protocols.

At Step 76, the network server 24 translates the set of geo-space coordinates into a current physical geographic location for a first mobile network device 12, 14, 16.

The centralized management tracing system 24 translates the X,Y and Z coordinates into a current physical geographic location that can be responded to by emergency responders such a police, fire, emergency medical service, military, etc. The centralized management tracing system 24 also provides access to current physical geographic location information via the communications network 18 with a web-interface or other interface useable by emergency personnel.

At Step 78, the network server 24 receives an emergency message from the first mobile network device 12, 14, 16 indicating an emergency has occurred.

In one embodiment, at Step 80, the network server 24 returns the current physical geographic location for the first mobile network device 12, 14, 16 in a SIP geo-location header and/or message body that can be used to initiate an E911 emergency call from the first mobile network device 12, 14, 16.

In another embodiment, upon an emergency call, the centralized management tracing system 24 provides the current physical geographic location of the first network device 12, 14, 16 back to the first mobile network device in a message other than a SIP message (e.g., IP, etc.).

In another embodiment, the centralized management tracing system 24 also provides the current physical geographic location of the first mobile network device 12, 14, 16 to emergency personnel using a variety of methods including, but not limited to those illustrated in Table 2.

TABLE 2 a. Providing a SIP geo-location header and/or message bodies to initiate an E911 communications to communications network 18 for the first mobile network device 12, 14, 16, that describes the physical location of the first mobile network device 12, 14, 16; or b. Updating tables in call servers and network edge devices on the communications network 18 used by the E911 system to process an E911 communications from a mobile network device to allow the first mobile network device 12, 14, 16, to be located when it initiates an E911 communications.

Emergency Location Information Service (E-LIS)

Figure 8:
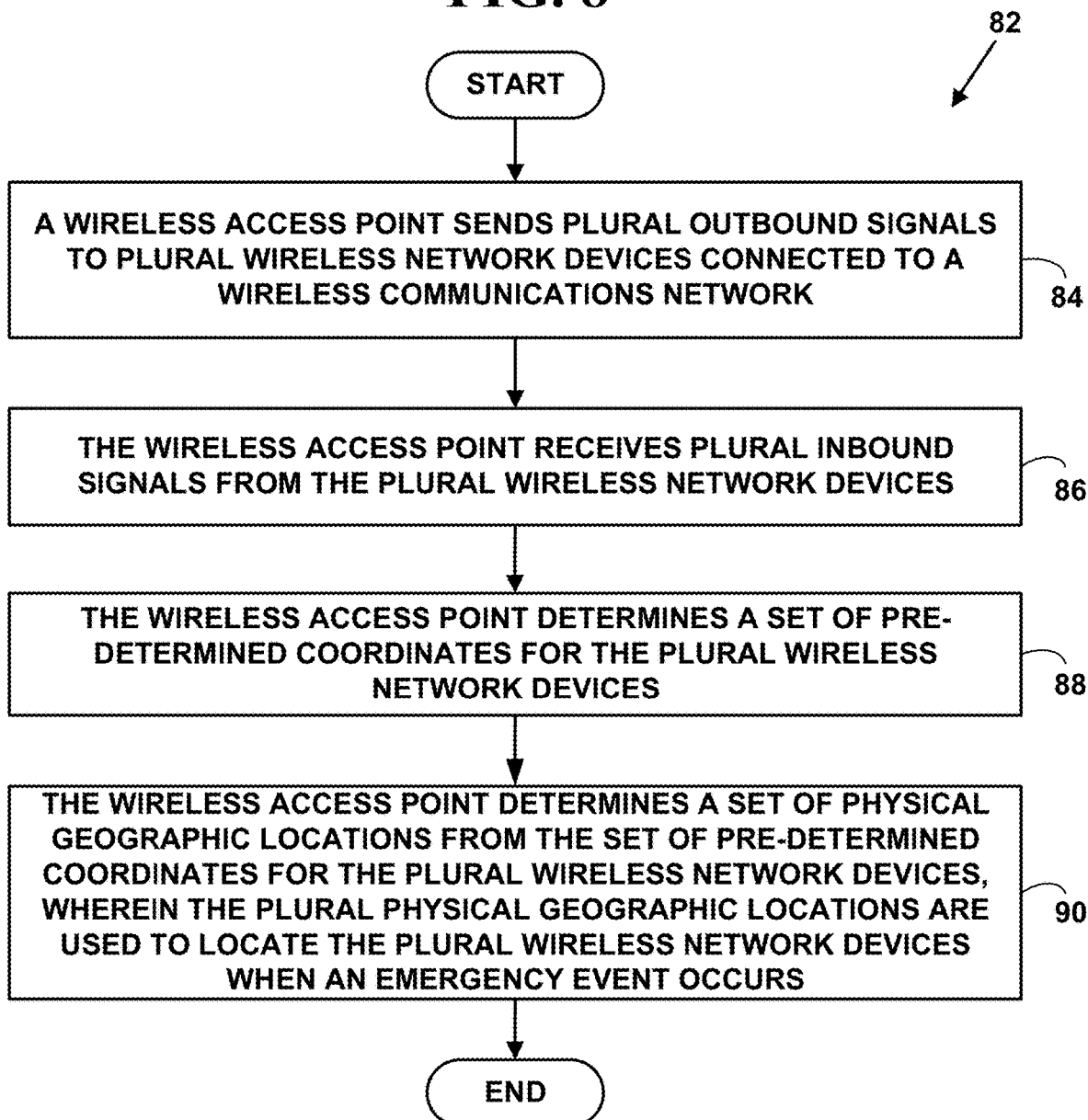
FIG. 8 is a flow diagram illustrating a method for locating a device using existing wireless networks.

FIG. 8 is a flow diagram illustrating a Method 82 for locating a device using existing wireless networks. At Step 84, a wireless access point sends plural outbound signals to plural wireless network devices connected to a wireless communications network. At Step 86, the wireless access point receives plural inbound signals from the plural wireless network devices. At Step 88, the wireless access point determines a set of pre-determined coordinates for the plural wireless network devices. At Step 90, the wireless access point determines a set of physical geographic locations using the determined set of pre-determined coordinates for the plural wireless network devices. The plural physical locations are used to locate the plural wireless network devices when an emergency event occurs.

In one embodiment, Method 82 further includes Step 91. At Step 91, the wireless access point sends the set plural physical locations for the plural network networks to a server device to allow a physical geographic location to be determined for the plural network devices. However, Method 82 can be practiced with or without Step 91.

Method 82 is illustrated with one exemplary embodiment. However, the present invention is not limited to such an embodiment and other embodiments can also be used to practice the invention.

In such an exemplary embodiment at Step 84, a wireless access point 24 sends plural outbound signals to plural wireless network devices 12, 14, 16 connected to a wireless communications network 18.

In one embodiment the plural outbound signals include plural SIP geo-location header and/or message bodies or other protocol messages.

In one embodiment the wireless access point 24 includes a server device. In another embodiment, the wireless access point 24 does not include a server device. In such an embodiment the wireless access point 24 comprises a proxy for dumb devices.

In one embodiment, the plural wireless network devices 12, 14, 16 include unique identifiers. (e.g., IP and MAC address, MAC address, URI, etc.). At Step 86, the wireless access points sends out the plural outbound signals to "ping" the plural network devices device and then measures a return signal strength, a return time delay, a return orthogonal to determine the geo-coordinates of the plural wire network devices. In such an embodiment, the plural wireless network devices periodically send out an electronic heartbeat with a timestamp to the wireless access point via the communications network 18. However, the present invention is not limited to this embodiment and other embodiments can also be used to practice the invention.

At Step 86, the wireless access point 24 receives plural inbound signals from the plural wireless network devices 12, 14, 16.

In one embodiment, the plural inbound signals and plural outbound signals include, but are not limited to, SIP, SDP, IP, MAC, CMRS, cellular telephone, PCS, PCN, GSM, GPRS, CDPD, WAP DAB, Wi-Fi, Wi-Fi Aware, Bluetooth, WiMAX, IEEE 802.11xx, GPS, GPS map, DGPS, IM, SMS, RFID or Zigbee signals. However, the present invention is not limited to this embodiment and other inbound and outbound signals can be used to practice the invention.

However, the present invention is not limited to this embodiment and other inbound and outbound signals can be used to practice the invention.

In one embodiment at Step 90, the wireless access point 24 determines a set of geo-coordinates and an identifier including an IP address and a MAC address for the plural wireless network devices 12, 14, 16.

In another embodiment, at Step 90, the wireless access point 24 determines a set of geo-coordinates using a unique identifier pre-assigned to the plural wireless network devices 12, 14, 16. This unique identifier does not include an IP address or a MAC address. In one embodiment the unique identifier is included in an E-Location Object.

In one embodiment, the E-Location Object includes an Extensible Markup Language (XML) object extension to a Presence Information Data Format (e.g., PIDF-LO) as defined in RFC-4119, the information used in current presence-based systems, like IM (or SMS). For more information see IETF RFC-4119, incorporated by reference.

In another embodiment, the unique identifier includes a Uniform Resource Identifier (URI). A URI is a unique address of a network resource that is unique across the whole network it is used on. A URI is the unique identifier used to access the resource on a network.

In one embodiment a URI used herein for a network device 12, 14, 16 is unique across all wired and wireless communication networks the network device is used on.

In another embodiment, the unique identifier includes a specialized E911-based unique identifier. The specialized E911 identifier is similar to the URI but is emergency event specific. However, the present invention is not limited to these unique identifier and other identifiers can also be used to practice the invention.

At Step 90, the wireless access point 24 determines a set of physical geographic locations for the plural wireless network devices 12, 14, 16. The plural physical geographic locations are used to locate the plural wireless network devices when an emergency event occurs, such as an E911 call. In another embodiment, the plural physical geographic locations are used to locate the plural wireless network devices 12, 14, 16 during non-emergency situations.

In one embodiment, at Step 91, the wireless access point 20 sends a set of geo-coordinates and an identifier including an IP address and a MAC address for the plural network devices 12, 14, 16 to a server device 24 to allow a physical geographic location to be determined for the plural network devices 12, 14, 16 on the server device 24.

In another embodiment at Step 91, the wireless access point 20 sends the unique identifier for the plural network devices 12, 14, 16 to a server device 24 to allow a physical geographic location to be determined for the plural network devices 12, 14, 16 on the server device 24.

In such embodiments, both the wireless access point 20 and the server device 24 have physical geographic location of the plural network devices 12, 14, 16.

In another embodiment, Method 82 is practiced with wired devices, a wired access point and a wired communications network 18. In another embodiment, Method 82 is practiced with a combination of wireless and wired devices and wired and wireless communications networks.

In another embodiment, a geo-coordinates in (X, Y and/or Z) space is used in place of the physical geographic location. In such an embodiment, the geo-coordinates may be further translated or used by other devices to determine a device location.

Figure 9:
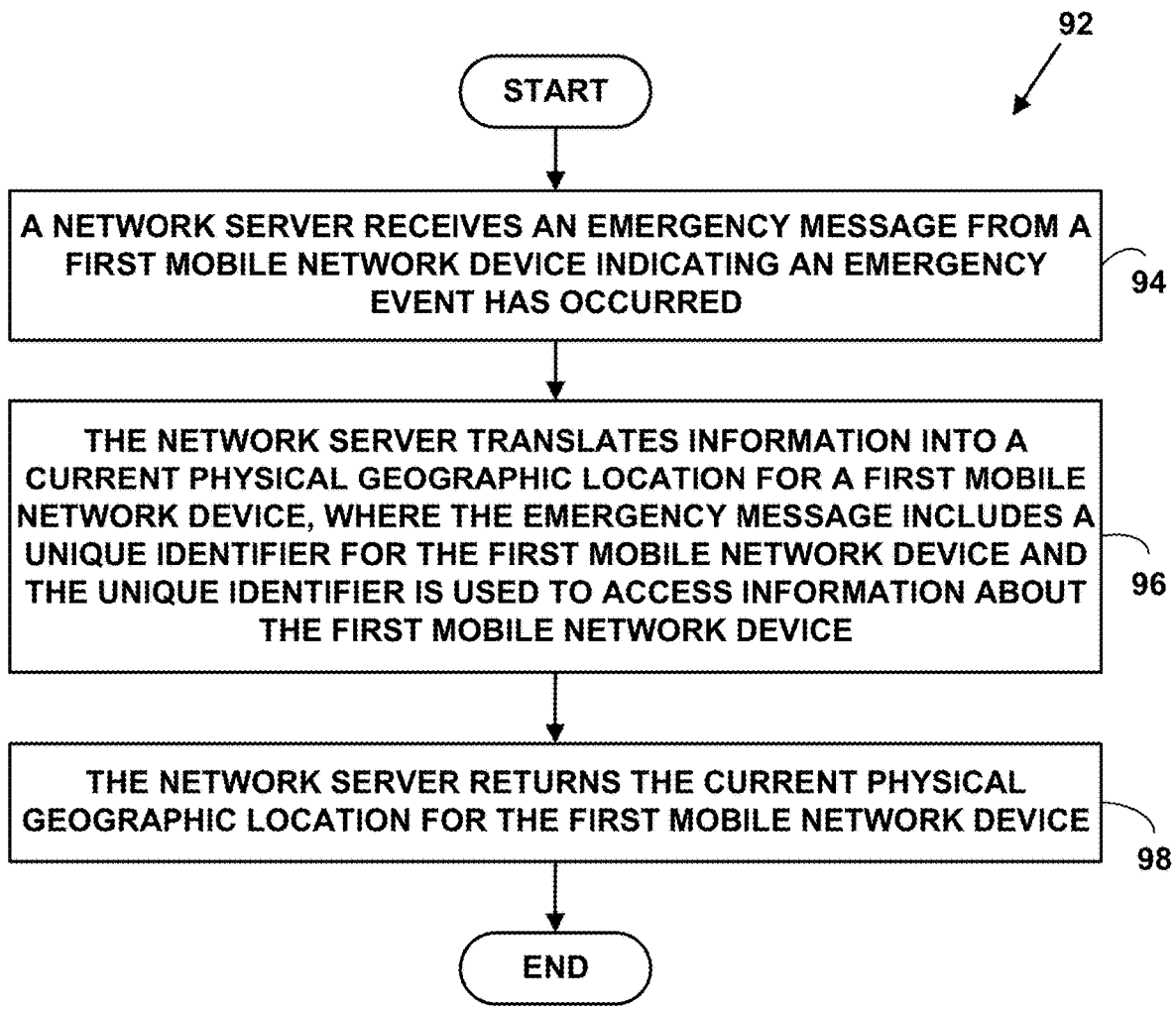
FIG. 9 is a flow diagram illustrating a method for locating a device in an emergency.

FIG. 9 is a flow diagram illustrating a Method 92 for locating a device in an emergency. At Step 94, a network server receives an emergency message from a first mobile network device via a communications network indicating an emergency event has occurred. At Step 96, the network server information translates information from the emergency message into a current physical geographic location for a first mobile network device. The emergency message includes a unique identifier for the first mobile network device and the unique identifier is used to access information about the first mobile network device. At Step 98, the network server returns the current physical geographic location for the first mobile network device in a signal via the communications network.

Method 92 is illustrated with one exemplary embodiment. However, the present invention is not limited to such an embodiment and other embodiments can also be used to practice the invention.

In such an exemplary embodiment at Step 94, a network server 24 receives an emergency message from a first mobile network device (e.g., 12) via the communications network 18 indicating an emergency event (e.g., fire, accident, injury, criminal event, etc.) has occurred.

In one embodiment, the emergency message is a E911 communication event. In another embodiment, the emergency message is a non-emergency message.

In one embodiment the emergency message includes a SIP geo-location header and/or message body with a geo-location header. The geo-location header includes a PIDF-LO extension (i.e., RFC-4119) for the device. When a PIDF-LO is present, the header will indicate to SIP proxies along the call path where in the message body the PIDF-LO can be found, otherwise the geo-location header will have the SIP URI (i.e., address) of the E-LIS where the device's location is stored.

In another embodiment, the emergency message includes a SIP geo-location header and/or message body without a PIDF-LO extension. In another embodiment, the emergency message includes an E911 message.

In another embodiment, the PIDF-LO includes Emergency Location-By-Reference (LbR). In this embodiment, an actual location is not returned but a reference key to the actual location (e.g., a URI, etc.) is returned instead. When the LbR key is presented to the E-LIS system, it is dereferenced into an actual physical geographic location. Using an LbR method prevents modification by anyone (or anything, etc.) other than authorized emergency entities. It also prevents misuse by eavesdropping by hackers, etc.

At Step 96, the network server 24 translates information from the emergency message into a current physical geographic location for a first mobile network device 12.

In one embodiment, the network server 24 translates a set of coordinates in geo-space in the emergency message or retrieves from database 24' a set of previously stored coordinates for the first mobile network device 12 and the unique identifier includes an IP address and MAC address into a current physical geographic location for the first mobile network device 12, and writes this information back to the first mobile network device 12 in a management data message or management data stream over the wireless communications network 18.

In another embodiment, the network server 24 translates the unique identifier for the first mobile network device 12 into a current physical geographic location for the first mobile network device 12. The unique identifier includes a URI for the first mobile network device 12.

In another embodiment, the network server 24 translates a unique identifier for the first mobile network device 12 into a current physical geographic location for the first mobile network device 12 and the unique identifier is used for a look-up of a ten digit emergency location identification number (ELIN) number that will be sent out in the event of a E911 call for the first mobile network device 12.

In another embodiment, the network server 24 translates a set of coordinates in geo-space in the emergency message or retrieves from database 24' a set of previously stored current physical geographical location for the first mobile network device 12 and writes this information back to the first mobile network device 12 in a management data stream over the wireless communications network 18.

In another embodiment, the first mobile network device is a first non-mobile network device.

In one embodiment, the emergency message is an emergency message sent over a wireless interface. In one embodiment, the wireless interfaces include, but are not limited to, CMRS, cellular telephone, PCS, PCN, GSM, GPRS, CDPD, WAP DAB, Wi-Fi, Wi-Fi Aware, WiMAX, IEEE 802.11xx, GPS, GPS map, DGPS, IM, SMS, RFID or Zigbee wireless interfaces. However, the present invention is not limited to this embodiment and other wireless interfaces can be used to practice the invention.

In another embodiment, the emergency message is an emergency message sent over a wired interface. In another embodiment, the emergency message is an non-emergency message.

Figure 10:
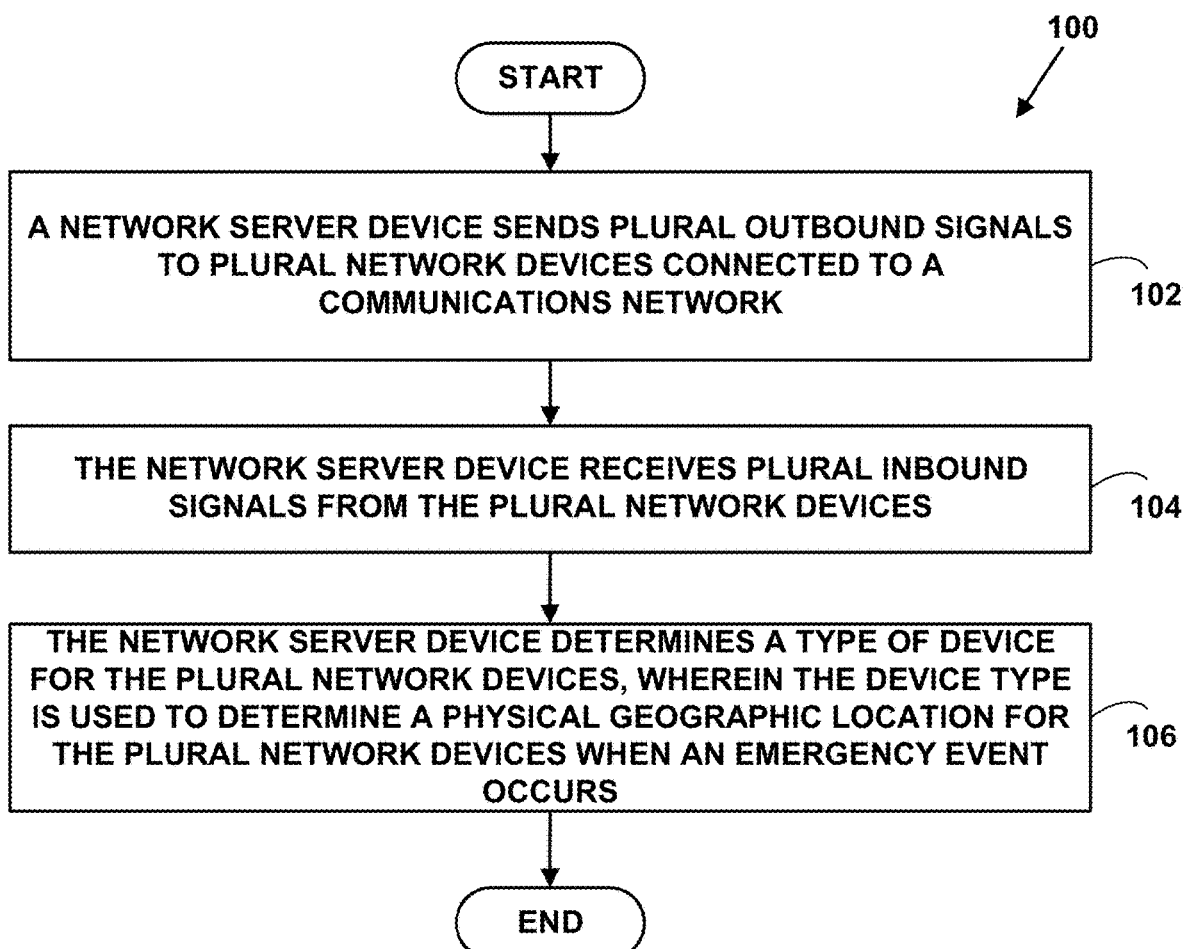
FIG. 10 is a flow diagram illustrating a method for an emergency location information service (E-LIS)

FIG. 10 is a flow diagram illustrating a Method 100 for an emergency location information service (E-LIS). At Step 102, a network server device sends plural outbound signals to plural network devices connected to a communications network. At Step 104, the network server device receives plural inbound signals from the plural network devices. At Step 106, the network server device determines a type of device for the plural network devices. The type of device is used to determine a physical geographic location for the plural network devices when an emergency event occurs.

Method 100 is illustrated with one exemplary embodiment. However, the present invention is not limited to such an embodiment and other embodiments can also be used to practice the invention.

In one embodiment, the plural inbound and outbound signals include, but are not limited to, SIP geo-location header and/or message bodies.

In one embodiment the plural outbound and plural inbound signals are sent securely to and received securely from the communications network 18.

In one embodiment, plural inbound and outbound signals comprise wireless signals include, but are not limited to, CMRS, cellular telephone, PCS, PCN, GSM, GPRS, CDPD, WAP, DAB, Wi-Fi, Wi-Fi Aware, Bluetooth, WiMAX, IEEE 802.11xx, GPS, GPS map, DGPS, IM, SMS, RFID or Zigbee wireless signals.

In one embodiment, the plural inbound and outbound signals comprise wired signals include, but are not limited to, Cable Television (CATV), High Definition Television (HDTV), DSL, ADSL, VDSL, etc., coaxial or fiber optic signals.

In such an exemplary embodiment, at Step 102 a network server device 24 sends plural outbound signals to plural wired or wireless target network devices 12, 14, 16 connected to a wired or wireless communications network 18.

At Step 104, the network server device 24 receives plural inbound signals from the plural target network devices 12, 14, 16.

In one embodiment at Step 106, the network server device 24 determines a device type for the plural wireless or wired target network devices 12, 14, 16 to allow a current physical geographic location to be determined for the plural wireless or wired target network devices 12, 14, 16 in an emergency event situation.

In one embodiment, at Step 106, the network server device 24 determines a device type using at least the items illustrated in Table 3.

TABLE 3

| | |
|---|---|
| a. | a location determination of IP and SIP softphone client devices external to an enterprise network. |
| b. | a location determination of IP and SIP devices within an enterprise data network. |
| c. | a location determination of IP and SIP devices on Wi-Fi, Wi-Fi Aware, WiMAX other 802.xx.xx networks. |
| d. | a location determination for IP and SIP devices using location positioning chipsets (GPS, etc.). |
| e. | a location determination for geo-coordinate devices on wireless networks |
| f. | a location determination for geo-coordinate devices on wired networks |

In on embodiment, the device type includes a smart network device that stores its own location information or a dumb target network device that does not store its own location information. If the device type is a dumb target network device, then the server network device includes a proxy server device to store location information for the dumb target network device.

In one embodiment, the emergency event is an E911 communication event. In another embodiment, the emergency message is an non-emergency event.

Figure 11:
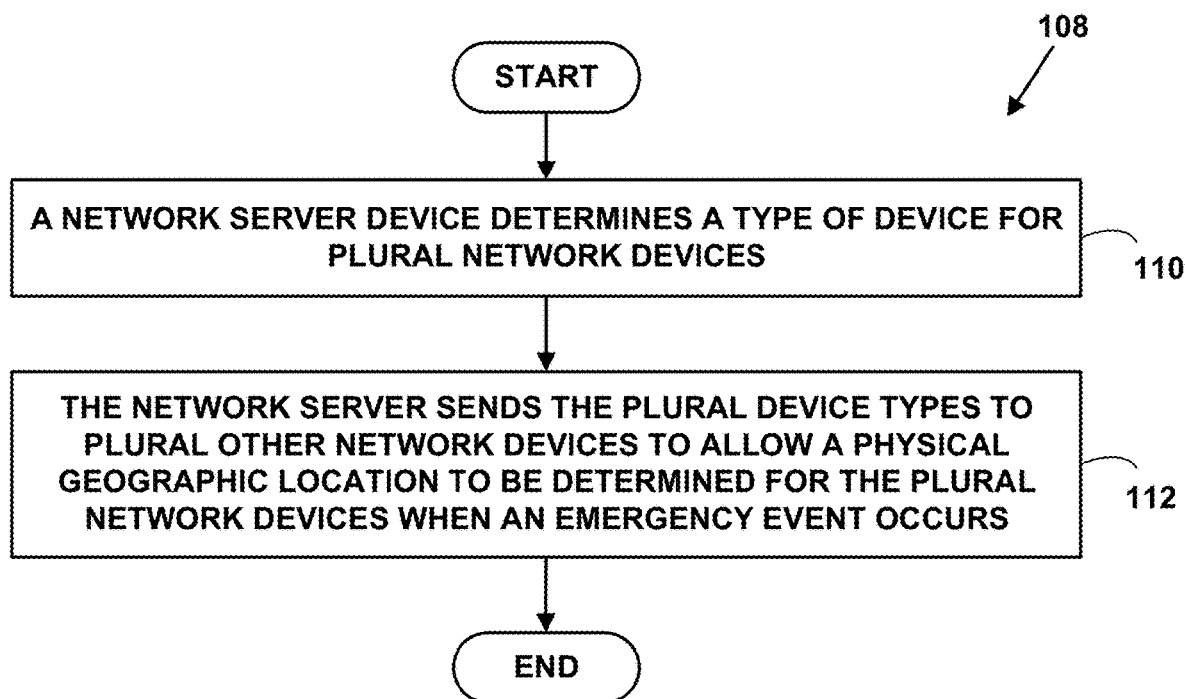
FIG. 11 is a flow diagram illustrating a method for an emergency location information system (E-LIS)

FIG. 11 is a flow diagram illustrating a Method 108 for a location information system. At Step 110, a network server device determines a type of device for the plural target network devices. At Step 112, the network server device sends the plural device types to plural other server network devices to allow a physical geographic location to be determined for the plural target network devices when an emergency event occurs.

Method 108 is illustrated with one exemplary embodiment. However, the present invention is not limited to such an embodiment and other embodiments can also be used to practice the invention.

In such an exemplary embodiment, at Step 110, the network server device 24 determines IP based network devices and SIP based network devices for the plural wireless or wired target network devices 12, 14, 16 to allow a current physical geographic location to be determined for the plural wireless or wired target network devices 12, 14, 16 in an emergency situation. However, the present invention is not limited to IP and SIP based network devices and the network server device 24 can be used to determine other types of target network devices.

At Step 112, the network server device 24 sends the plural device types to plural other server network devices 20, 22 to allow a physical geographic location to be determined for the plural target network devices 12, 14, 16 when an emergency event occurs. In one embodiment, the emergency event is a E911 communication event.

In another embodiment, the network server device 24 sends the plural device types to plural other server network devices 20, 22 to allow a physical geographic location to be determined for the plural target network devices 12, 14, 16 when non-emergency event occurs.

In one embodiment, at Step 112, the network server device 24 sends physical geographic location data to ancillary network infrastructure devices that may store, manage or forward physical location data including, but not limited to those listed in Table 4.

TABLE 4

| | |
|---|---|
| a. | IP Private Branch Exchanges (PBXs) |
| b. | SIP servers and SIP call servers |

TABLE 4-continued c. Session Border Controllers
d. Wireless Access Points (WiAPs)
e. Wireless LAN switches
f. Wireless network management software and systems
g. LAN switches
h. Routers and Bridges
i. Dynamic Host Configuration Protocol (DHCP) servers
j. Other network applications that consolidate location data for devices
k. Mobile Positing Centers
l. Gateway Mobile Location Centers The server network device 24 also includes an application 26 with software to convert geo-coded location data to physical location or physical maps.

The server network device 24 also includes an application 26 for reading and writing data to external databases, applications, systems including, but not limited to, those illustrated in Table 5.

TABLE 5 a. Automatic Location Identification (ALI) Databases that are hosted by Regional Bell Operating Companies, ILECs, CLECs, 9-1-1 Service Providers, State and Local 9-1-1 authorities
b. VoIP Positioning Centers
c. Mobile Positioning Centers
d. Gateway Mobile Location Centers
e. Selective router networks
f. Master Street Address Guide (MSAG) validation systems
g. Other databases
h. Provisioning databases and provisioning applications
i. Billing Systems, applications and databases
j. Corporate database
k. Caller ID databases
l. E911 databases In one embodiment, the server network device 24 also includes an application 26 for notification of events, scheduling of tasks, issuing reports on system logs and system performance and activity and a graphical user interface (GUIs) for softphone and device location identification by the end user.

Figure 12:
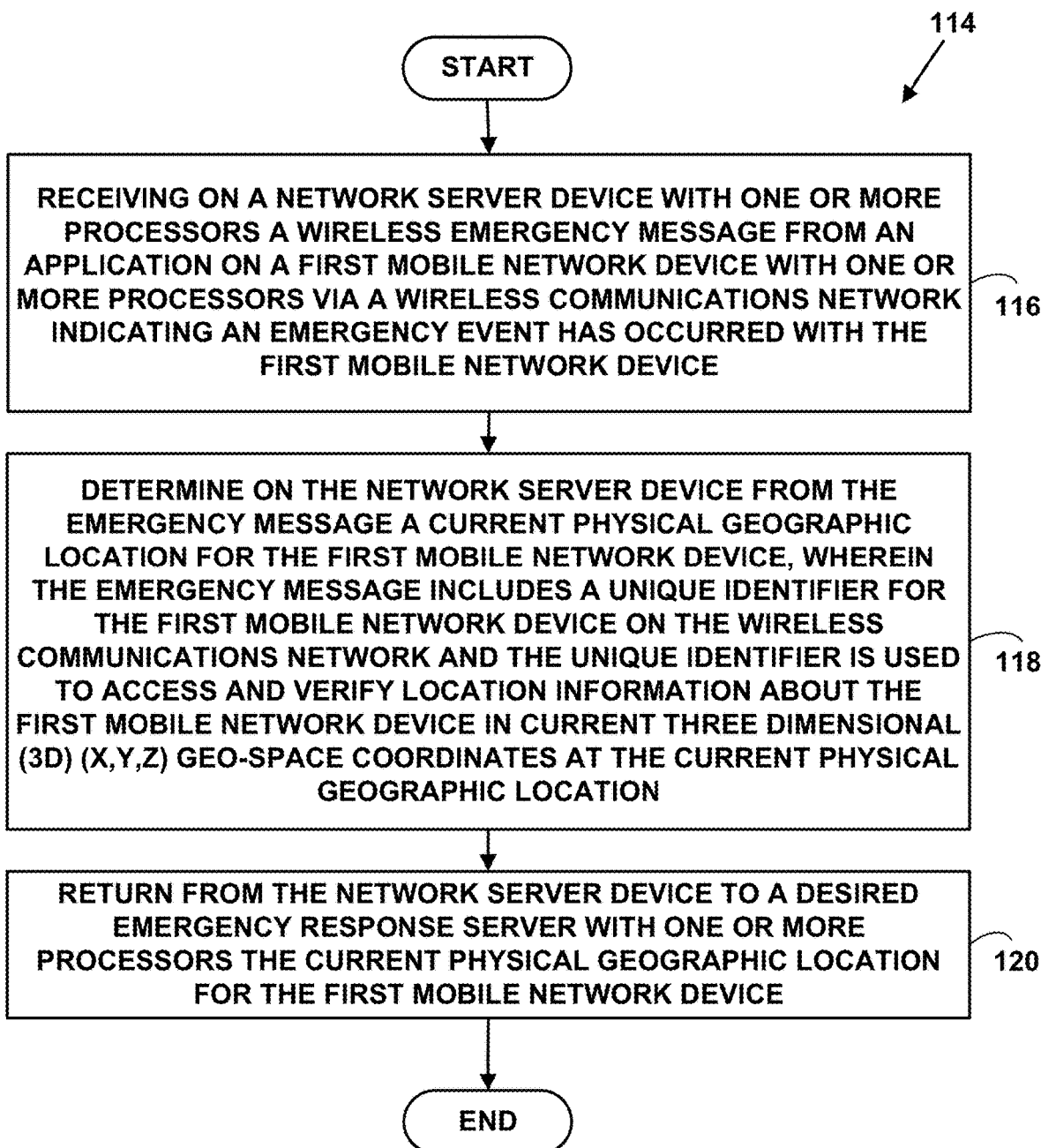
FIG. 12 is a flow diagram illustrating a method for an emergency location information system (E-LIS)

FIG. 12 is a flow diagram illustrating a Method 114 for an emergency location information system (E-LIS). At Step 116, a wireless emergency message is received on a network server device with one or more processors from an application on a first mobile network device with one or more processors via a wireless communications network indicating an emergency event has occurred with the first mobile network device. At Step 118, the network server device determines from the emergency message a current physical geographic location for the first mobile network device. The emergency message includes a unique identifier for the first mobile network device on the wireless communications network and the unique identifier is used to access and verify location information about the first mobile network device in current three dimensional (3D) (X, Y, Z) geo-space coordinates at the current physical geographic location. At Step 120, the network server device returns to a desired emergency response server with one or more processors the current physical geographic location for the first mobile network device.

Method 114 is illustrated with one exemplary embodiment. However, the present invention is not limited to such an embodiment and other embodiments can also be used to practice the invention.

In such an exemplary embodiment, at Step 116, a wireless emergency message is received on a network server device 24 with one or more processors from an application 26 on a first mobile network device 12, 14, 16 with one or more processors via a wireless communications network 18 indicating an emergency event has occurred with the first mobile network device 12, 14, 16.

At Step 118, the network server device 24 determines from the emergency message a current physical geographic location for the first mobile network device 12, 14, 16. The emergency message includes a unique identifier (e.g., URI, XML object, etc.) for the first mobile network device on the wireless communications network 18 and the unique identifier is used to access and verify location information about the first mobile network device 12, 14, 16 in current three dimensional (3D) (X, Y, Z) geo-space coordinates at the current physical geographic location.

At Step 120, the network server device 24 returns to a desired emergency response server with one or more processors the current physical geographic location for the first mobile network device 12, 14, 16.

In one embodiment, the first mobile network device 12, 14, 16 includes a smart network device comprising a smart phone or a tablet computer. In one embodiment, the application 26 includes a smart application for a smart phone or a tablet computer.

In one embodiment, the emergency event includes an accident, event, fire event, terrorist attack event, military event, crime event, weather event, etc.

In one embodiment, the emergency event is detected by an accelerometer and/or a temperature sensor integral and/or internal to the first mobile network device 12, 14, 16. In another embodiment, the emergency event is detected by an accelerometer and/or a temperature sensor external (e.g., connected via USB port, not connected directly but receiving communications (e.g., RFID sensor, ISM sensor, etc.)) and in communications with to the first mobile network device 12, 14, 16. For example, the accelerometer may detect an impact and/or the temperature sensor may detect a fire, etc.

However, the present invention is not limited to these emergency events and/or sensors and more, fewer and/or other types of emergency events and/or sensors can be used to practice the invention.

In one embodiment, the emergency event further includes other types of emergencies including: locating children or medical patients based on a triggering event causing communications to an intermediate service provider (e.g., hospital, private nurse company, etc.) and/or an intruder in a school; locating inanimate objects based on a triggering event causing communications to an intermediate information receiver (e.g., material (e.g., via RFID tag, etc.), truck, trailer tools, etc.); locating sensors based on a triggering event causing communications to an intermediate information receiver (e.g., weather service, private security office, government security office, etc.) for a kidnapping, robbery, assault, missing person, a criminal subject to court ordering electronic monitoring (e.g., a registered sex offender not allowed to be near a school, etc.).

However, the present invention is not limited to these exemplary emergency events and more, fewer and/or other types of emergency events can be used to practice the invention.

In such an embodiment, sensors such as RFID sensors and/or ISM sensors and/or other types of sensors and/or other types of target network devices and/or other types server network devices may also be used to provide information to the target network devices 12, 14, 16, 27 158-164, 167, 224 248 and/or server network devices 20, 22, 24 and/or emergency server network devices 25.

In another embodiment, a "geofence" is used to provide information to the target network devices 12, 14, 16, 27 158-164, 167, 224, 248 and/or server network devices 20, 22, 24, and/or emergency server network devices 25. A "geofence" is a virtual geographic boundary, defined by GPS, RFID and/or other sensors and/or actuator technology that enables the software application 26 to trigger a response when the target network device 12, 14, 16, 27 158-164, 167, 224, 248 enters or leaves a particular geographic area and/or data values on the target network devices 12, 14, 16, 27 158-164, 167, 224, 248 exceed pre-determined threshholds.

In one embodiment, an exemplary geofence is created with a set of cooperating IoT network devices 248. For example, a "home geofence" can be created with an IoT stove 250, refrigerator 252, thermostat 254, etc. In another embodiment, the geofence is provided by a single IoT network device 248. For example, an IoT medical device 260 can provide a geofence when a blood sugar level exceeds a pre-determined limit.

However, the present invention is not limited to these exemplary geofences and more, fewer and/or other types of geofences can be used to practice the invention.

Figure 13:
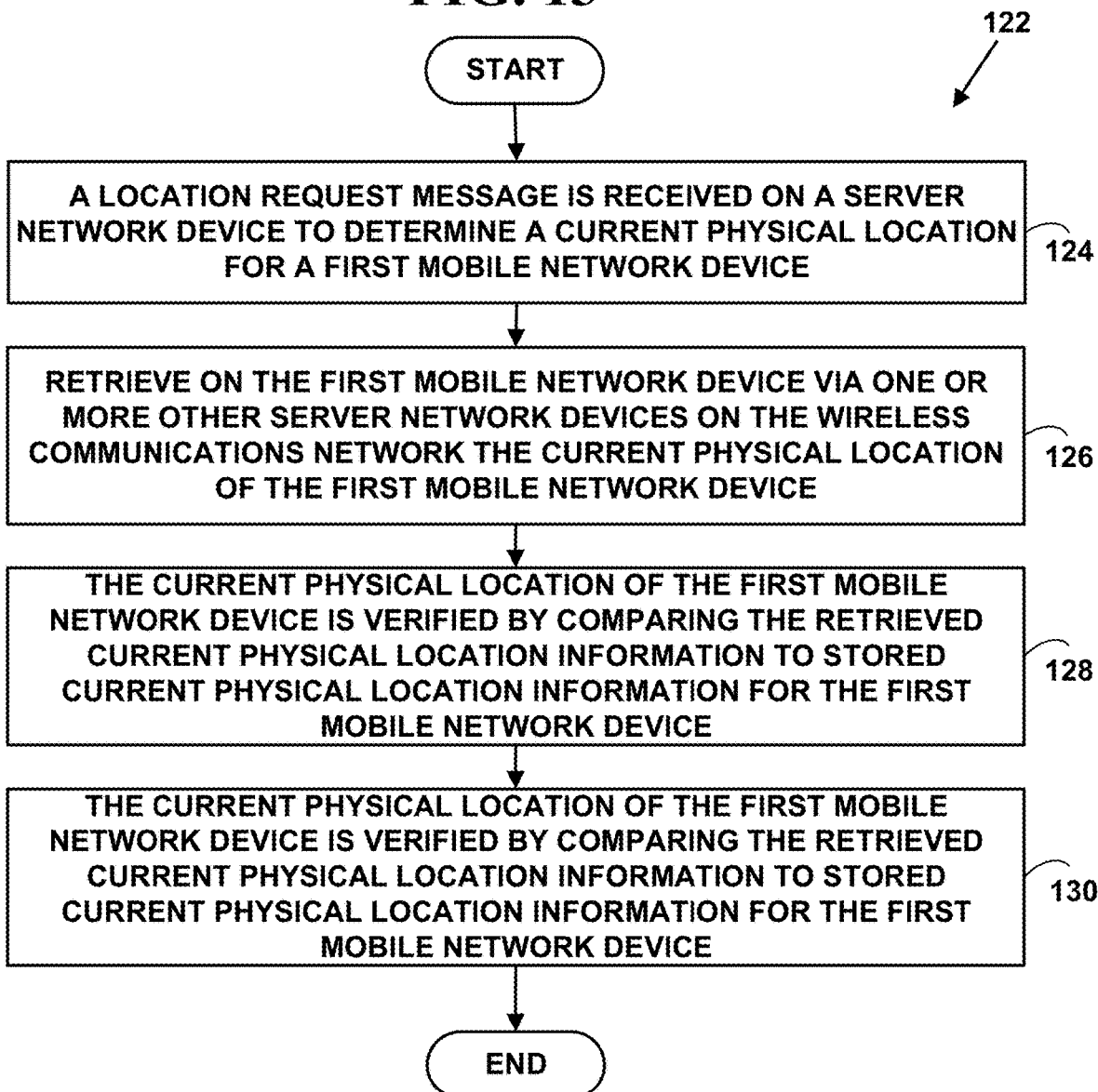
FIG. 13 is a flow diagram illustrating a method for an emergency location information system (E-LIS)

FIG. 13 is a flow diagram illustrating a Method 122 for an emergency location information system (E-LIS). At Step 124, a location request message is received on a server network device to determine a current physical location for a first mobile network device. At Step 126, retrieve on the first mobile network device via one or more other server network devices on the wireless communications network the current physical location of the first mobile network device. At Step 128, the current physical location of the first mobile network device is verified by comparing the retrieved current physical location information to stored current physical location information for the first mobile network device. At Step 130, the current physical location information for the first mobile network device is sent to the desired emergency response server.

Method 122 is illustrated with one exemplary embodiment. However, the present invention is not limited to such an embodiment and other embodiments can also be used to practice the invention.

In such an exemplary embodiment, at Step 124, a location request message is received on the server network device 24 to determine a current physical location for a first mobile network device 12, 14, 16.

At Step 126, the first mobile network device 12, 14, 16 retrieves via one or more other server network devices 20, 22, 24 on the wireless communications network 18 the current physical location of the first mobile network device. 12, 14, 16.

In one embodiment, Step 126 includes determining a current physical location of the first mobile network device 12, 14, 16. The current physical location is determined by pulling current physical location coordinates from the infrastructure of the wireless communications network 18 rather than the first mobile network device 12, 14, 16 periodically pushing its current physical location into the wireless communication network 18. For example: (1) In a Public Branch Exchange (PBX) environment, the E-LIS performs a data link Layer 2 discovery on an IP network that serves the enterprise. This would correlate extensions with the coordinates for an actual physical location or area from where the emergency or non-emergency call was placed, for downstream processing (e.g., by emergency response servers, other network servers, etc.); (2) In a cellular (traditional, micro cell, data to cell, etc.) environment, the E-LIS queries cell site and its neighbors serving the first mobile network device 12, 14, 16 for presence information of the first mobile network device to request original or updated location coordinates for the current physical location.

In one embodiment, no translation of location coordinates are completed. In another embodiment, location information is translated in 3D (X, Y, Z) geo-space coordinates to obtain a current physical location as was described above.

In another embodiment, the automatic location request message is generated on the first mobile network device 12, 14, 16 when the first mobile network device is physically shaken in a pre-determined pattern. For example, if a person was being kidnapped and still had the first mobile network device 12, 14, 16, the device could be turned upside and shaken (e.g., three rapid shakes, etc.) to automatically generate the location request message. In such an embodiment, the accelerometer in the device is used and automatically generates automatic location request message when it is activated.

In another embodiment, the automatic location request message is generated on the first mobile network device 12, 14, 16 when a pre-determined selection input is received (e.g., typing in a numeric code on the virtual keypad, from a manual button, from a virtual button, etc.).

However, the present invention is not limited to the pre-determined pattern described and other pre-determined patterns can be used to practice the invention.

However, the present invention is not limited to the embodiments described for Step 126 and other embodiments can also be used to practice the invention.

At Step 128, the current physical location of the first mobile network device 12, 14, 16 is verified by comparing the retrieved current physical location information to stored current physical location information for the first mobile network device 12, 14, 16 on the server network device 24.

At Step 130, the current physical location information for the first mobile network device 12, 14, 16 is sent to the desired emergency response server.

In one embodiment, first mobile network device 12, 14, 16 periodically determines and sends the current physical location for the first mobile network device 12, 14, 16 to the server network device 24 via the wireless communications network 18.

Method 122 and the other methods described herein can be applied to emergency situations where a user of the first mobile network device 12, 14, 16 does not have the capability to initiate a call (e.g., partially incapacitated, person kidnapped person, etc.) The E-LIS could be used to initiate the tracking or locating of the first mobile network device 12, 14, 16. It follows that this same technology could be applied to non-emergency events including stolen property location and subsequent retrieval.

However, the present invention is not limited to the embodiments described and other embodiments can also be used to practice the invention.

Figure 14:
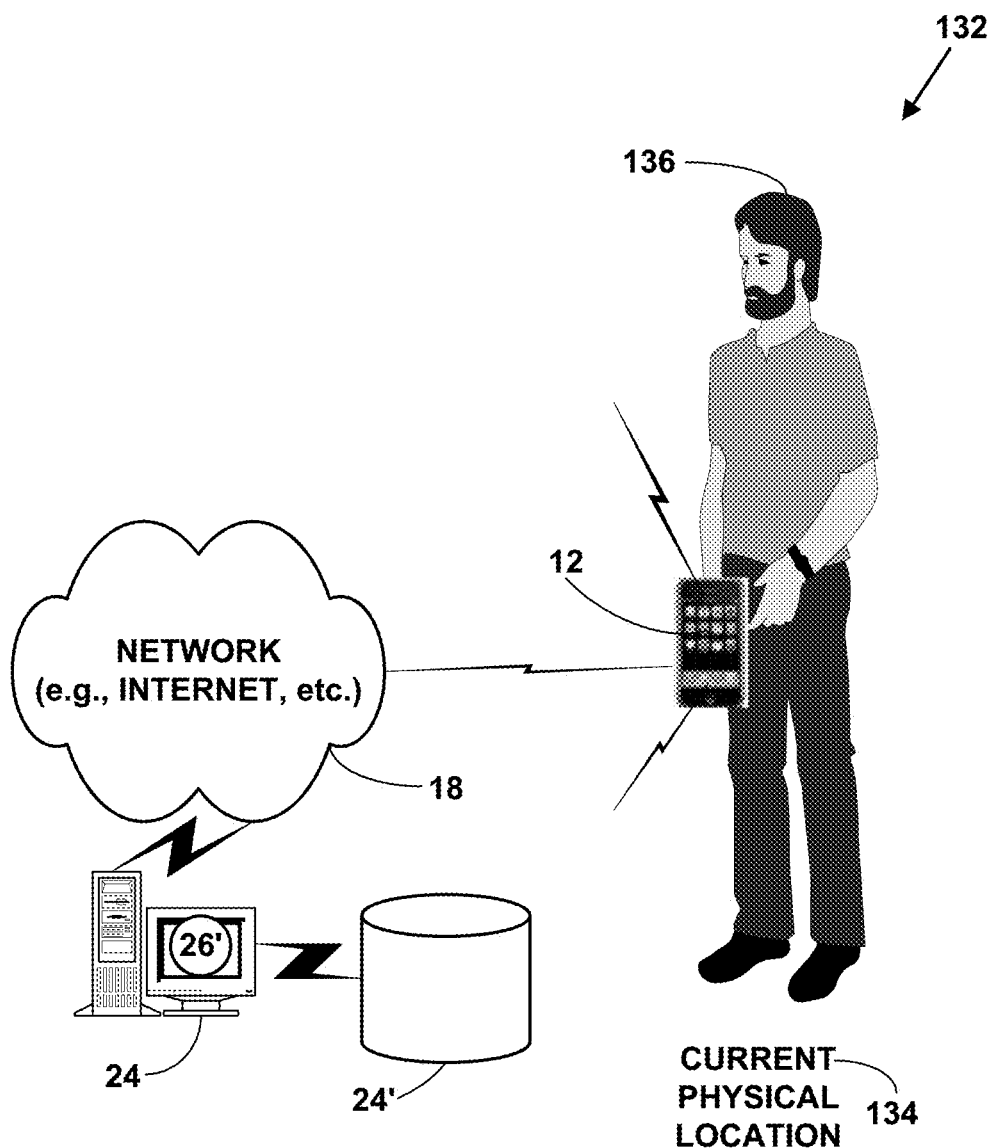
FIG. 14 is a block diagram illustrating a location of a first mobile network device determined with an emergency location information system (E-LIS)

FIG. 14 is a block diagram 132 illustrating a current physical location 134, 134' of a first mobile network device (e.g., 12, etc.) determined with the methods and system of the emergency location information system (E-LIS) described herein. A user 136 of the first mobile network device 12 can also shake the device as described above to generate and automatic location response message as was described above.

The methods and system described herein provide, but are not limited to at least: (1) location determine services for any network device in any wired and/or wireless access network (e.g., Ethernet, cable, DSL, Wi-Fi, Wi-Fi Aware, WiMAX, cellular, CATV, PSTN, mesh, ISM, RFID, 802.xx.xx, etc.);

(2) Determines a physical geographical location if necessary, and interface with any and all existing location systems (e.g., GPS, network triangulation, 3D (X, Y, Z) geo-space, other Wi-Fi, Wi-Fi Aware, WiMAX and other wireless tracking systems, etc.), and stores, manipulates, secures, and "serves up" location, in a data form or XML data objects (or other accepted and necessary data formats), to devices capable of accepting it, to location recipients, where the service/servers stores location on behalf of users/devices; (3) provides current physical location service for any and all applications requiring it, including and especially emergency calling service (i.e., called E911 and 911 in North America, and other geographic regions); and (4) and provides, stores, manipulates, and secure locations in either room/building/postal address (physical geographic location) format or geo-coordinates (e.g., (X, Y, Z) etc.) referent to any generally accepted reference datum like WGS-84 (GPS, etc.).

Figure 15B:
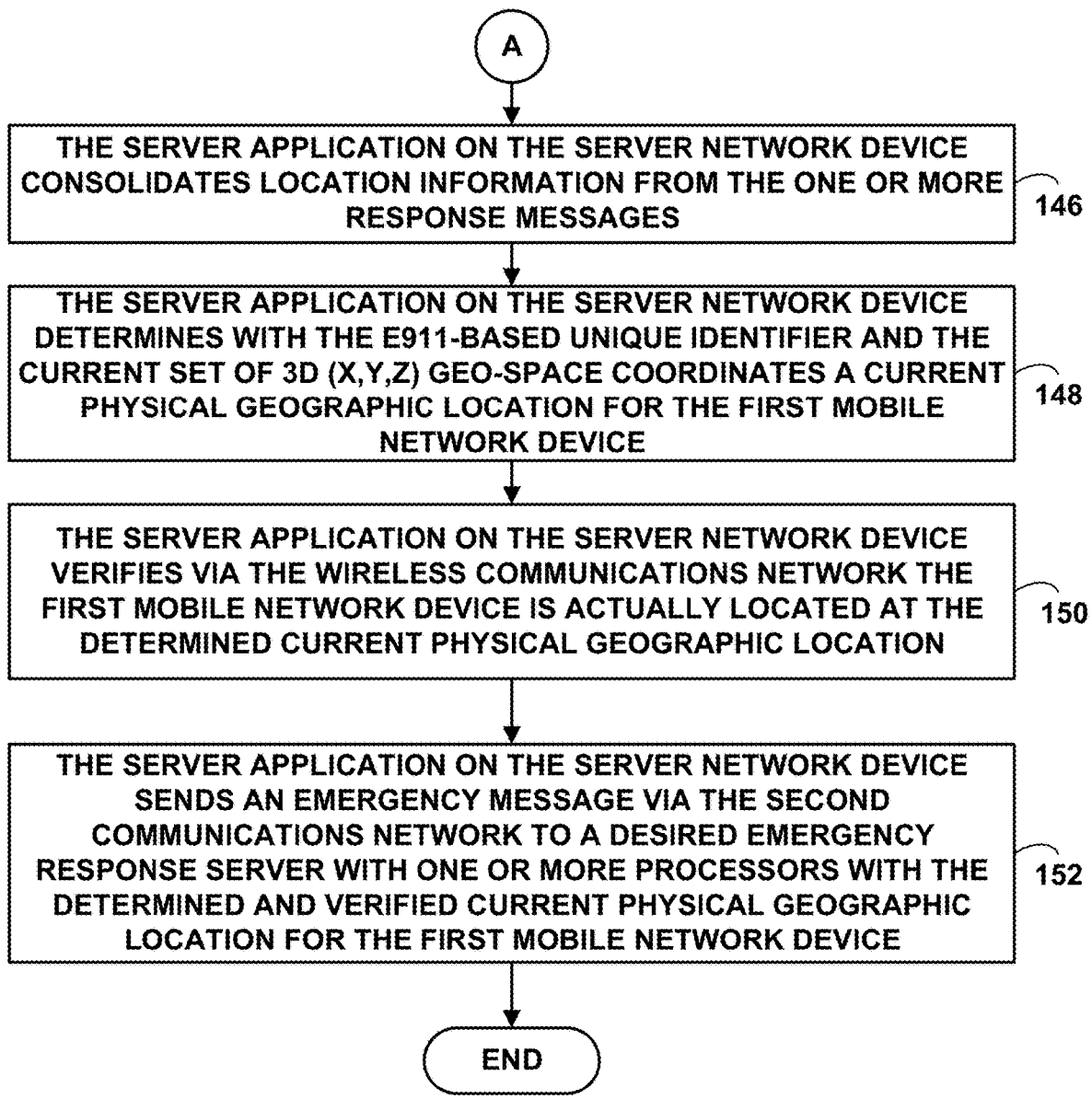

Emergency Location Information Service (E-LIS) and Emergency Message Translation FIGS. 15A and 15B are a flow diagram illustrating a Method 138 for an emergency location information system (E-LIS). At Step 140, a server application on network server device with one or more processors receives a wireless emergency message from a mobile application on a first mobile network device with one or more processors via a wireless communications network indicating an emergency event has occurred with the first mobile network device. The wireless emergency message includes a unique identifier comprising a specialized E911-based unique identifier for the first mobile network device unique across all wireless and wired communications network and an indication a current set of 3D (X, Y, Z) geo-space coordinates for the first mobile network device is stored on one or more other server network devices and not on the first mobile network device. At Step 142, one or more request messages are sent from the server network device to one or more other server network devices via a second communications network to request the 3D (X, Y, Z) geo-space coordinates of the first mobile network device. At Step 144, one or more response messages are received on the server application on the server network device from the one or more other server network devices via the second communications network including the 3D (X, Y, Z) geo-space coordinates of the first mobile network device. At Step 146, the server application on the server network device consolidates location information from the one or more response messages. At Step 148, the server application on the server network device determines with the E911-based unique identifier and the current set of 3D (X, Y, Z) geo-space coordinates a current physical geographic location for the first mobile network device. At Step 150, the server application on the server network device verifies via the wireless communications network the first mobile network device is actually located at the determined current physical geographic location. At Step 152, the server application on the server network device sends an emergency message via the second communications network to a desired emergency response server with one or more processors with the determined and verified current physical geographic location for the first mobile network device.

Method 138 is illustrated with one exemplary embodiment. However, the present invention is not limited to such an embodiment and other embodiments can also be used to practice the invention.

In such an exemplary embodiment, at Step 140, a server application 26' on server network device 20 with one or more processors receives a wireless emergency message from a mobile application 26 on a first mobile network device 12 with one or more processors via a wireless communications network 18 indicating an emergency event has occurred with the first mobile network device 12. The wireless emergency message includes a unique identifier comprising a specialized E911-based unique identifier for the first mobile network device 12 unique across all wireless and wired communications network and an indication a current set of 3D (X, Y, Z) geo-space coordinates for the first mobile network device 12 is stored on one or more other server network devices and not on the first mobile network device.

At Step 142, one or more request messages are sent from the server application 26' on the server network device 20 to one or more other network server devices 22, 24 via a second communications network 18 to request the 3D (X, Y, Z) geo-space coordinates of the first mobile network device 12.

In one embodiment, a Network Attachment Sub-System (NASS) application in the server application 20 maintains on the server network device 20 information about IP-connectivity access sessions associated with mobile network devices 12, 14, 16 connected to a communications network 18. This information is stored in the Connectivity Session Location and Repository Function (CLF) and made accessible to other subsystems and applications 26' through an interface called an E2 interface. The E2 interface enables Application Functions (AF) to retrieve IP-connectivity related session data. The IP-connectivity related session data helps determine a current location of a network device.

In such an embodiment, the server application 26' on the server network device 20 uses an E2 interface to send message to and receive messages from the one or more other network server devices 22, 24. However, the present invention is not limited to such an embodiment and other types of message interfaces can be used to practice the invention.

In one embodiment, the second communications network 18' is the same communications network as the wireless communications network 18. In another embodiment, the second communications network 18' is a different communications network (e.g., a wired communications network, a data network (e.g., IP network, etc.) etc.

In another embodiment, location information other than the 3D (X, Y, Z) geo-space coordinates of the first mobile network device 12 can be used to practice the invention and the present invention is not limited the location information described.

At Step 144, one or more response messages are received on the server application 26' on the server network device 20 from the one or more other server network devices 22, 24 via the second communications network 18 including the 3D (X, Y, Z) geo-space coordinates of the first mobile network device 12.

In one embodiment, all the 3D (X, Y, Z) geo-space coordinates of the first mobile network device are included in one message. In another embodiment, selected portions of the 3D (X, Y, Z) geo-space coordinate data for the first mobile network device 12 are included in plural different responses messages. In another embodiment, all the 3D (X, Y, Z) geo-space coordinates of the first mobile network device are included in plural different response messages to allow for verification of a location of a first mobile network device 12.

However, the present invention is not limited to such embodiments and other types of location information and message sequences can be used to practice the invention.

At Step 146, the server application 26' on the server network device 20 consolidates location information for the first mobile network device 12 from the one or more response messages.

At Step 148, the server application 26' on the server network device 20 determines with the E911-based unique identifier and the current set of 3D (X, Y, Z) geo-space coordinates a current physical geographic location for the first mobile network device 12.

At Step 150, the server application 26' on the server network device 20 verifies via the wireless communications network 18 the first mobile network device 12 is actually located at the determined current physical geographic location.

In one embodiment, the verification step includes comparing location information from the one or more response messages received on the server application 26' on the server network device. In another embodiment, the verification step includes sending a message to the first mobile network device 12 asking it to verify its location. In another embodiment, the verification step includes comparing a current location of the first mobile network device 12 to previous location.

However, the present invention is not limited to such embodiments and other types of verifications can be used to practice the invention.

At Step 152, the server application 26' on the server network device 20 sends a emergency message via the second communications network 18' to a desired emergency response server 25 with one or more processors with the determined and verified current physical geographic location for the first mobile network device 12.

The emergency response server 25 includes, but is not limited to, Public Safety Answering Point (PSAP) servers, legacy 911 servers, E911 servers, Next Generation (NG)-9-1-1 Core Service elements, Emergency Services IP networks (ESInet) and other types of emergency response servers.

NG-911 is an Internet Protocol (IP)-based system that allow digital information (e.g., voice, videos, text messages, pictures, etc.) to flow seamlessly from network devices through several different types of 911 networks and on to emergency responders.

However, the present invention is not limited to such embodiments and other types of emergency response servers 25 can be used to practice the invention.

FIG. 16 is a flow diagram illustrating a Method 154 for an emergency location information system (E-LIS). At Step 156, a server application on a server network device determines whether a desired emergency response server can receive 911 messages from legacy 911 networks or from Emergency Services IP networks (ESInet). At Step 156, the server application on the server network device determines whether the emergency response message is being sent to a legacy 911 network. If the emergency response message is being sent to a legacy 911 network, at Step 158, the server application on the server network device creates a new legacy 911 message with the determined physical location information for the first mobile network device in a format usable on the legacy 911 network. At Step 160, the new legacy 911 message is forwarded from the server application on the server network device for transport and dissemination by the legacy 911 network via the second communications network. If the emergency response message is not being sent to a legacy 911 network, at Step 162, from the server application on the server network device creates a new ESInet 911 message with the determined physical location information for the first mobile network device in a in format usable on the ESInet. At Step 164, the server application on the server network device forwards, the new ESInet 911 message for transport and dissemination by the ESInet, thereby providing transformation of 911 messages in both inbound and outbound directions including transformation of emergency messages without physical location information included, into new 911 messages with determined physical location information and from a format usable on legacy 911 networks into to a format usable on ESInets and from a format usable on ESInets into a format usable on legacy 911 networks.

Method 154 is illustrated with one exemplary embodiment. However, the present invention is not limited to such an embodiment and other embodiments can also be used to practice the invention.

In such an exemplary embodiment, at Step 156, a server application 26' on a server network device 20 determines whether a desired emergency response server 25 can receive 911 messages from legacy 911 networks, Next Generation (NG)-911 networks, or from Emergency Services IP networks (ESInet). At Step 156, the server application 26' on the server network device 20 determines whether the emergency response message is being sent to a legacy 911 network.

If the emergency response message is being sent to a legacy 911 network, at Step 158, the server application 26' on the server network device 20 creates a new legacy 911 message with the determined physical location information for the first mobile network device 12 in a format usable on the legacy 911 network (e.g., physical location information determined with Method 138, etc.)

At Step 160, the new legacy 911 message is forwarded from the server application 26' on the server network device 20 for transport and dissemination by the legacy 911 network 18'.

In one embodiment, one or more types of E-LIS location information is made available to be queried by the legacy 911 network 18' when an emergency call is sent to the legacy 911 network 18'. The emergency call is sent (i.e., pushed, etc.) to the legacy 911 network 18' and an ALI is sent (i.e., pulled, etc.) from the legacy 911 network.

If the emergency response message is not being sent to a legacy 911 network, at Step 162, from the server application 26' on the server network device 20 creates a new ESInet 911 message with the determined physical location information for the first mobile network device 12 in a in format usable on the ESInet.

At Step 164, the server application 26' on the server network 20 device forwards the new ESInet 911 message for transport and dissemination by the ESInet 18.

The server application 26' on the server network 20 provides transformation of 911 messages in both inbound and outbound directions including transformation of emergency messages without physical location information included, into new 911 messages with determined physical location information and from a format usable on legacy 911 networks into to a format usable on ESInets and from a format usable on ESInets into a format usable on legacy 911 networks.

Wearable Devices

"Wearable mobile technology" and/or "wearable devices" are clothing and accessories incorporating computer and advanced electronic technologies. Wearable mobile network devices provide several advantages including, but not limited to: (1) Quicker access to notifications. Important and/or summary notifications are sent to alert a user to view a whole new message. (2) Heads-up information. Digital eye wear allows users to display relevant information like directions without having to constantly glance down; (3) Always-on Searches. Wearable devices provide always-on, hands-free searches; and (4) Recorded data and feedback. Wearable devices also take telemetric data recordings and providing useful feedback for users for exercise, health, fitness, activities etc.

Digital eyewear, such as GOOGLE Glass, Smart watches by SONY, NIKE, GARMIN, SAMSUNG, wrist bands and/or fitness bands by LG, NIKE, FITBIT, etc. and others are examples of wearable mobile devices. Just like mobile and non-mobiles phones, a current physical location of such wearable mobile devices must be determine in an emergency situation.

The wearable device clothing 160 includes "smart clothing," including but not limited to (1) smart tops; (2) smart bottoms; (3) smart swim suits; (4) smart medical clothing; (5) smart socks; (6) smart hats; (7) smart underwear; (8) smart shoes; and/or (9) smart suits. "Smart clothing" may consist of materials that have embedded sensors, embedded detection capabilities, or embedded devices.

The "smart tops" include for example, smart compression shirts and other types of smart shirts or tops with a heart rate capture point sensors on a front and and/or a pocket on the back for a GPS sensor, that tracks motion and heart rate metrics in real-time. The smart shirts allow broadcast of live training data allowing athletes and coaches to monitor conditioning and fitness levels. Other smart tops include micro-EMG sensors that detect which muscles are working and transfer this workout data to a smartphone via a Bluetooth core. Muscle effort, heart rate and breathing are all tracked.

Other smart tops include "smart jackets" including touch and gesture sensitive areas on jacket sleeves. Users interact with a variety of services including music and GPS map apps provided a smart phone included in a jacket pocket. A user will also be able to answer and dismiss phone calls, select music or get directions all without reaching for attached smart phone.

The "smart bottoms" includes for example, smart running shorts and running tights, sweat pants and with including sensors that monitors a host of metrics including GPS location information, cadence, ground contact time, pelvic rotation and stride length. The smart bottoms support real-time coaching with feedback sent through to wireless headphones to help improve running form and reduce the chances of injury.

The "smart swimsuits" includes for example, Swimsuits equipped with a removable medallion-style waterproof sensor that aims to prevent a person from staying too long in the sun. The smart swimsuits allow a user to enter a skin type in a companion application 26 (e.g., APPLE or ANDROID smartphone app, etc.) the application will continuously monitor the temperature throughout the day and will send out warnings when it's time to apply some more sunscreen or get into the shade.

The "smart medical clothing" includes for example, a smart compression sleeve that uses electrocardiogram (ECG) technology to monitor heart rate activity, blood pressure, blood sugar levels, etc. "Smart medical clothing" also has environmental sensors to detect radiation, contaminants, and other abnormal dangerous substances. The smart compression sleeve also has sensors to monitor body temperature, air quality and ultra violet (UV) sun rays. The smart medical clothing also includes smart medical socks and medical hats.

The "smart socks" include for example, includes a (1) baby socks as a monitor for babies that uses pulse oximetry technology used in hospitals and monitor heart rates to make sure the baby's breathing is appropriate. It pairs with an IPHONE or ANDROID companion app over Bluetooth to deliver data in real-time; and (2) running socks providing information on pace, distance and time and running style, which can lead to faster times and a reduced risk of injury. The socks feature three textile pressure sensors, which measure the pressure placed on the foot during running. The socks feature textile pressure sensors, which measure a pressure placed on the foot during running.

The "smart hats" for example include, a smart baby hat that monitors vital signs monitor for newborn babies. It can measure temperature, heart rate, respiratory rate and blood oxygen saturation. The baby hat can be wirelessly synced, via Bluetooth to smart phones and tablets. Doctors and nurses can check up on the vital signs of one or all babies a room at a glance and get alerts on any changes in temperature or heart rate, etc.

The "smart underwear" for example includes, smart sports bras that record distances runs, breathing rates, heart rate and calculates recovery time. The smart bra is synced, via Bluetooth to smart phones and tablets.

The "smart suits" for example, include business suits that that collect biometric weather and UV data. One smart suit includes an NFC smart suit, that lets the wearer unlock and answer their smart phone, swap business cards digitally and sync with other devices in an office such as a fax machine, printer, etc. via the NFC communications protocol.

The "smart shoes" include for example, smart shoes with a heart rate capture point sensors, a GPS sensor, motion sensors, and/or accelerometers, that track motion and heart rate metrics in real-time. The smart shoes allow broadcast of live training data allowing athletes and coaches to monitor conditioning and fitness levels. Other smart shoes include micro-EMG sensors that detect which muscles are working and transfer this workout data to a smartphone via a Bluetooth core. Muscle effort, heart rate and breathing are all tracked.

However, the present invention is not limited to the exemplary smart clothing described herein and more, fewer or other types of smart clothing can be used to practice the invention.

Figure 17:
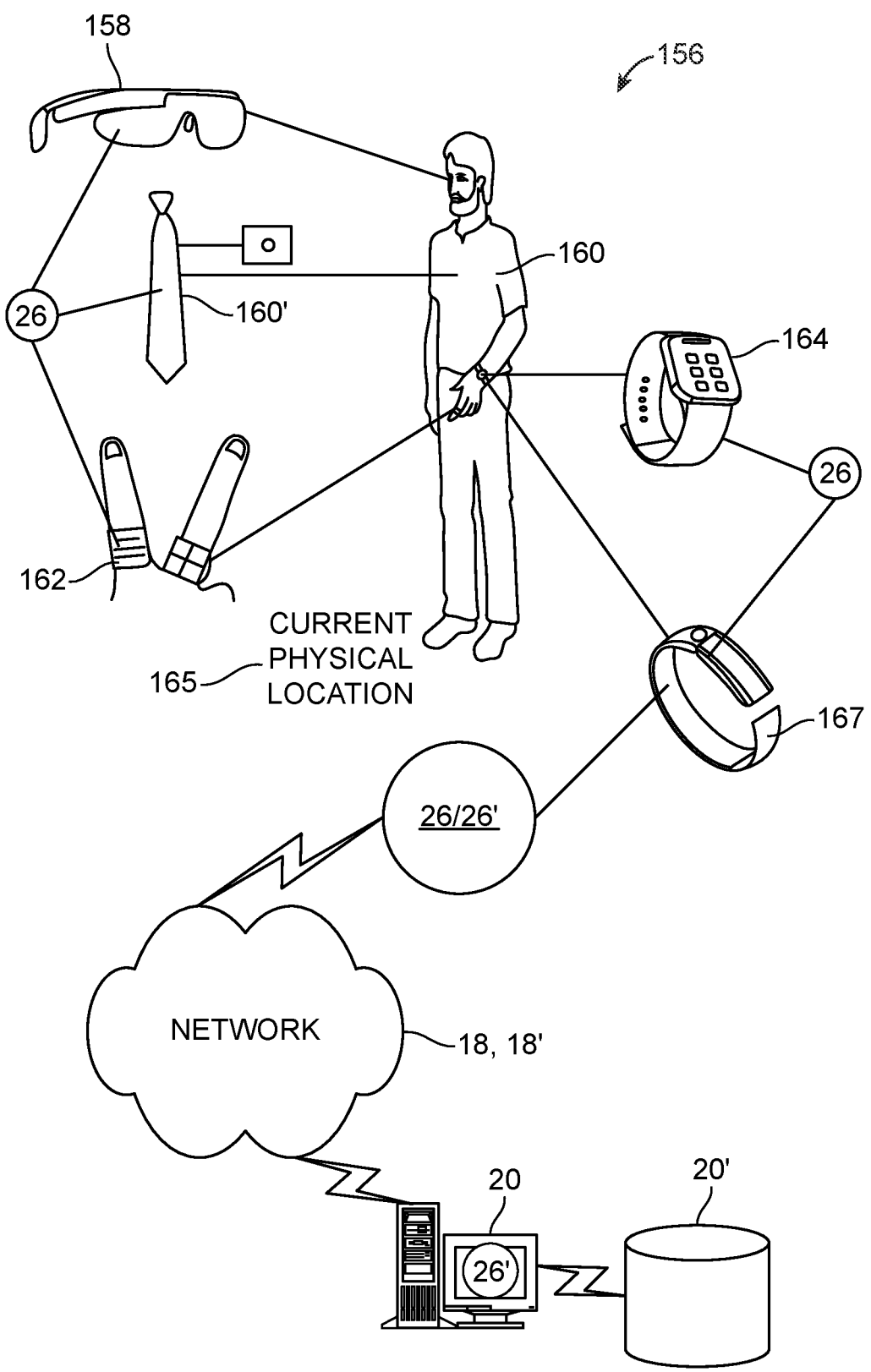
FIG. 17 is a block diagram with illustrating wearable devices.

FIG. 17 is a block diagram with 156 illustrating exemplary wearable devices. The wearable devices include one or more processors and include, but are not limited to, wearable digital glasses 158 (e.g., GOOGLE Glass, etc.), clothing 160 (e.g., smart ties 160', smart headwear, smart tops and bottoms, etc.), jewelry 162 (e.g., smart rings, smart earrings, etc.), watches 164 (e.g., SONY, NIKE, SAMSUNG, NIKE, GARMIN, etc.) and/or wrist bands or fitness bands 167 (e.g. GARMIN, FITBIT, POLAR, NIKE, JAWBONE, LG, etc.). The wearable mobile devices 158-164, 167 includes application 26 and/or 26' to determine a current physical location 165, 165' of the wearable network devices 158-164, 167. The wearable devices are also wearable by animals (e.g., service dogs, pets, competition animals, (e.g., racing horses, racing dogs, etc.) show animals, circus animals, etc.). All of the wearable devices 158-164, 167 have one or more processors and/or selected ones have other components including, but not limited to, accelerometers, altimeters, music control, phone compatibility, etc. However, the present invention is not limited to such embodiments and more, fewer and other types of wearable devices can also be used to practice the invention.

Determined Emergency Current Physical Location Information of Wearable Devices

Figure 18:
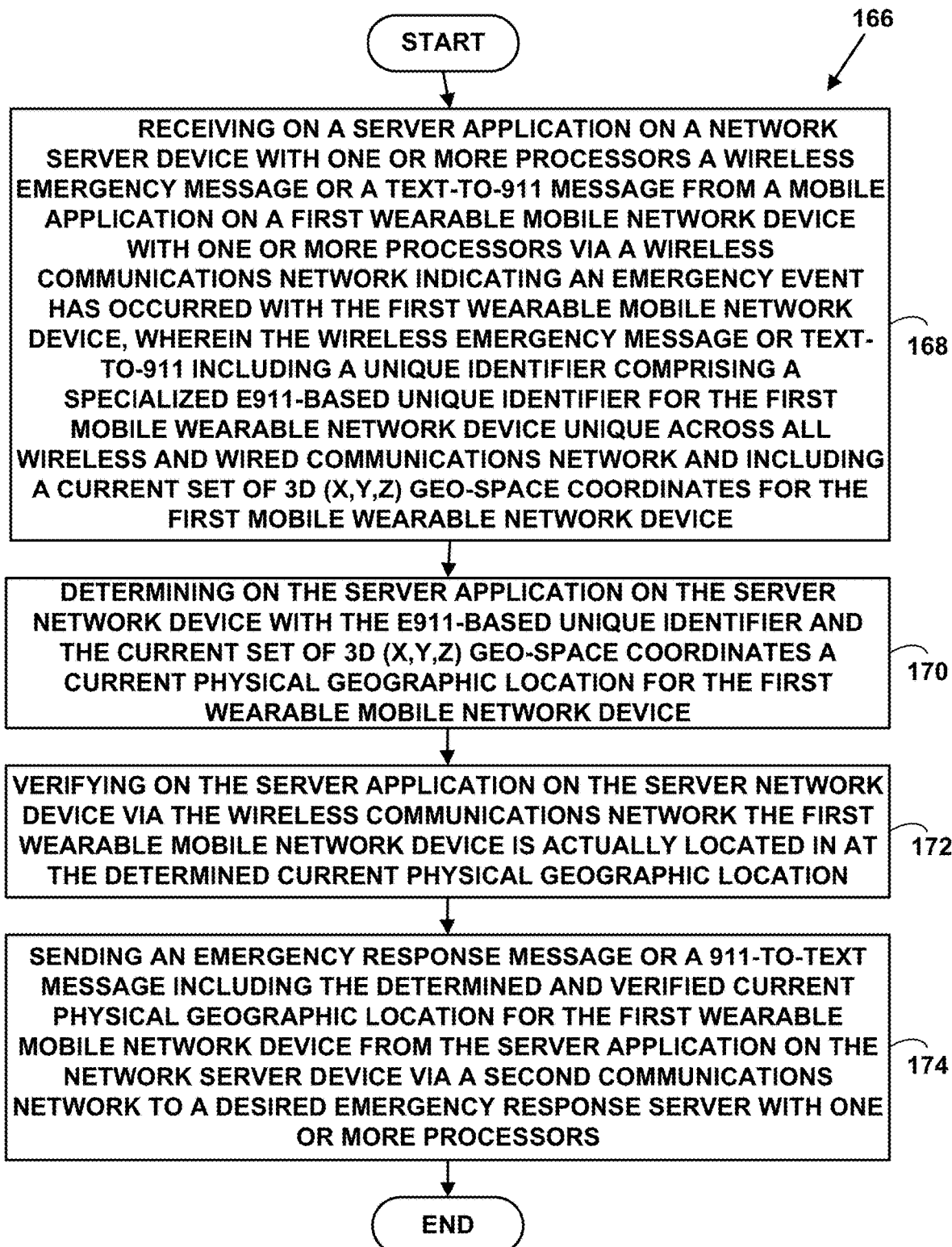
FIG. 18 is a flow diagram illustrating a method for an emergency location information system (E-LIS) for wearable devices.

FIG. 18 is a flow diagram illustrating a Method 166 for an emergency location information system (E-LIS) for wearable devices 158-164, 167. At Step 168, a server application on a network server device with one or more processors receives a wireless emergency message or a text-to-911 message from a mobile application on a first wearable mobile network device with one or more processors via a wireless communications network indicating an emergency event has occurred with the first wearable mobile network device. The wireless emergency message or text-to-911 includes a unique identifier comprising a specialized E911-based unique identifier for the first mobile wearable network device unique across all wireless and wired communications networks and including a current set of 3D (X, Y, Z) geo-space coordinates for the first mobile wearable network device. At Step 170, the server application on the server network device determines with the E911-based unique identifier and the current set of 3D (X, Y, Z) geo-space coordinates a current physical geographic location for the first wearable mobile network device. At Step 172, the server application on the server network device verifies via the wireless communications network or a wired communications network the first wearable mobile network device is actually located at the determined current physical geographic. At Step 174, an emergency response message or a 911-to-text message including the determined and verified current physical geographic location for the first wearable mobile network device is sent from the server application on the network server device via a second communications network to a desired emergency response server with one or more processors.

Method 166 is illustrated with one exemplary embodiment. However, the present invention is not limited to such an embodiment and other embodiments can also be used to practice the invention.

In such an exemplary embodiment, at Step 168, a server application 26' on a network server device (e.g., 20, etc.) with one or more processors receives a wireless emergency message or a text-to-911 message from a mobile application 26 on a first wearable mobile network device 158-164, 167 with one or more processors via a wireless communications network 18 indicating an emergency event has occurred with the first wearable mobile network device 158-164, 167.

In one embodiment, the wireless emergency message includes an E911 communication, a legacy 911 communication message, a Common Alerting Protocol (CAP) message, PAM Interface Protocol (PAM) message, Next Generation (NG)-911 message and/or an RFID sensor or other sensor message. However, the present invention is not limited to such an embodiment, and more fewer or other types of emergency messages can be used to practice the invention.

In one embodiment, the wireless emergency message or text-to-911 includes a unique identifier comprising a specialized E911-based unique identifier for the first mobile wearable network device 158-164, 167 unique across all wireless and wired communications network and including a current set of 3D (X, Y, Z) geo-space coordinates for the first mobile wearable network device 158-164, 167. However, the present invention is not limited to such an embodiment, and more fewer or other types of unique identifiers can be used to practice the invention.

In another embodiment, the E911-based unique identifier includes a Uniform Resource Identifier (URI). A URI is a unique address of a network resource that is unique across the whole network it is used on. A URI is the unique identifier used to access the resource on a network.

At Step 170, the server application 26' on the server network device 20 determines with the E911-based unique identifier and the current set of 3D (X, Y, Z) geo-space coordinates a current physical geographic location 134, 165 (e.g., 1st chair, 2nd desk, and/or 3 foot space, at NE corner of the 3rd floor of Suite 301 of the 45 story building located 1234 Main Street, Chicago, Ill., 60603, USA, or a 4 foot space 21 feet east of the centerline of Highway 94 and 2,341 feet north from mile maker 217, etc.) for the first wearable mobile network device 158-164, 167.

At Step 172, the server application 26' on the server network device 20 verifies via the wireless communications network 18 or a wired communications network 18' the first wearable mobile network device 158-164, 167 is actually located at the determined current physical geographic location 134, 165.

In one embodiment, at Step 172, the verifying step further includes sending one or more verification request messages via the wireless communications network 18 or a wired communication network 18' to one or more other server network devices 22, 24, 25, each with one or more processors and/or one or more other mobile network devices 12, 14, 16 each with one or more processors known to be at a pre-determined distance from the determined current physical geographic location 134, 165 of the first wearable mobile network device 158-164, 167. One or more verification response messages are received via the wireless communications network 18 or wired communications network 18' on the server application 26' on the server network device 20 from the one or more other server network devices 22, 24, 25 or the one or more other mobile network devices 12, 14, 16 verifying the first wearable mobile network device is actually located in at the determined current physical geographic location 134, 165. However, the present invention is not limited to such an embodiment, and more fewer or other verifying steps can be used to practice the invention.

The application 26' on the server network device 20 uses a variety of methods to verify a determined current physical location 134, 165 including triangulation, signal strength, orthogonality, location pinging, location comparison, etc. However, the present invention is not limited to such an embodiment, and more fewer or other verifying methods can be used to practice the invention.

In one embodiment, the one or more other server network devices 22, 24, 25 include Global Positioning System (GPS) server network devices or cell tower server network devices. In such an embodiment, GPS positioning and/or cell tower triangulation is used to verify the determined current physical geographic location 134, 165 of the first wearable mobile network device 158-164, 167 is accurate. However, the present invention is not limited to such an embodiment, and more fewer or other verifying steps can be used to practice the invention.

In another embodiment, the one or more other mobile network devices 12, 14, 16, whose current physical geographic location is known and verified and are known to be at a pre-determined distance from the determined current physical geographic location 134, 165 of the first wearable mobile network device 158-164, 167 are used to verify the determined current physical geographic location 134, 165 of the first wearable mobile network device 158-164, 167. These devices 12, 14, 16 send ping location messages such as location ping messages to, and receiving messages from the first wearable mobile network device 158-164, 167.

Ping location messages are utility to determine whether a specific device is accessible. It works by sending a data packet (e.g., IP, MAC, etc.) to the specified address and waiting for a reply. In one embodiment, the ping location messages are not part of the 911/E911 communication sequence and occur on a different channel or on a different bandwidth. In another embodiment, the ping location messages are part of the 911/E911 communication sequence. However, the present invention is not limited to such an embodiment, and more fewer or other types of verification location messages can be used to practice the invention.

In another embodiment, current location information messages are periodically sent to the one or more other mobile network devices 12, 14, 16, whose current physical geographic location is known and verified and are known to be at a pre-determined distance from the determined current physical geographic location 134, 165 of the first wearable mobile network device 158-164, 167. In such an embodiment either the one or more other mobile network devices 12, 14, 16 continuously determine and store their own current physical geographic location and/or obtain it from an associated server network device 22, 22, 25. The current physical geographic location information of the one or more other mobile network devices 12, 14, 16 is compared to the determined current physical location of the first wearable mobile network device 158-164, 167. However, the present invention is not limited to such an embodiment, and more fewer or other types of location verification methods can be used to practice the invention.

At Step 174, an emergency response message or a 911-to-text message including the determined and verified current physical geographic location 134, 165 for the first wearable mobile network device 158-164, 167 is sent from the server application 26' on the network server device 20 via a second communications network 18' to a desired emergency response server with one or more processors.

In one embodiment, the second communications network 18' is the same communications network as the wireless communications network 18 (e.g., both E911 networks, etc.) In another embodiment, the second communications network 18' is a different communications network (e.g., one a legacy 911 and the second a E911 network, a wired communications network, a data network (e.g., IP network, etc.) etc. Various combinations of networks can be used to practice the invention.

If the emergency message received at Step 168 includes a text-to-911 message, Method 166, further includes, sending a response text-to-911 response message from the server application 26' on the network server device 20 back to the mobile application 26 on the first wearable mobile network device 158-164, 167 via the wireless communications network 18 (or wired communications network 18') confirming the text-to-911 message has been received from the first wearable mobile network device 158-164, 167 and requesting in the text-to-911 response message additional information about the emergency event that has occurred (e.g., "This is TEXT-911, what is your emergency?", etc.). However, the present invention is not limited to such an embodiment the invention can be practiced without sending and/or receiving additional text-to-911 messages.

In one embodiment, the response text-to-911 messages includes a request the user of the first wearable mobile network device 158-164, 167 provide their own current physical geographic location 134, 165, if known. (e.g., "This is TEXT-911, what is your current location?"). Such a location is used to provide additional information to emergency responders. In one embodiment, such additional information is used as additional official verification information and is used to compare with current physical geographic location information determined by Method 166. In another embodiment, such additional information is used only an un-official verification information as many times during an emergency situation a person cannot provide accurate information due to fear, injury, confusion, lack of information about their location, poor visual view, etc. during the emergency circumstances. However, the present invention is not limited to such an embodiment the invention can be practiced without receiving any TEXT-911 responses from a user.

In one embodiment, Method 166 further includes displaying on the server network device 20 or another server network device 22, 24, 25 with one or more processors in real-time on a graphical map (e.g., GOOGLE maps, etc.) including a street view, terrain view, satellite view, traffic view, etc. the determined current physical geographic location 134, 165 for the first wearable mobile network device 158-164, 167 for one or more desired emergency response agencies (e.g., police, fire, military, etc.). However, the present invention is not limited to such an embodiment the invention can be practiced with and/or without displaying the display step.

"Real-time" is an actual time during which a process or event occurs and in which event data is processed within a very small amount of time (e.g., milliseconds, seconds, etc.) so that it is available virtually immediately as feedback from the event.

In one embodiment, the emergency response server 25 includes, includes, but is not limited to, Public Safety Answering Point (PSAP) servers, legacy 911 servers, E911 servers, NG-911 servers, Emergency Services IP networks (ESInet), text-to-911 servers and other types of emergency response servers.

Figure 19:
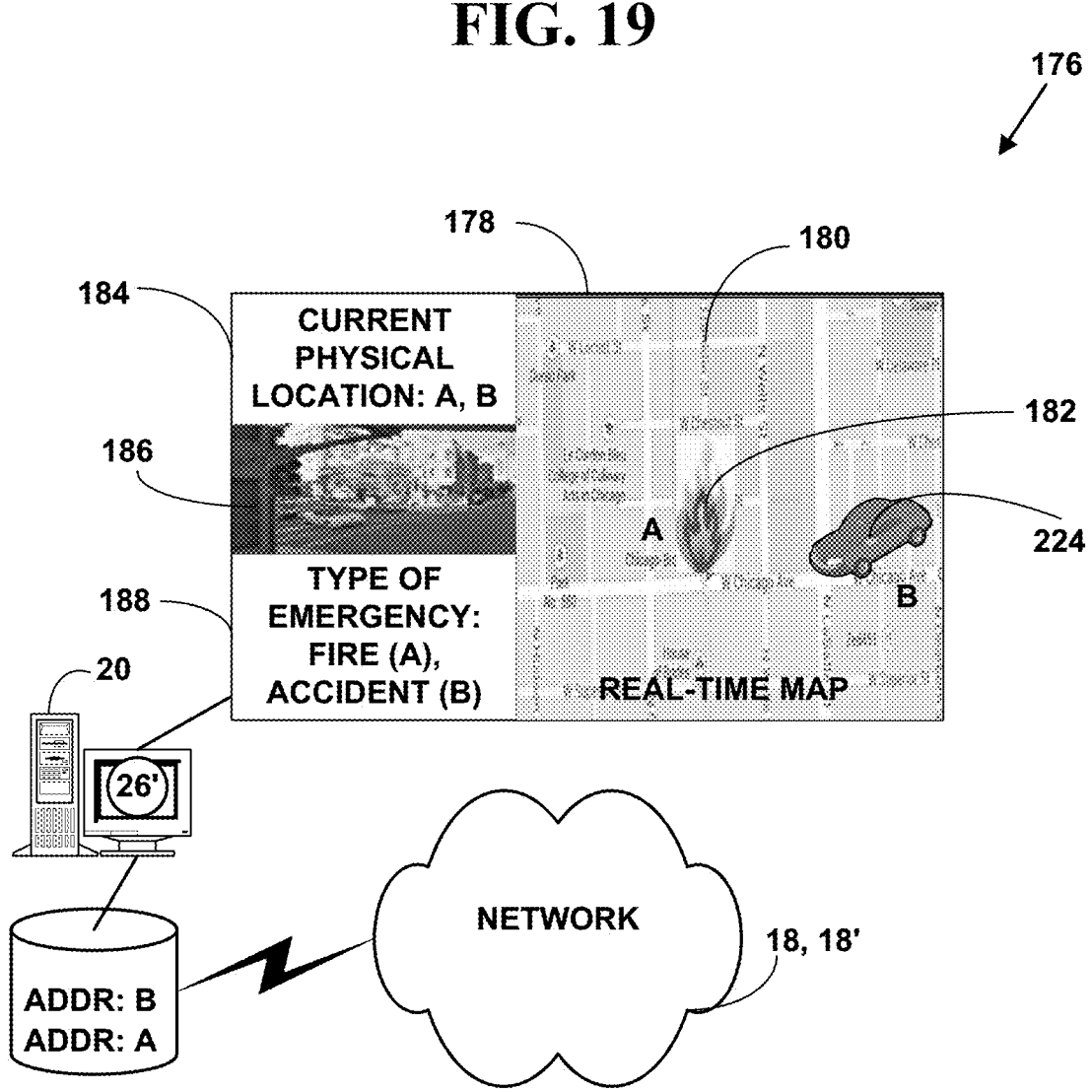
FIG. 19 is a block diagram illustrating a graphical emergency location information system (E-LIS) for displaying information determined by the method of FIG. 18.

FIG. 19 is a block diagram 176 illustrating a graphical emergency location information system (E-LIS) display interface 178 for displaying information determined by the method of FIG. 18 and the other location methods described herein in FIGS. 2-16.

The display system interface 178, includes, but is not limited to a map portion 180 including a graphical location marker 182 including a location of a type of emergency (e.g. fire, etc.), a determined current physical location portion 184 including the determined currently physical location 134, 165 of the first mobile wearable network device 158-164, 167, a picture portion 186 including a digital picture of the determined currently physical location 134, 165 of the first mobile wearable network device 158-164, 167 and an emergency information portion 188 including information about the type of emergency event. However, the present invention is not limited to such an embodiment and more, fewer and other types of portions can be used to display information on the display system interface 178.

The methods and systems describe herein determine and verify a location of wearable mobile devices in emergency situations with emergency messages including legacy 911, E911 and text-to-911 messages. The method and system provide a current physical geographic location for wearable mobile devices (e.g., a location, chair, desk or cubicle in a room on a building floor, campus, enterprise, city, state, region, country, continent, etc.), in an emergency situation such as an accident, fire, terrorist attack, military incident, weather, flood, event, etc. and forward the current physical geographic location to a legacy 911 network, NG-911 network, a Emergency Services IP networks (ESInet) or text-to-911 Short Message Services (SMS) networks.

Emergency Location of a Mobile Device with an Unmanned Aerial Vehicle (UAV)

An unmanned aerial vehicle (UAV) 27, commonly known as a "drone" and also referred to as a "Remotely Piloted Aircraft (RPA)" by the International Civil Aviation Organization (ICAO), is an aircraft without a human pilot aboard. There are different kind of drones 123 including: (1) UAS (Unmanned Air System); (2) UAV (Unmanned Aerial Vehicle); (3) RPAS (Remote Piloted Aircraft Systems) and (4) Model Aircraft. Its flight is controlled either autonomously by onboard computers or by the remote control of a pilot on the ground or in another vehicle. The typical launch and recovery method of an unmanned aircraft is by the function of an automatic system or an external operator on the ground. Historically, UAVs 27 were simple remotely piloted aircraft, but autonomous control is increasingly being employed.

The use of UAVs 27 are characterized by altitudes of flights. The following types of UAVs 27 fly at different altitudes, broadly characterized as: (1) Very high altitude (VHA): above 45,000 feet (more than 12 km); (2) High altitude (HA): from 20,000 to 45,000 feet (6 to 12 km); (3) Medium altitude (MA): from 10 to 20,000 feet (3 to 6 km); or (4) Low altitude (LA): between a few hundred and up to 10,000 feet (1 to 3 km).

The specific needs of UAV 27 include required UAV 123 capabilities to allow them to fly in "non-segregated" air-traffic controlled airspace. The requirements placed on mobile links to and from a UAV 27 are required in terms of aeronautical safety due to the fact that these vehicles are unmanned. An air-traffic control (ATC) link includes full automation of communications between on-board and ground systems. A remote pilot (RP) link places additional and more strenuous constraints on the radio communication bearer(s) and systems used in, not necessarily significant as regards the amount of volume of data to be exchanged, in as much as UAV 27 generally possess or will possess their own computerized autonomous flight management system, limiting the remote pilot (RP) interventions to that of supervising and/or re-establishing flight procedures or choosing the most appropriate one, should any contingency arise.

The UAV 27 communicates on Aeronautical Mobile Service (AMS) wireless frequency including, but not limited to: (a) 4400-4940 MHz; (b) 5030 (or 5010)-5090 MHz, (MLS "core" band; (c) 5090-5150 MHz ("MLS" extension band); (d) 5150-5250 MHz; (e) 5925-6700 MHz; (f) 22.5-23.6 GHz; (g) 24.75-25.5 GHz; or (h) 27-27.5 GHz.

Most UAVs 27 have cameras, microphones and other audiovisual equipment that are used to view and collect information objects of interest from the air. The audiovisual signals are typically sent from the UAV's 27 to a remote control center for viewing by an operator.

When a 911 call and/or E911 call is made from a mobile network device 12, 14, 16, 158-164, 167 or text-to-911 is sent, a wireless telecommunications carrier begins a preliminary location process for the mobile network device 12, 14, 16, 158-164, 167. At a preliminary level, the wireless communication carrier determines a wireless tower and antenna (i.e., sector, etc.) the mobile device 12, 14, 16, 158-164, 167 is connected to.

If the mobile network devices 12, 14, 16, 158-164, 167 is equipped with a GPS component, the wireless carrier can force the device 12, 14, 16, 158-164, 167 to activate its GPS component and when its GPS signal is locked into three satellites, the mobile network device 12, 14, 16, 158-164, 167 automatically stores its GPS (X,Y) coordinates that the wireless carrier can query from the mobile network device 12, 14, 16, 158-164, 167.

If the mobile network devices 12, 14, 16, 158-164, 167 is equipped with a Wireless Fidelity (Wi-Fi) component and/or Wi-Fi Aware component. The wireless carrier can force the device 12, 14, 16, 158-164, 167 to activate its Wi-Fi component or Wi-Fi Aware component. If the mobile network device 12, 14, 16, 158-164, 167 is within range of one or more known Wi-Fi access points such known Wi-Fi access points are used determine a preliminary location of the mobile network device 12, 14, 16, 158-164, 167.

In this case, the mobile network 12, 14, 16, 158-164, 167 reports all of the Wi-Fi Basic Service Set Identifiers (BSSID's) from each of the Wi-Fi access points the mobile network device 12, 14, 16, 158-164, 167 is in range of back to the wireless carrier. The wireless carrier would look up the BSSID's in a LIS and report the location of the strongest signal emitter to a PSAP 25 with an approximate location of the mobile network device 12, 14, 16, 158-164, 167.

If the mobile network device 12, 14, 16, 158-164, 167 is within range of one or more known Wi-Fi Aware devices, such known Wi-Fi Aware device are used determine a preliminary location of the mobile network device 12, 14, 16, 158-164, 167 without making a connection to the communications network 18, 18'.

If the mobile network device 12, 14, 16, 158-164, 167 is equipped with a Bluetooth component, the wireless carrier can force the device 12, 14, 16, 158-164, 167 to activate its Bluetooth component. If the mobile network device 12, 14, 16, 158-164, 167 is within range of one or more known Bluetooth beacons such known Bluetooth beacons are used determine a preliminary location of the mobile network device 12, 14, 16, 158-164, 167.

Bluetooth beacons are transmitters that use Bluetooth Low Energy 4.0 to broadcast signals that can be picked-up by mobile network devices 12, 14, 16, 158-164, 167. These Bluetooth transmitters are powered by batteries or a fixed power source such as a USB adapter. When a mobile network device is in a Bluetooth beacon's proximity, the beacon will automatically recognize the mobile network device 12 and will be able to interact with that device 12, 14, 16, 158-164, 167.

Additionally, again, depending on wireless technology being used by wireless network device 12, 14, 16, 158-164, 167, the wireless carrier can use triangulation based on received signal strength from multiple towers/sectors to determine an approximate location of the mobile network device 12, 14, 16, 158-164, 167.

If any of these communication components or other communications components (e.g., M2M, NFC, etc.) not active at the time of a 9-1-1 call and/or text-to-911 event, the mobile application 26 and/or firmware in the mobile network device 12, 14, 16, 158-164, 167 automatically activates any of the communication components that are not active to assist in determine a current physical location of the mobile network device 12.

In another embodiment, the server application 26' on the server network device 20 sends a message back to the mobile application 26 on the mobile network device 12, 14, 16, 158-164, 167 to automatically activate any of the communication components that are not active in the mobile network device 12, 14, 16, 158-164, 167.

However, the present invention is not limited to these embodiments and other embodiments can be used to practice the invention.

There are difficulties locating a mobile network 12, 14, 16, 158-164, 167 in an urban area during an emergency event as was discussed extensively herein.

There are also difficulties locating a mobile network 12, 14, 16, 158-164, 167 in a rural area during an emergency event. An actual current physical location in a rural area may include a 3D and/or 2D position on a mountain, in a valley, in a forest, etc. that may not be near even a local road. There are also difficulties locating a mobile network 12, 14, 16, 158-164, 167 in a rural area because communications towers may be sparse, have low signal strength, be affected by natural topography (e.g., mountains, valleys, etc.) or be destroyed or compromised as a result of the emergency event. As a result, one or more UAV's 27 are used in the E-LIS 10 to assist in locating the mobile network device 12, 14, 16, 158-164, 167 in the rural area.

In an emergency situation, a mobile network device 12, 14, 16, 158-164, 167 provides location information to one or more unmanned aerial vehicles (UAVs) 27 each with one or more processors, on a wireless aviation frequency and/or a telephony frequency to locate the mobile network device 12, 14, 16, via the one or more UAVs 27.

Figure 20:
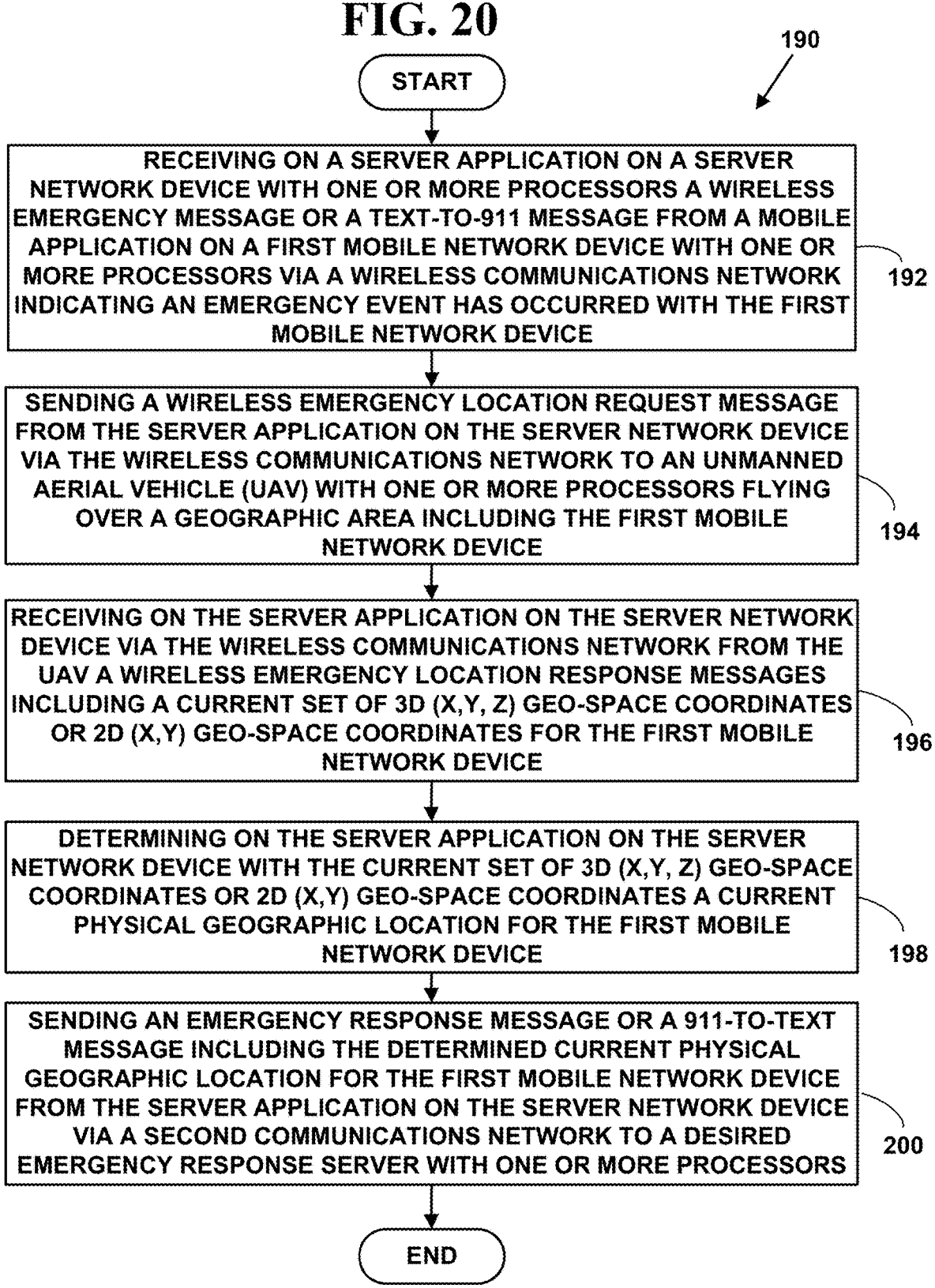
FIG. 20 is a flow diagram is a flow diagram illustrating a method for an emergency location information system (E-LIS) with an unmanned aerial vehicle (UAV)

FIG. 20 is a flow diagram is a flow diagram illustrating a Method 190 for an emergency location information system (E-LIS) with an unmanned aerial vehicle (UAV). At Step 192, a server application on a server network device with one or more processors receives a wireless emergency message or a text-to-911 message from a mobile application on a first network device with one or more processors via a wireless communications network indicating an emergency event has occurred with the first network device. At Step 194, the server application on the server network device sends via the wireless communications network a wireless emergency location request message to an unmanned aerial vehicle (UAV) with one or more processors flying over a geographic area including the first mobile network device. At Step 196, the server application on the server network device receives via the wireless communications network from the UAV a wireless emergency location response messages including a current set of 3D (X, Y, Z) geo-space coordinates and/or 2D (X,Y) geo-space coordinates for the first mobile network device. At Step 198, the server application on the server network device determines with the current set of 3D (X, Y, Z) geo-space coordinates and/or 2D (X,Y) geo-space coordinates a current physical geographic location for the first mobile network device. At Step 200, the server application on the server network device sends via a second communications network to a desired emergency response server with one or more processors an emergency response message or a 911-to-text message including the determined current physical geographic location for the first mobile network device.

Method 198 is illustrated with one exemplary embodiment. However, the present invention is not limited to such an embodiment and other embodiments can also be used to practice the invention.

In such an exemplary embodiment, At Step 192, a server application 26' on a server network device 20 with one or more processors receives a wireless emergency message or a text-to-911 message from a mobile application 26 on a first network device 12 with one or more processors via a wireless communications network 18 indicating an emergency event (e.g., weather event, tornado 29) has occurred with the first network device 12, 14, 16, 158-164, 167 (e.g., 12, for simplicity, etc.).

In one embodiment, the wireless emergency message includes an E911 communication message, a legacy 911 communication message, NG-911 communication message, a Common Alerting Protocol (CAP) message or PAM Interface Protocol (PAM) message.

In one embodiment, the emergency event is automatically detected by an accelerometer, radio frequency identifier (RFID) sensor, a barometric sensor, other pressure sensor, a moisture sensor, an altimeter and/or a temperature sensor included on the first mobile network device 12.

At Step 194, the server application 26' on the server network device 20 sends via the wireless communications network 18 a wireless emergency location request message to an unmanned aerial vehicle (UAV) 27 with one or more processors flying over a geographic area including the first mobile network device 12.

In one embodiment, the server application 26' on the server network device 20 sends via the wireless communications network 18 the wireless emergency location request message to the UAV 27 on an Aeronautical Mobile Service (AMS) wireless frequency.

In another embodiment, the server application 26' on the server network device 20 sends via the wireless communications network 18 the wireless emergency location request message to the UAV 27 on another pre-determined wireless aviation frequency.

In another embodiment, the server application 26' on the server network device 20 sends via the wireless communications network 18 the wireless emergency location request message to the UAV 27 on a wireless telecommunications frequency. In such an embodiment, the UAV 27 includes a wireless telecommunications transceiver such as those included on the first mobile network device 12 for communicating over the wireless telecommunications frequency via the wireless communications network 18. In another embodiment, the UAV 27 communicates with the wireless communications network via a server network device (e.g., 20, etc.) that includes a wireless component that can send and receive wireless messages on one or more different aviation frequencies including, but not limited to, Aeronautical Mobile Service (AMS) wireless frequencies and/or other aviation wireless frequencies.

In another embodiment, the mobile application 26 on the first mobile network device 12 sends a first wireless emergency message or a first text-to-911 message on a pre-determined wireless aviation frequency via the wireless communications network 18 directly to the UAV 27 indicating an emergency event has occurred with the first mobile network device 12 (See Method 202).

However, the present invention is not limited to these embodiments, and other embodiments can be used to practice the invention.

At Step 196, the server application 26' on the server network device 26 receives via the wireless communications network 18 from the UAV 27 a wireless emergency location response messages including a current set of 3D (X, Y, Z) geo-space coordinates and/or 2D (X,Y) geo-space coordinates for the first mobile network device 12.

In one embodiment, the UAV 27 locates the first mobile network device 12 in the geographic area from the UAV 27 with one or more of wireless Global Positioning System (GPS) signals, Wireless Fidelity (Wi-Fi) signals, Wi-Fi Aware signals, wireless Bluetooth signals or cell tower signals being sent from the first mobile network device 12.

In one embodiment, the one or more signals are generated from one or more communications components (i.e., GPS, Wi-Fi, Wi-Fi Aware, Bluetooth, etc.) on the first mobile network device 12 that were automatically activated by the first mobile network device 12 upon sending the first wireless emergency message or a first text-to-911 message. In yet another embodiment, a user of the first mobile network device 12 can also manually activate the one or more communications components.

However, the present invention is not limited to these embodiments, and other embodiments can be used to practice the invention.

At Step 198, the server application 26' on the server network device 20 determines with the current set of 3D (X, Y, Z) geo-space coordinates and/or 2D (X,Y) geo-space coordinates a current physical geographic location 134, 165 for the first mobile network device 12.

At Step 200, the server application 26' on the server network device 20 sends via a second communications network 18' to a desired emergency response server 25 with one or more processors an emergency response message or a 911-to-text message including the determined current physical geographic location 134, 165 for the first mobile network device 12.

In one embodiment, the second communications network 18' is the same communications network as the wireless communications network 18 (e.g., both E911 networks, etc.) In another embodiment, the second communications network 18' is a different communications network (e.g., the first a legacy 911 and the second E911 network, a wired communications network, a data network (e.g., IP network, etc.) etc. Various combinations of networks can be used to practice the invention.

However, the present invention is not limited to these embodiments, and other embodiments can be used to practice the invention.

Figure 21:
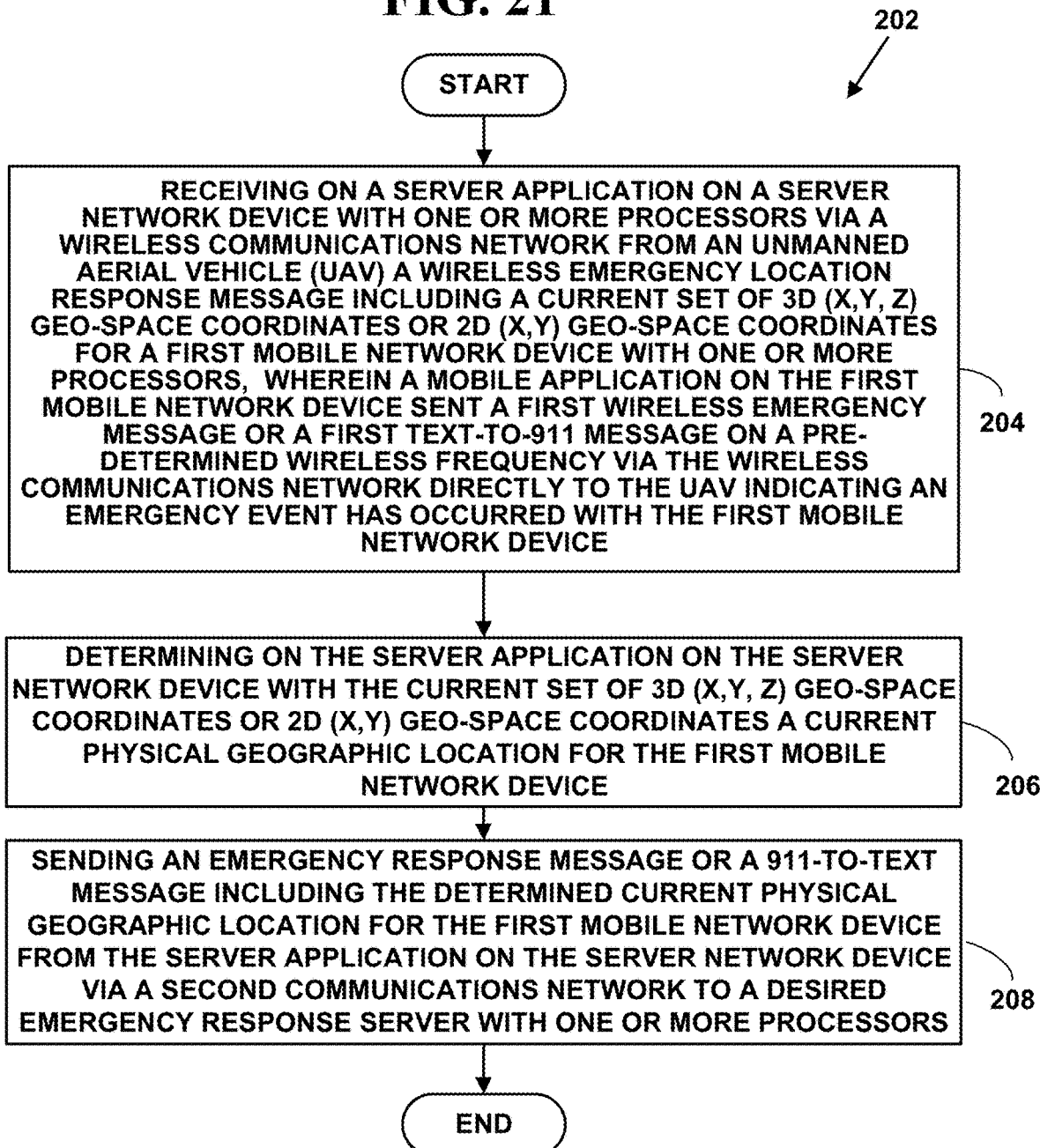
FIG. 21 is a flow diagram is a flow diagram illustrating a method for an emergency location information system (E-LIS) with an unmanned aerial vehicle (UAV)

FIG. 21 is a flow diagram is a flow diagram illustrating a Method 202 for an emergency location information system (E-LIS) with an unmanned aerial vehicle (UAV). At Step 204, a server application on a server network device with one or more processors receives via a wireless communications network from an unmanned aerial vehicle (UAV) a wireless emergency location response message including a current set of 3D (X, Y, Z) geo-space coordinates or 2D (X,Y) geo-space coordinates for a first mobile network device with one or more processors. A mobile application on the first mobile network device sent a first wireless emergency message or a first text-to-911 message on a pre-determined wireless frequency via the wireless communications network directly to the UAV indicating an emergency event has occurred with the first mobile network device. At Step 206, on the server application on the server network device determines with the current set of 3D (X, Y, Z) geo-space coordinates or 2D (X,Y) geo-space coordinates a current physical geographic location for the first mobile network device. At Step, 208 an emergency response message or a 911-to-text message including the determined current physical geographic location for the first mobile network device is sent from the server application on the server network device via a second communications network to a desired emergency response server with one or more processors.

Method 202 is illustrated with one exemplary embodiment. However, the present invention is not limited to such an embodiment and other embodiments can also be used to practice the invention.

In such an exemplary embodiment, at Step 204, a server application 26' on a server network device 20 with one or more processors receives via a wireless communications network 18 from an unmanned aerial vehicle (UAV) 27 a wireless emergency location response message including a current set of 3D (X, Y, Z) geo-space coordinates or 2D (X,Y) geo-space coordinates for a first mobile network device 12, 14, 16, 158-164, 167 (e.g., 12, etc.) with one or more processors. A mobile application 26 on the first mobile network device 12 sends a first wireless emergency message or a first text-to-911 message on a pre-determined wireless frequency via the wireless communications network 18 directly to the UAV 27 indicating an emergency event has occurred with the first mobile network device 12.

At Step 206, the server application 26' on the server network device 20 determines with the current set of 3D (X, Y, Z) geo-space coordinates or 2D (X,Y) geo-space coordinates a current physical geographic location 134, 165 for the first mobile network device 12.

At Step 208, an emergency response message or a 911-to-text message including the determined current physical geographic location 134, 165 for the first mobile network device 12 is sent from the server application 26' on the server network device 20 via a second communications network 18, 18' to a desired emergency response server 25 with one or more processors.

Figure 22:
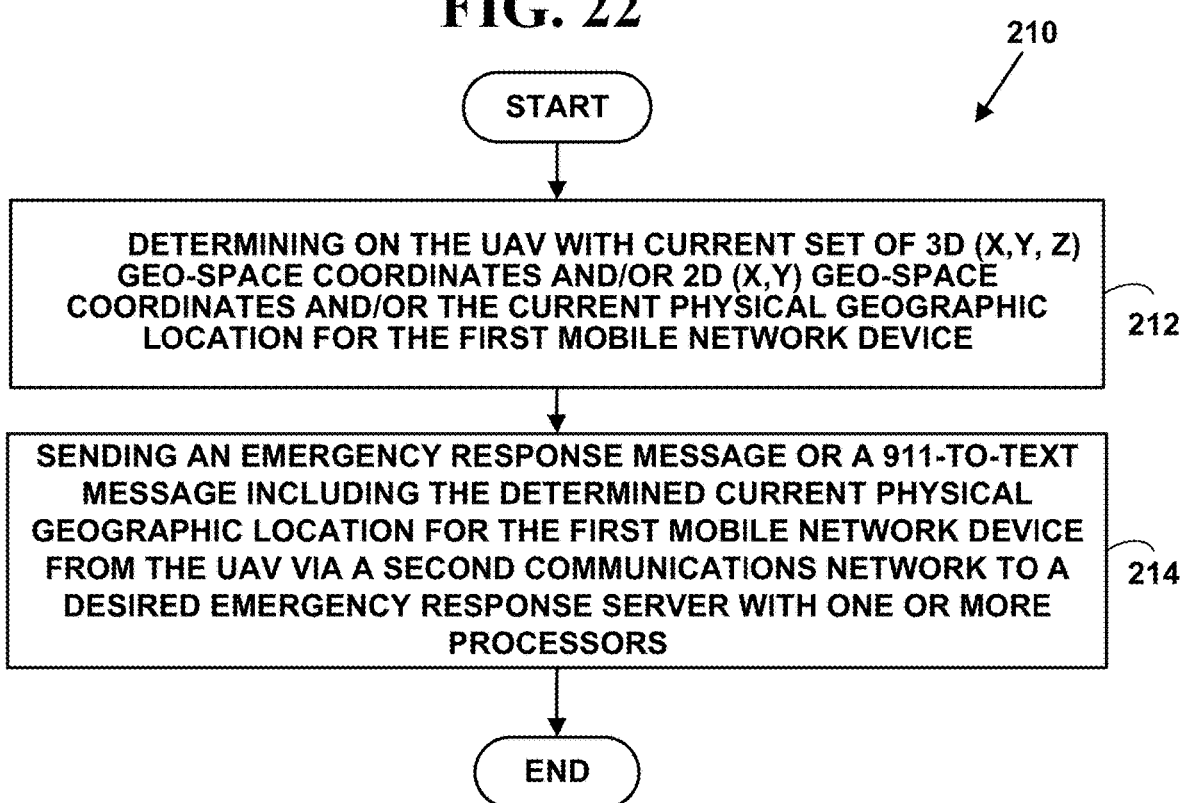
FIG. 22 is a flow diagram is a flow diagram illustrating a method for an emergency location information system (E-LIS) with an unmanned aerial vehicle (UAV)

FIG. 22 is a flow diagram is a flow diagram illustrating a Method 210 for an emergency location information system (E-LIS) with an unmanned aerial vehicle (UAV). At Step 212, the UAV determines with current set of 3D (X, Y, Z) geo-space coordinates or 2D (X,Y) geo-space coordinates the current physical geographic location for the first mobile network device. At Step 214, the UAV sends an emergency response message or a 911-to-text message including the determined current physical geographic location for the first mobile network device directly from the UAV via a second communications network to a desired emergency response server with one or more processors.

Method 210 is illustrated with one exemplary embodiment. However, the present invention is not limited to such an embodiment and other embodiments can also be used to practice the invention.

In such an exemplary embodiment at Step 212, the UAV 27 automatically determines with current set of 3D (X, Y, Z) geo-space coordinates or 2D (X,Y) geo-space coordinates the current physical geographic location 134, 165 for the first mobile network device 12.

At Step 214, the UAV 27 sends an emergency response message or a 911-to-text message including the determined current physical geographic location for the first mobile network device 12 directly from the UAV 27 via a second communications network 18, 18' to a desired emergency response server 25 with one or more processors.

In one embodiment, the first mobile application 26 on the first mobile network device 12 periodically sends its current set of 3D (X, Y, Z) geo-space coordinates or 2D (X,Y) geo-space coordinates and/or its current physical location 134, 165 to the UAV 27 and/or server network device 20. In such an embodiment, the UAV 27 and/or server network device 20 always knows current location for the first mobile network device 12 in plural different formats and can immediately send this location information to a desired server 20 and/or emergency response server 25 when an emergency event occurs.

However, the present invention is not limited to such an embodiment and other embodiments can also be used to practice the invention.

Figure 23:
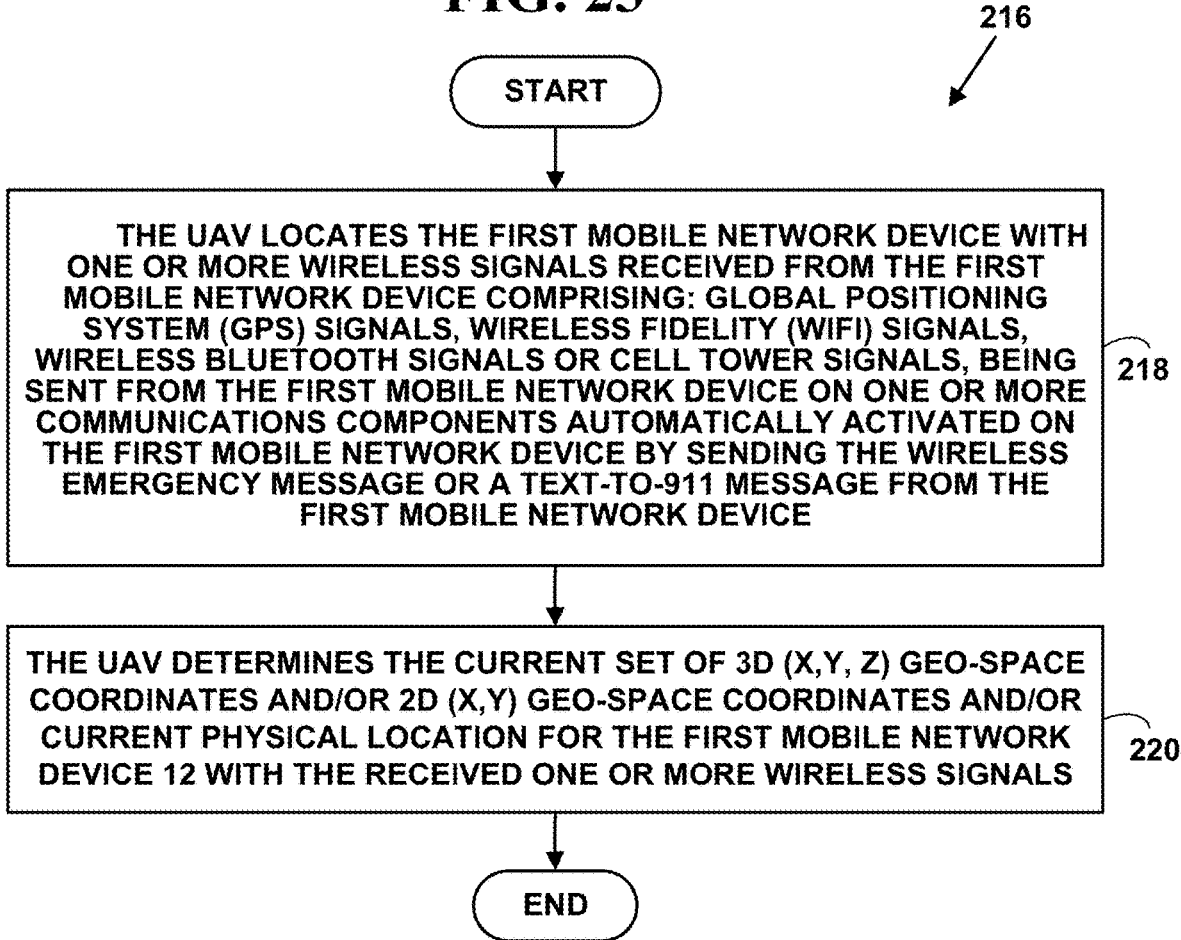
FIG. 23 is a flow diagram is a flow diagram illustrating a method for an emergency location information system (E-LIS) with an unmanned aerial vehicle (UAV)

FIG. 23 is a flow diagram is a flow diagram illustrating a Method 216 for an emergency location information system (E-LIS) with an unmanned aerial vehicle (UAV). At Step 218, the UAV locates the first mobile network device with one or more wireless signals received from the first mobile network device comprising: Global Positioning System (GPS) signals, Wireless Fidelity (Wi-Fi) signals, Wi-Fi Aware signals, wireless Bluetooth signals or cell tower signals, being sent from the first mobile network device on one or more communications components automatically activated on the first mobile network device by sending the wireless emergency message or a text-to-911 message from the first mobile network device. At Step 220, the UAV determines the current set of 3D (X, Y, Z) geo-space coordinates and/or 2D (X,Y) geo-space coordinates and/or current physical location for the first mobile network device with the received one or more wireless signals.

Method 216 is illustrated with one exemplary embodiment. However, the present invention is not limited to such an embodiment and other embodiments can also be used to practice the invention.

In such an exemplary embodiment at Step 218, the UAV 27 locates the first mobile network device 12 with one or more wireless signals received from the first mobile network device comprising: Global Positioning System (GPS) signals, Wireless Fidelity (Wi-Fi) signals, Wi-Fi Aware signals, wireless Bluetooth signals or cell tower signals, being sent from the first mobile network device 12 on one or more communications components automatically activated on the first mobile network device 12 by sending the wireless emergency message or a text-to-911 message from the first mobile network device 12.

At Step 220, the UAV 27 determines the current set of 3D (X, Y, Z) geo-space coordinates and/or 2D (X,Y) geo-space coordinates and/or current physical location 134, 165 for the first mobile network device 12 with the received one or more wireless signals.

The present invention is not limited to the embodiments described and more, fewer and/or other combinations of locating a mobile network device with assistance from a UAV 27 can be used.

The methods and systems presented herein determine a location of a network device in emergency situations with emergency messages including legacy 911, E911, NG-911, and text-to-911 messages from a UAV. The method and system provide a current physical geographic location for mobile network devices in urban areas (e.g., location, chair, desk, cubicle in a room on a building floor, campus, enterprise, city, state, region, country, continent, etc.) and rural areas in an emergency situation such as an accident, fire, terrorist attack, military incident, weather, flood event, etc. and forward the current physical geographic location to a legacy 911 network, NG-911 network, a Emergency Services IP networks (ESInet) or text-to-911 Short Message Services (SMS) networks to alert emergency responders.

Emergency Location of Automated Vehicles

A "automated vehicle," or autonomous vehicle, self-driving vehicle and/or robotic vehicle is an automated vehicle capable of fulfilling the main transportation capabilities of a traditional vehicle such as a car, truck, motorcycle, locomotive, boat, ship, airplane, bicycle, Unmanned Aerial Vehicle (UAV), etc. An automated vehicle is capable of sensing its own environment and safely navigating without human input.

Automated vehicles sense their surroundings with such techniques as radar, GPS, cellular telephone, computer vision and other techniques. Advanced control systems interpret sensory information to identify appropriate navigation paths, as well as obstacles and relevant signage. By definition, automated vehicles are capable of updating their maps based on sensory input, allowing the vehicles to keep track of their position even when conditions change, when they enter uncharted environments (e.g., go off road, are forced into a detour, go into a parking structure, a tunnel, etc.), or an emergency situation occurs (e.g., weather, military, terrorist, crime, accident, etc.).

One example of an automated vehicle is the GOOGLE Self-Driving Car. This is a project by GOOGLE that involves developing technology for autonomous cars, mainly electric cars. The software powering GOOGLE's cars is called GOOGLE CHAUFFEUR. GOOGLE's robotic cars currently include a LIDAR system. LIDAR is a remote sensing technology that measures distance by illuminating a target with a laser and analyzing the reflected light. The range finder is mounted on a top of the car is a VELODYNE 64-beam laser. This laser allows the vehicle to generate a detailed 3D map of its environment. The car then takes these generated maps and combines them with high-resolution maps of the world, producing different types of data models that allow it to drive itself. As of June 2014, the system works with a very high definition inch-precision map of the area the vehicle is expected to use, including how high the traffic lights are; in addition to on-board systems, some computation is performed on remote computer farms.

In an interview with Forbes in February of 2015, Mark Fields, CEO of Ford estimated that fully autonomous vehicles would be available on the market within 5 years. Expert members of the Institute of Electrical and Electronics Engineers (IEEE) have determined that automated vehicles will be the most viable form of intelligent transportation. They estimate that up to 75% of all vehicles will be autonomous by about 2040.

In many instances, an occupant of an automated vehicle may have a permanent disability (e.g., is blind, paralyzed, etc.) or a medical problem (e.g., vision problem, speech problem, etc.) and is not capable of communicating with emergency personal after an accident or during an emergency situation. Even if the occupant of an automated vehicle is not disabled, the location of such automated vehicles and/or a mobile network device of the occupant (e.g., smartphone, tablet, wearable, etc.) need to be determined in emergency and non-emergency situations.

Figure 24:
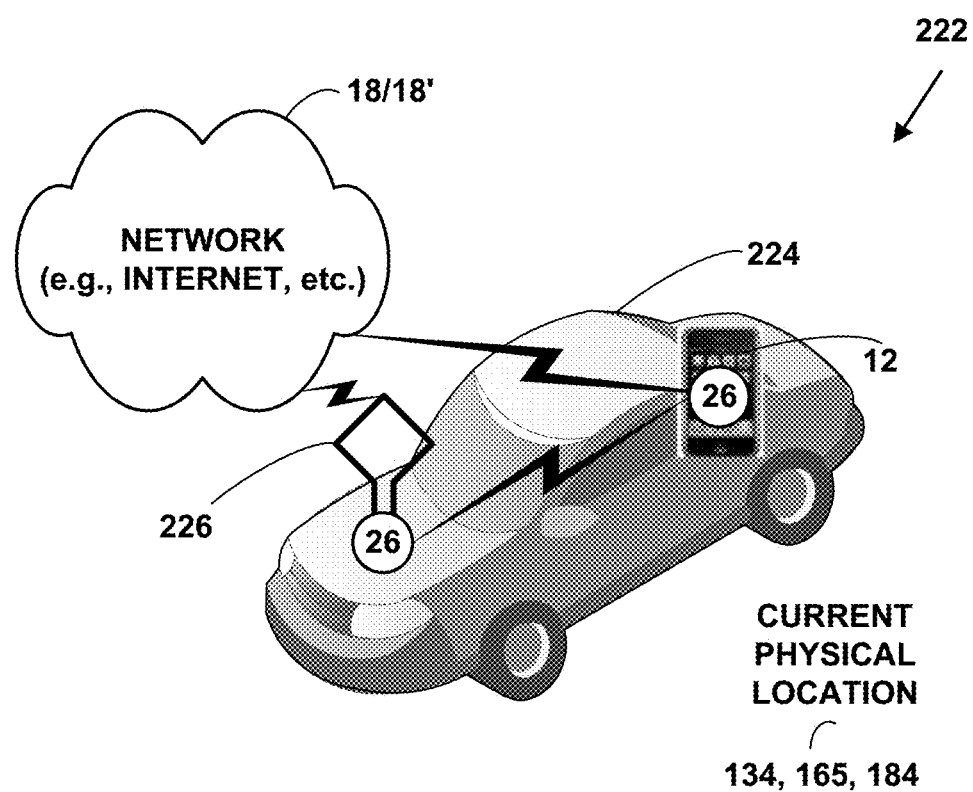
FIG. 24 is a block diagram illustrating an automated vehicle.

FIG. 24 is a block diagram 222 illustrating an automated vehicle 224. The automated vehicle 224 includes an electronic component 226 with one or more processors that allows the vehicle to drive and navigate without the assistance of a driver. The electronic component 226 includes an emergency location application 26 to allow the automated vehicle 224 to be located in an emergency situation.

Figure 25:
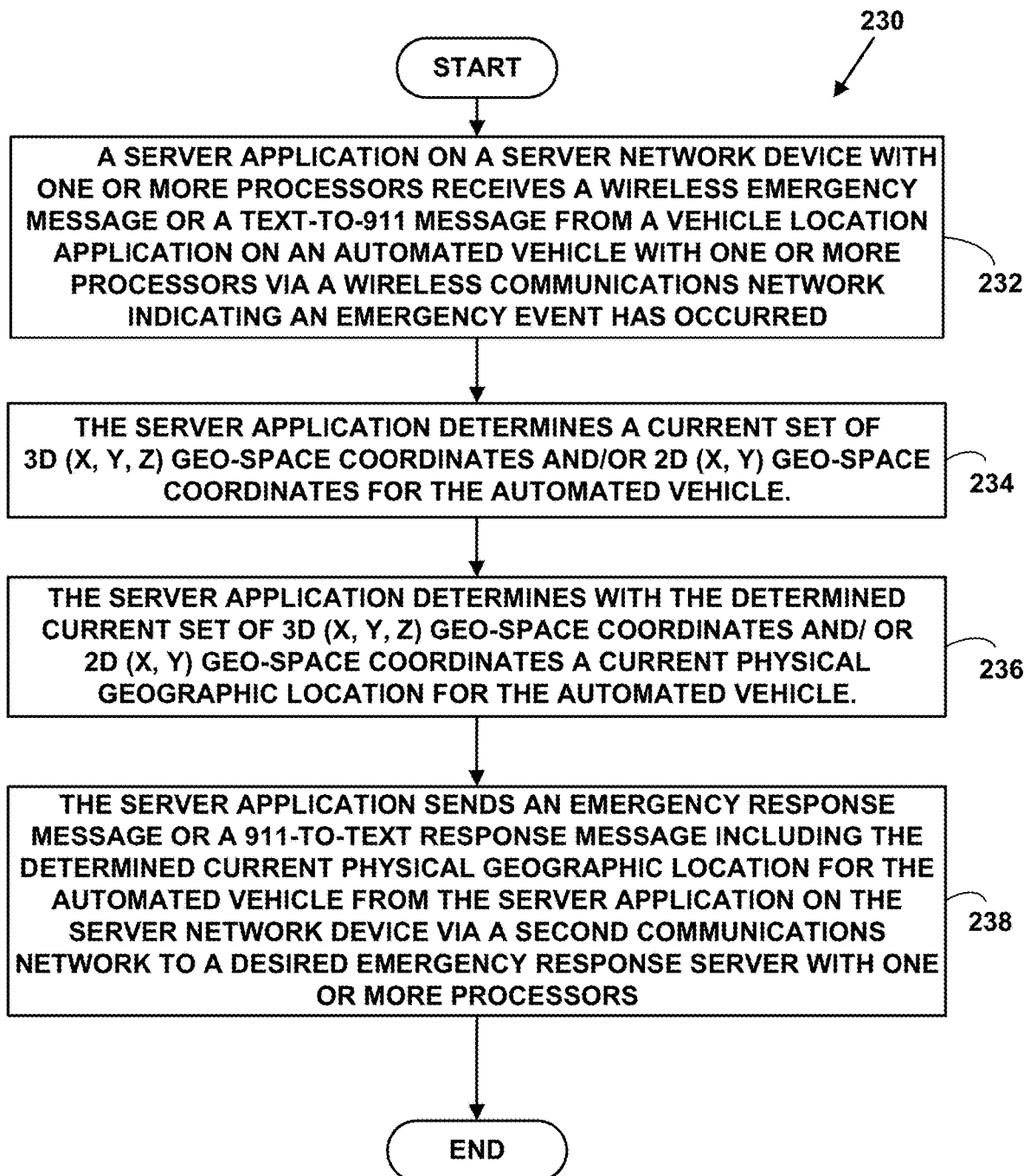
FIG. 25 is a flow diagram illustrating a method for an emergency location information system (E-LIS) with an automated vehicle.

FIG. 25 is a flow diagram illustrating a Method 230 for an emergency location information system (E-LIS) with an automated vehicle 224. At Step 232, a server application on a server network device with one or more processors receives a wireless emergency message or a text-to-911 message from a vehicle location application on an automated vehicle with one or more processors via a wireless communications network indicating an emergency event has occurred. At Step 234, the server application determines a current set of 3D (X, Y, Z) geo-space coordinates or 2D (X, Y) geo-space coordinates for the automated vehicle. At Step 236, the server application determines with the determined current set of 3D (X, Y, Z) geo-space coordinates or 2D (X, Y) geo-space coordinates a current physical geographic location for the automated vehicle. At Step 238, the server application sends an emergency response message or a 911-to-text response message including the determined current physical geographic location for the automated vehicle from the server application on the server network device via a second communications network to a desired emergency response server with one or more processors.

Method 230 is illustrated with one exemplary embodiment. However, the present invention is not limited to such an embodiment and other embodiments can also be used to practice the invention.

In such an exemplary embodiment at Step 232, a server application 26' on a server network device (e.g., 20, etc.) with one or more processors receives a wireless emergency message or a text-to-911 message from a vehicle location application 26 on an automated vehicle 224 with one or more processors via a wireless communications network 18, 18' indicating an emergency event has occurred.

In one embodiment, the automated vehicle 224, includes, but is not limited to, a car, truck, boat, ship, locomotive, airplane, motorcycle, Unmanned Aerial Vehicle (UAV) 27, and/or bicycle. However, the present invention is not limited to the automated vehicle described and other automated vehicles can be used to practice the invention.

In one embodiment, wireless emergency message includes, but is not limited to, an E911 communication message, NG-911 communication message, a legacy 911 communication message, a Common Alerting Protocol (CAP) message or PAM Interface Protocol (PAM) message. However, other wireless emergency messages can be used to practice the invention and the invention is not limited to these wireless emergency messages.

In one embodiment, the emergency event includes a health emergency, an accident, event, fire event, terrorist attack event, military event, weather event, flood event and/or crime event. However, the present invention is not limited to these emergency events and other emergency events can be used to practice the invention.

In another embodiment, the emergency event includes the emergency event includes an emergency event automatically detected by, an emergency button, an accelerometer, radio frequency identifier (RFID) sensor, a barometric sensor, a other pressure sensor (e.g., gas, liquid, etc.) moisture sensor, an altimeter, air bag deployment sensor, immersion sensor, biometric sensor, EPIRB sensor, ELB sensor, PLB sensor, ELT sensor, and/or a temperature sensor included in the automated vehicle 224.

At Step 234, the server application 26' determines a current set of 3D (X, Y, Z) geo-space coordinates and/or 2D (X, Y) geo-space coordinates for the automated vehicle 224.

In one embodiment, the wireless emergency message includes the current 3D (X, Y, Z) geo-space coordinates and/or 2D (X, Y) geo-space coordinates of the automated vehicle 224 in the wireless emergency message.

In another embodiment, the vehicle location application 26 on the automated vehicle automatically and periodically updates with the server application 26' its current set of 3D (X, Y, Z) geo-space coordinates and/or 2D (X, Y) geo-space coordinates for the automated vehicle 224.

In another embodiment, the server application 26' automatically and periodically queries the vehicle location application 26 on the automated vehicle 224 for its current set of 3D (X, Y, Z) geo-space coordinates and/or 2D (X, Y) geo-space coordinates.

However, the present invention is not limited to such embodiments and other embodiments can be used to practice the invention and to obtain the current set of 3D (X, Y, Z) geo-space coordinates and/or 2D (X, Y) geo-space coordinates for the automated vehicle 224.

At Step 236, the server application 26' determines with the determined current set of 3D (X, Y, Z) geo-space coordinates and/or 2D (X, Y) geo-space coordinates a current physical geographic location 134, 165, 184 for the automated vehicle 224.

In one embodiment, the current physical geographic location 134, 165, 184 for the automated vehicle 224 includes a physical location in an urban or rural area, a location in a parking garage, a location in a building, a location on a street in an enterprise, campus, village, town, city, state, country or continent or global region. However, the present invention is not limited to such embodiments and other embodiments can be used to practice the invention.

At Step 238, the server application 26' sends an emergency response message or a 911-to-text response message including the determined current physical geographic location for the automated vehicle 224 from the server application 26' on the server network device 20 via a second communications network 18, 18' to a desired emergency response server (e.g., 25, etc.) with one or more processors.

In one embodiment, the second communications network 18, 18' includes, but is not limited to, a wired or wireless, public switch telephone network (PSTN), cloud network, legacy 911 network, E911 network, NG-911 network, a Emergency Services IP networks (ESInet) and/or text-to-911 Short Message Services (SMS) networks.

In one embodiment, the first communications network 18, 18' is the same communications network as the second communications network 18, 18'. In another embodiment, the first and second communications networks 18, 18' are different communications networks.

In one embodiment, emergency response server 25, includes, but is not limited to, a legacy 911, E911 network, NG-911 network, an Emergency Services IP network (ESInet) and/or text-to-911 Short Message Services (SMS) server 25. However, the present invention is not limited to such embodiments and other types of emergency response servers can be used to practice the invention.

In one embodiment, the vehicle location application 26 on the automated vehicle 224 locates the vehicle 224 in a physical geographic area with one or more of wireless Global Positioning System (GPS) signals, Wireless Fidelity (Wi-Fi) signals, Wi-Fi Aware, near field communications (NFC), machine-to-machine (M2M) communications, Bluetooth signals, 911, E911, NG-911 signals and/or cell tower signals being sent from the automated vehicle 224 from one or more communications components 226 on the automated vehicle 224 automatically activated on the automated vehicle 224 by sending the wireless emergency message or a text-to-911 message from the automated vehicle 224 when an emergency event occurs.

In one embodiment, the server network device 20 or another server network device 22 with one or more processors displays in real-time on a graphical map 180 the determined current physical geographic location 184 for the automated vehicle 224 for one or more desired emergency response agencies.

In another embodiment, the server network device 20 or another server network device 22 with one or more processors displays visual images 186 of the automated vehicle 224 for one or more desired emergency response agencies.

However, the present invention is not limited to such embodiments and other embodiments, with and/or without real-time display can be used to practice the invention.

In one embodiment, a mobile application 26 on a mobile network device 12, 14, 16, 158, 160, 162, 164, 166, 167, with one or more processors located inside the automated vehicle 224 sends a mobile wireless emergency message or a mobile text-to-911 message via the wireless communications network 18, 18' to the server application 26' on the server network device 26 indicating an emergency event (See FIGS. 1-23 and related text) has occurred with the automated vehicle 224.

However, the present invention is not limited to such an embodiment and other embodiments can be used to practice the invention.

In one embodiment, mobile network device includes a smart phone 12, a table computer 14, laptop computer 16, and/or wearable mobile network device 158, 160, 162, 164, 166, 167, each with one or more processors. However, the present invention is not limited to such an embodiment and other embodiments can be used to practice the invention.

In such an embodiment, the mobile network device 12, 14, 16, 158, 160, 162, 164, 166, 167, being used by an occupant of the automated vehicle can be used to locate the automated vehicle 224 after an emergency event. However, the present invention is not limited to such an embodiment and other embodiments can be used to practice the invention.

In another embodiment, the mobile network device 12, 14, 16, 158, 160, 162, 164, 166, 167 within the automated vehicle 224 receives one or more wireless signals comprising: Global Positioning System (GPS) signals, Wireless Fidelity (Wi-Fi) signals, Wi-Fi Aware signals, near field communications (NFC), machine-to-machine (M2M) communications, Bluetooth signals and/or cell tower signals automatically activated by the mobile application 26 on the mobile network device 12, 14, 16, 158, 160, 162, 164, 166, 167 initiated by sending the mobile wireless emergency message or the mobile text-to-911 message from the mobile network device 12, 14, 16, 158, 160, 162, 164, 166, 167. The automated vehicle 224 and/or the mobile network device 12, 14, 16, 158, 160, 162, 164, 166, 167 determines the current set of 3D (X, Y, Z) geo-space coordinates or 2D (X, Y) geo-space coordinates and or current physical location for the automated vehicle 224 and/or the mobile network device 12, 14, 16, 158, 160, 162, 164, 166, 167 with the received one or more wireless signals. However, the present invention is not limited to such an embodiment and other embodiments can be used to practice the invention.

Figure 26:
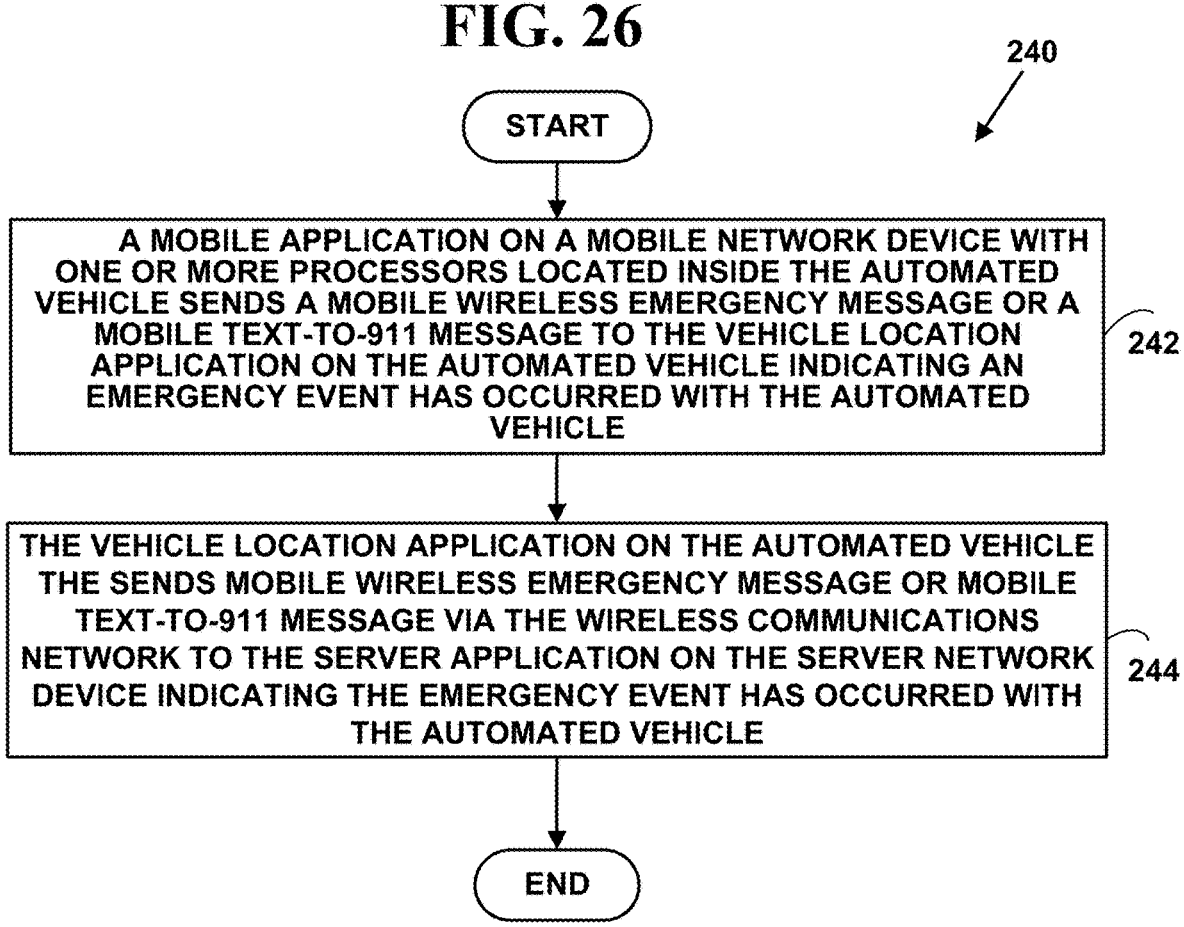
FIG. 26 is a flow diagram illustrating a method for an emergency location information system (E-LIS) with an automated vehicle.

FIG. 26 is a flow diagram illustrating a Method 240 for an emergency location information system (E-LIS) with an automated vehicle 224. At Step 242, a mobile application on a mobile network device with one or more processors located inside the automated vehicle sends a mobile wireless emergency message or a mobile text-to-911 message to the vehicle location application on the automated vehicle indicating an emergency event has occurred with the automated vehicle. At Step 244, the vehicle location application on the automated vehicle sends mobile wireless emergency message or mobile text-to-911 message via the wireless communications network to the server application on the server network device indicating the emergency event has occurred with the automated vehicle.

Method 240 is illustrated with one exemplary embodiment. However, the present invention is not limited to such an embodiment and other embodiments can also be used to practice the invention.

In such an exemplary embodiment at Step 242, a mobile application 26 on a mobile network device 12, 14, 16, 158, 160, 162, 164, 166, 167 with one or more processors located inside the automated vehicle 224 sends a mobile wireless emergency message or a mobile text-to-911 message to the vehicle location application 26 on the automated vehicle 224 indicating an emergency event has occurred with the automated vehicle 26.

At Step 244, the vehicle location application 26 on the automated vehicle 224 sends mobile wireless emergency message or mobile text-to-911 message via the wireless communications network 18, 18' to the server application 26' on the server network device 20 indicating the emergency event has occurred with the automated vehicle 24.

The Internet of Things (IoT)

The Internet of things (IoT) is an inter-networking of physical devices, driver operated and driverless vehicles, unmanned aerial vehicles (UAV), commonly known as "drones," appliances, "smart" buildings, and other items embedded with electronics, software, sensors, actuators, and network connectivity that enable these objects to collect and exchange data and interact with a wired and/or a wireless communications network 18, 18' like the Internet, LAN, WAN, mesh cloud, etc.

In 2013 the Global Standards Initiative on Internet of Things (IoT-GSI) defined the IoT as "the infrastructure of the information society." The IoT allows objects to be sensed or controlled remotely across existing network infrastructure, creating opportunities for more direct integration of the physical world into computer-based systems, and resulting in improved efficiency, accuracy and economic benefit in addition to reduced human intervention.

When an IoT network device is augmented with sensors and actuators, the technology becomes an instance of the more general class of cyber-physical systems, which also encompasses technologies such as smart grids, virtual power plants, smart homes, intelligent transportation and smart cities.

Each IoT "thing" or network device is uniquely identifiable through its embedded computing system but is able to interoperate within the existing Internet or other network infrastructure. Experts estimate that the IoT will consist of almost 50 billion devices by 2020.

Typically, IoT is expected to offer advanced connectivity of devices, systems, and services that goes beyond machine-to-machine (M2M) communications and covers a variety of protocols, domains, and applications. The interconnection of these embedded devices (including smart objects, etc.), is expected to usher in automation in nearly all fields, while also enabling advanced applications like a smart grid and expanding to areas such as smart cities.

Network devices in the IoT sense, can refer to a wide variety of devices with sensors and/or actuators such as heart monitoring implants, biochip transponders on farm animals, electric clams in coastal waters automobiles with built-in sensors, DNA analysis devices for environmental/food/pathogen monitoring or field operation devices that assist firefighters in search and rescue operations.

Network devices in the IoT an "inextricable mixture of hardware, software, data and service." These network devices collect useful data with the help of various existing technologies and then autonomously flow the data between other devices.

Current market examples include home automation (i.e., also known as smart home devices, etc.) such as the control and automation of doorbells with real-time video cameras, baby monitors, televisions, set-top boxes, lighting, heating (e.g., smart thermostats, etc.), ventilation, air conditioning (HVAC) systems, and appliances such as washer, dryers, robotic vacuums, air purifiers, ovens, refrigerators, freezers, toys, game platform controllers and devices, that use Wi-Fi and other wired and wireless interfaces for remote monitoring.

The methods and systems presented herein determine a location of an IoT network device in emergency situations with emergency messages including legacy 911, E911, NG-911 and text-to-911 messages from the IoT network device.

The method and system provide a current physical geographic location for such IoT network devices and/or a user of the IoT network device in an emergency situation such as an accident, health, fire, terrorist attack, military incident, weather, flood event, etc. and forwarding the current physical geographic location to a legacy 911 network, E911 network, NG-911 network, a Emergency Services IP networks (ESInet) or text-to-911 Short Message Services (SMS) networks to alert emergency responders.

Figure 27:
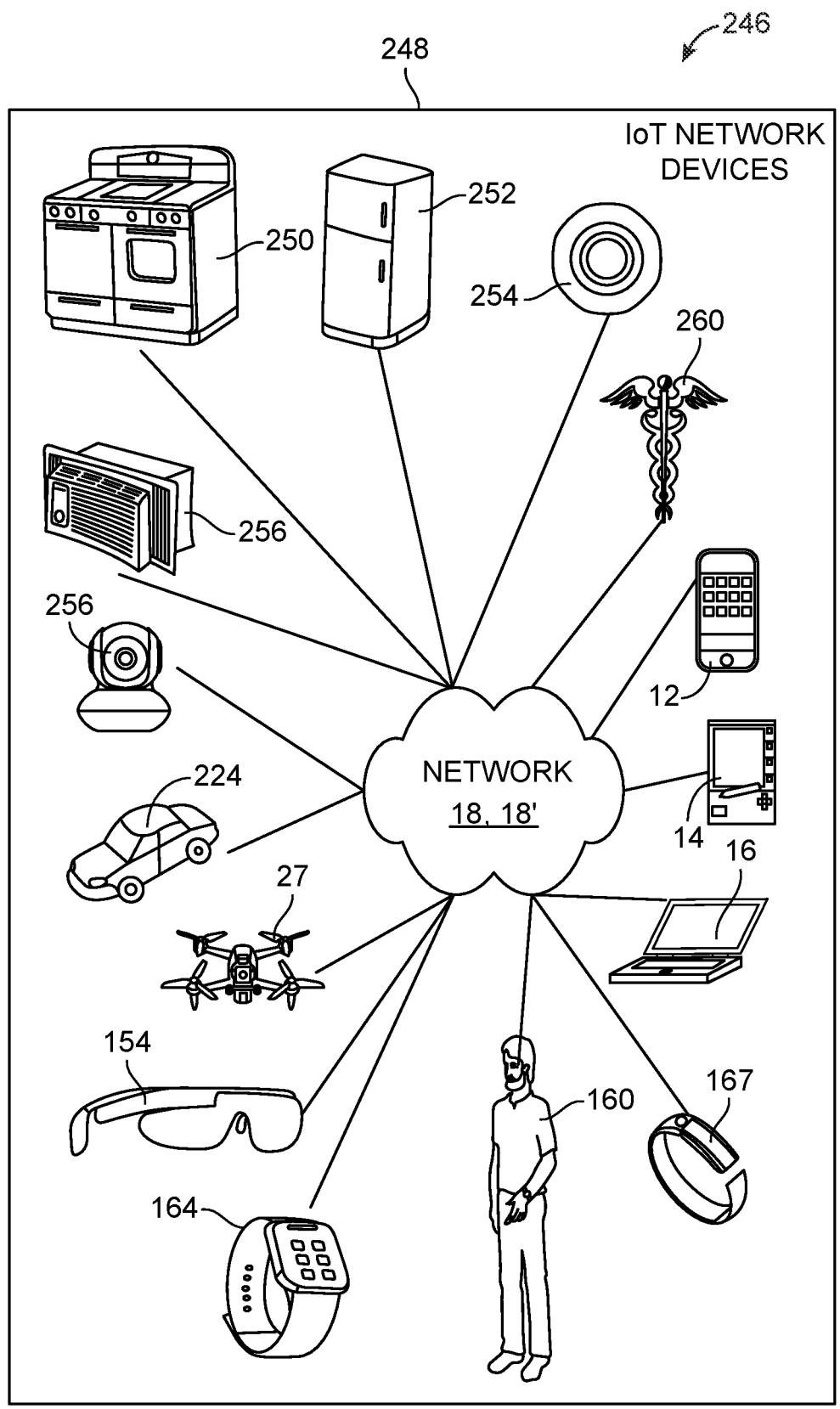
FIG. 27 is a block diagram illustrating exemplary IoT network devices.

FIG. 27 is a block diagram 246 illustrating exemplary IoT network devices 248. The exemplary IoT network devices 248, include but are not limited to, network devices, 12, 14, 16, 27, 158-164, 167, 224, 20, 22, 24, 25, stoves 250, refrigerators 252, HVAC components 254, 256, audiovisual monitoring components 258 and medical monitoring components 260, only a select few are illustrated for simplicity. Any of the network devices described herein can be an IoT network device 248.

Stationary IoT devices such as stoves 250, refrigerators 252, HVAC components 254, 256, audiovisual monitoring components 258, etc. can be used to locate a mobile person, animal and/or object in an emergency situation. For example, a refrigerator 252 with an audiovisual monitoring component 258 that is used by a user to determine remotely at a grocery store what the refrigerator 252 currently includes to aid shopping activities at the grocery, can be used to detect a mobile person, animal and/or object in an emergency situation, etc. Other stationary IoT devices can be used in a similar manner.

Figure 28B:
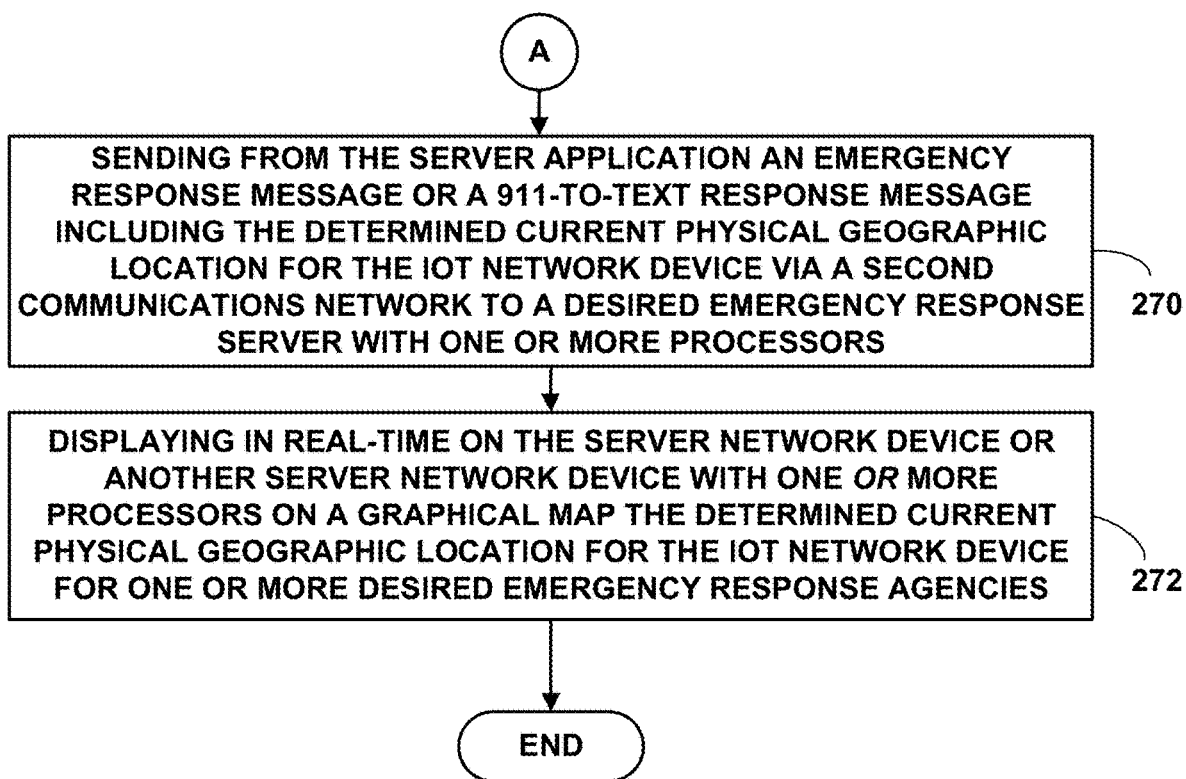

FIGS. 28A and 28B are a flow diagram illustrating a Method 262 for an emergency location information system (E-LIS) with an IoT network device 248.

In FIG. 28A at Step 264, a server application on a server network device with one or more processors receives an emergency message or a text-to-911 message with current location information from an IoT network device with one or more processors, one or more sensors or one or more actuators and a network connection interface via a communications network indicating an emergency event has occurred, the IoT network device comprising an automated network device capable of sensing its own environment without operator input. At Step 266, the server application determines a current set of 3D (X, Y, Z) geo-space coordinates for the IoT network device 248 with the current location information extracted from the received text-to-911 message including text-to-911 location information or extracted from the received emergency message including audiovisual location information, Global Positioning System (GPS), Wireless Fidelity (Wi-Fi), Wi-Fi Aware, Bluetooth, near field communications (NFC), machine-to-machine (M2M) communications, Industrial, Scientific and Medical (ISM), Radio Frequency Identifier (RFID), or cell tower location information collected automatically on the IoT network device while sensing its own physical environment and without operator input. At Step 268, the server application determines with the determined current set of 3D (X, Y, Z) geo-space coordinates a current physical geographic location for the IoT network device. In FIG. 28B at Step 270, the server application sends an emergency response message or a 911-to-text response message including the determined current physical geographic location for the IoT network device via a second communications network to a desired emergency response server with one or more processors. At Step 272, the server network device or another server network device with one or more processors displays in real-time on a graphical map the determined current physical geographic location for the IoT network device for one or more desired emergency response agencies.

Method 262 is illustrated with one exemplary embodiment. However, the present invention is not limited to such an embodiment and other embodiments can also be used to practice the invention.

In such an exemplary embodiment in FIG. 28A at Step 262, a server application 26' on a server network device 20, 22, 24 with one or more processors receives an emergency message or a text-to-911 message with current location information from an IoT network device 248 with one or more processors, one or more sensors or actuators and a network connection interface via a communications network 18 indicating an emergency event (FIG. 1, A, B, C, etc.) has occurred, the IoT network device 248 comprising an automated network device capable of sensing its own environment without operator input.

The emergency event includes, a health event, medical event, fitness event, accident event, fire event, terrorist attack event, military event, weather event, flood event, crime event and/or other type of emergency event.

The emergency event includes an emergency event automatically detected by an emergency button, an accelerometer, radio frequency identifier (RFID) sensor, a barometric sensor, other pressure sensor, a moisture sensor, an altimeter, air bag deployment sensor, a depth sensor, a crash sensor, a speed sensor, a velocity sensor, an acceleration sensor, a de-acceleration sensor, an activity sensor, a biometric sensor, a medical sensor, a temperature sensor, biometric sensor, an immersion sensor, EPIRB sensor, ELB sensor, PLB sensor, ELT sensor, and/or other sensor or actuator included on and/or connected to the IoT network device.

At Step 264, the server application 26' determines a current set of 3D (X, Y, Z) geo-space coordinates for the IoT network device 248 with the current location information extracted from the received text-to-911 message including text-to-911 location information or extracted from the received emergency message including audiovisual location information, Global Positioning System (GPS), Wireless Fidelity (Wi-Fi), Wi-Fi Aware, Bluetooth, near field communications (NFC), machine-to-machine (M2M) communications, Industrial, Scientific and Medical (ISM), a Radio Frequency Identifier (RFID), or cell tower location information collected automatically on the IoT network device 248 while sensing its own physical environment and without operator input.

The current 3D (X, Y, Z) geo-space coordinates at the current physical location includes, but are not limited to, current 3D (X, Y, Z) geo-space coordinates for a location in an urban area, rural area, a location in a parking garage, a location in a vehicle, in a building, a location on a street in an enterprise, campus, village, town, city, state, country, continent and/or global region.

In one embodiment, Method 262 further includes a set of 2D (X, Y) geo-space coordinates. The current 2D (X, Y) geo-space coordinates of the IoT network device are included within the emergency message sent to the desired emergency response server 25.

In FIG. 28B at Step 268, the server application 26' determines with the determined current set of 3D (X, Y, Z) geo-space coordinates a current physical geographic location 134, 165, 185 for the IoT network device 248.

The current physical geographic location 134, 165, 185 for the IoT network device 248, includes, but is not limited to, a latitude, longitude, street address vertical distance, horizontal distance, elevation, altitude, height, depth, speed, velocity, acceleration, de-acceleration, temperature, moisture, barometric pressure, and/or other pressure information for the IoT network device.

At Step 270, the server application 26' sends an emergency response message or a 911-to-text response message including the determined current physical geographic location for the IoT network device 248 via a second communications network 18, 18' to a desired emergency response server (e.g., 25, etc.) with one or more processors.

The emergency message includes an E911 communication message, a legacy 911 communication message, NG-911 communication message, a Common Alerting Protocol (CAP) message, a Public safety answering point (PSAP) to AutoMatic location identification (ALI) (PAM) interface protocol message and/or other type of emergency message.

The desired emergency response server 25 includes an E911 or 911 emergency response server, a text-to-911 server, a Public Safety Answering Point (PSAP) server, an Emergency Services IP networks (ESInet) server and/or other emergency gateway network server device and/or other emergency server network device.

At Step 272, the server network device or another server network device with one or more processors displays in real-time on a graphical map 180 the determined current physical geographic location 134, 165, 185 for the IoT network device 248 for one or more desired emergency response agencies.

In one embodiment, Method 262 further includes the steps of determining automatically visually from the IoT network device 248 with an audiovisual component 256 on and/or attached to the IoT network device 248 physical geographic information 186 around the IoT network device 248; and determining from the IoT network device 248 a current set of 3D (X, Y, Z) geo-space coordinates and/or a set of 2D (X,Y) geo-space coordinates with the determined visual physical geographic information.

However, the present invention is not limited to this embodiment and the invention can be practice without and/or without these additional steps.

In one embodiment, Method 262 further includes the step of displaying in real-time on the server network device 20 or another server network device 22, 24, with one or more processors real-time visual images 186 from the IoT network device 248 for one or more desired emergency response agencies.

However, the present invention is not limited to this embodiment and the invention can be practice without and/or without these additional steps.

FIG. 29 is a flow diagram illustrating a Method 274 for an emergency location information system (E-LIS) with an IoT network device 248.

In FIG. 29 at Step 276, determining from a sensor or an actuator on the IoT network device that a physical environment including the IoT network device that one or more pre-determined conditions have been exceeded indicating that an emergency event is likely to occur. At Step 278, determining from the IoT network device the current set of 3D (X, Y, Z) geo-space coordinates or a current physical geographic location for the IoT network device. At Step 280, sending from the IoT network device to a desired emergency response server a pre-cautionary message including the one or more pre-determined conditions that have been exceeded on the IoT network device and the determined current set of 3D (X, Y, Z) geo-space coordinates or current physical location for the IoT network device indicating that that the one or more pre-determined conditions have been exceeded on the IoT network device.

Method 274 is illustrated with one exemplary embodiment. However, the present invention is not limited to such an embodiment and other embodiments can also be used to practice the invention.

In such an exemplary embodiment at Step 276, the IoT network device 248 determines from a sensor or an actuator on the IoT network device 248 that a physical environment including the IoT network device that one or more pre-determined conditions have been exceeded indicating that an emergency event is likely to occur.

At Step 278, the IoT network device 248 determines the current set of 3D (X, Y, Z) geo-space coordinates or a current physical geographic location 134, 165, 185 for the IoT network device 248.

At Step 280, the IoT network device 248 sends to a desired emergency response server 25 a pre-cautionary message including the one or more pre-determined conditions that have been exceeded on the IoT network device 248 and the determined current set of 3D (X, Y, Z) geo-space coordinates or current physical geographic location for the IoT network device 248 indicating that that the one or more pre-determined conditions have been exceeded on the IoT network device 248.

In one embodiment the pre-cautionary message includes an automated event message routinely generated by the IoT device 248. In another embodiment, the pre-cautionary message include a modified event message further including the determined current set of 3D (X, Y, Z) geo-space coordinates or current physical geographic location 134, 164, 185 for IoT network device 248.

In one embodiment, Method 274 further includes the step of displaying in real-time on the server network device 20 or another server network device, 22, 24, 25 with one or more processors real-time information from the pre-cautionary message from the IoT network device 248 for one or more desired emergency response agencies.

The pre-determined conditions include, but are not limited to, threshold levels for medical information (e.g., heart measurements, blood pressure, blood glucose levels, breathing rates, oxygen levels, UV exposure levels, etc.) and physical environmental information (e.g., temperature, barometric pressure, speed, acceleration, de-acceleration, velocity, etc.).

In one embodiment, Method 274 further includes determining 2D (X, Y) geo-space coordinates for the IoT network device 248. The determined 2D (X, Y) geo-space coordinates for the IoT network device 248 are included in the pre-cautionary message.

However, the present invention is not limited to this embodiment and the invention can be practice without and/or without these additional steps.

The methods and systems described herein provide a current physical geographic location for such IoT network devices and/or users of the IoT network devices in an emergency situation such as an accident, health, fitness, fire, terrorist attack, military incident, weather, flood event, etc. and forwarding the current physical geographic location to a legacy 911 network, E911 network NG-911 network, a Emergency Services IP networks (ESInet) or text-to-911 Short Message Services (SMS) networks to alert emergency responders.

Water-Based Network Devices

IoT devices 248 used in bodies of waters such as rivers, lakes, seas, oceans, etc. are very difficult to communicate with due to lack of terrestrial communication towers. In most instance such IoT devices 248 must use satellite communications. However, most IoT device 248 do not include a satellite communications interface.

There is a new generation of IoT devices that are used on and/or in bodies of water. Such water-based network devices are IoT devices that include specialized wireless communication interfaces providing the ability to communicate with both terrestrial communications system and satellite communications systems.

Figure 30:
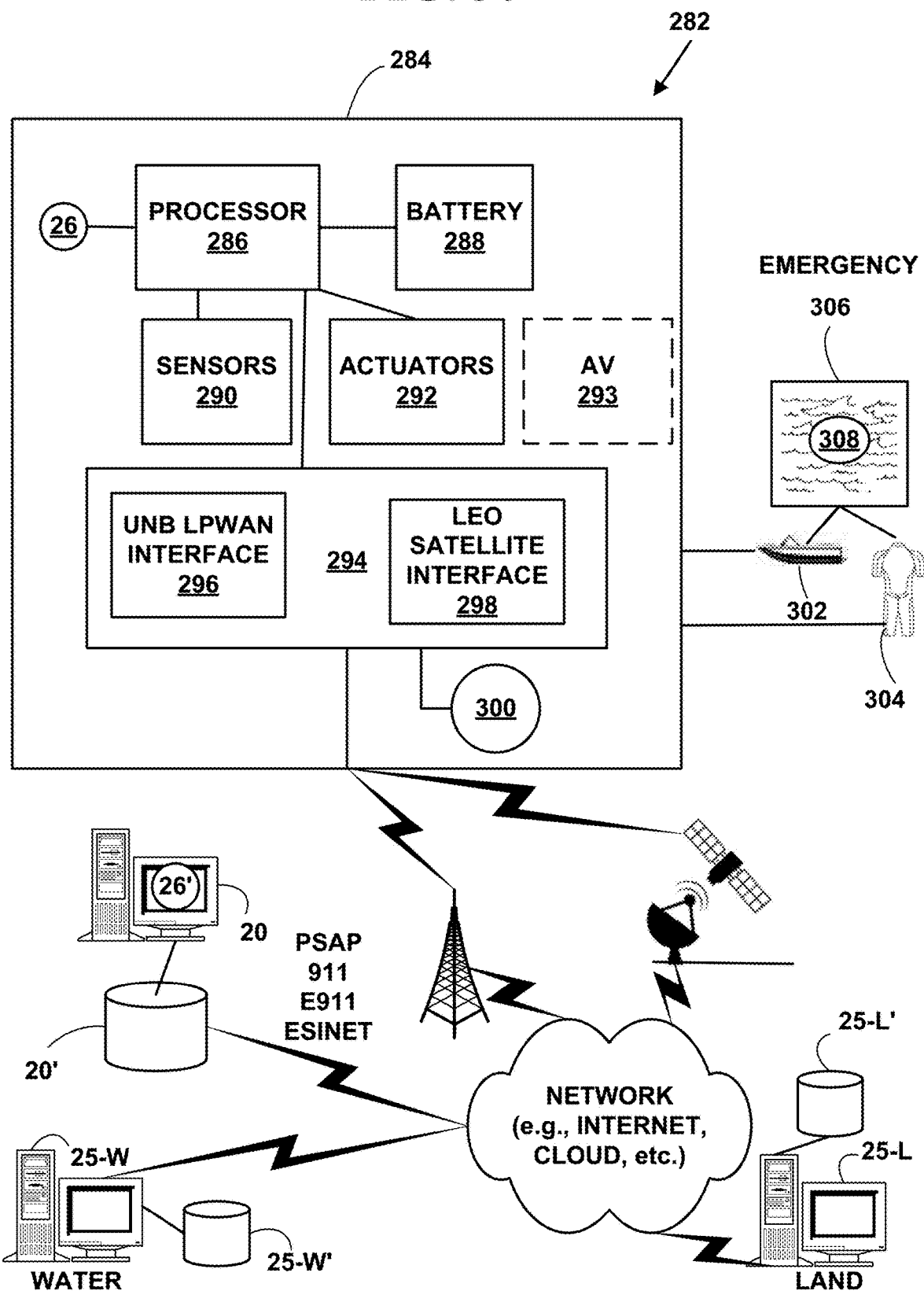
FIG. 30 is a block diagram illustrating an exemplary water-based network device.

FIG. 30 is a block diagram 282 illustrating a water-based network device 284. The water based network device 284, includes, but is not limited to, one or more processors 286, a battery, 288, one or more sensors 290 and/or one or more actuators 292, an optional audio visional component 293 (e.g., camera, etc.), a wireless connection interface 294 including a wireless low power wide-area ultra-narrowband network interface 296 and a wireless low earth orbit satellite network connection interface 298. The water-based network device 284 further comprising an automated network device capable of sensing is own environment and automatically sending out the one or more emergency messages or one or more emergency text messages without operator input. The water-based network device 284 further comprising an emergency button 300 for allowing manual operator input for sending out the one or more emergency messages or one or more emergency text messages during an emergency event. The water-based network device 284 is used on or in vehicles 302 and/or objects 304 bodies of water 306. The bodies of water 306, include, but are not limited to swimming pools, ponds, lakes, streams, creeks, rivers, seas, oceans, etc. A current geographic physical location 308 on the body of water 306 is determined for the water-based network device. However, the present invention is not limited to these bodies of water and the invention can be used in other bodies of water. The present invention is also not limited to the components described for the water-based network device 284 and more, fewer or other components can be used.

The wireless low power wide-area ultra-narrowband network interface 296 on the water-based network device 284 is used with Wide Area Ultra NarrowBand (UNB) and Low-Power Wide-Area Network (LPWAN) systems.

UNB systems are those in which the channel has a very narrow bandwidth. UNB technology is often used where links from very high numbers of devices are needed, with relatively small amounts of data being exchanged on each link. Some such applications can be found in IoT network devices such as water-based network device 284 with UNB being one of the technologies that have been used to implement Low-Power Wide Area Networks (LPWAN). Short, infrequent transmissions with low transmit power can enable long-life, battery-powered operation of UNB devices connected in a LPWAN. UNB LPWAN often operate on VHF or UHF frequencies where radio signal propagation characteristics are suited to typical UNB application with ranges of 10 km or greater. They may be deployed in a shared spectrum (e.g., an ISM band). Typical UNB systems operate with a bandwidth of a few 10s to a few 100s Hz and are used for the transmission and reception of digital signals.

Low-power wide-area network (LPWAN) or low-power wide-area (LPWA) network or low-power network (LPN) is a type of wireless telecommunication wide area network designed to allow long-range communications at a low bit rate among things (connected objects), such as sensors operated on a battery. The low power, low bit rate and intended use distinguish this type of network from a wireless WAN that is designed to connect users or businesses, and carry more data, using more power. The LPWAN data rate ranges from about 0.3 kbit/s to about 50 kbit/s per channel.

The wireless low earth orbit satellite network connection interface 298 on the water-based network device 284 is with satellites in "low earth orbit" (LEO). LEO satellites operate at an altitude of about 2,000 kilometers (about 1,243 miles) or less. A low earth orbit is an earth-centered orbit that extends to an altitude of between 160 kilometers (about 99 miles) and 2,000 kilometers from the earth. LEO satellites move quickly with an orbital period (i.e., the time to complete one orbit of the earth) of 128 minutes or less (about 11.25 periods per day), and an orbital eccentricity (i.e., how much the Kepler orbit deviates from a perfect circle) of 0.25 or less, defined as an elliptical orbit.

IoT communications for water-based network devices 284 are based on LEO satellites are used because of the lack of terrestrial infrastructure for IoT communications for remote areas including, but not limited to, water areas, such as lakes, rivers, streams, creeks, bays, seas, oceans, etc.

Terrestrial cellular networks only cover 20 percent of the Earth's surface, while satellite networks can, potentially, cover the entire planet. LEO satellites afford an alternative even where coverage exists from LoRaWAN, NB-IoT, and/or other LPWA technologies.

Long Range (LoRa) is a LPWAN technology. It is based on spread spectrum modulation techniques derived from chirp spread spectrum (CSS) technology. In telecommunication and radio communication, "spread-spectrum" network devices include techniques and methods by which a signal (e.g., an electrical, electromagnetic, or acoustic signal, etc.) generated with a particular bandwidth is deliberately spread in the frequency domain, resulting in a signal with a wider bandwidth. These techniques are used for a variety of reasons, including the establishment of secure communications, increasing resistance to natural interference, noise, and jamming, to prevent detection, to limit power flux density (e.g., in satellite down links, etc.), and to enable multiple-access communications.

Narrowband Internet of Things (NB-IoT) is a LPWAN radio technology standard developed by 3GPP to enable a wide range of cellular devices and services.

The water-based network device 284 is included as an integral component to, and/or included as a component on and/or in vehicles 302 including, but not limited to, boats, ships, barges, personal watercraft, kayaks, canoes, rafts, floating inner tubes, and/or other types of water craft, and/or included as a component on and/or in objects 304, including, but not limited to, personal flotation devices, scuba equipment, surfing equipment, fishing equipment, swimming equipment and/or other types of vehicles 302 and/or types of objects 304 that is used in and/or around bodies of water 306.

A personal watercraft (PWC), also called a "water scooter," or "boatercycle," is a recreational watercraft that the rider sits or stands on, rather than inside of, as in a boat.

A personal flotation device (PFD) also referred to as a "life jacket," "life preserver," "life belt," "Mae West," "life vest," "life saver," "cork jacket," "buoyancy aid" or "flotation suit" is a piece of equipment designed to assist a wearer to keep afloat in water.

"Wet suits" includes a close-fitting garment of neoprene or similar material typically covering most of the body but not designed to exclude water, worn for warmth in water sports, swimming and/or scuba diving.

A "dry suit" or "drysuit" includes a close-fitting garment made of neoprene or rubberized materials provides the wearer with environmental protection by way of thermal insulation and exclusion of water, and is worn by divers, boaters, water sports enthusiasts, and others who work or play in or near cold or contaminated water.

Scuba equipment, including, but not limited to, a wet-suit, dry-suit, buoyancy compensator (BC), regulator, scuba mask, scuba fins, scuba tank, and/or other types of scuba equipment. Surfing equipment including, but not limited to, a surf board, boogie board, surf board leash (for connecting a surfer to a surf board) and/or other types of surfing equipment. Fishing equipment including, but not limited to, fishing poles, fishing reels, tackle boxes, and/or other types of fishing equipment. Swimming equipment, including, but not limited to, swim suits, swim googles, wet-suits, and/or other types of swimming equipment.

FIGS. 31A and 31B are a flow diagram illustrating a Method 310 for an emergency location information system (E-LIS) with a water-based network device.

In FIG. 31A at Step 312, on a server application on a server network device with one or more processors receives one or more emergency messages or one or more emergency text message via a wireless communications network with current location information from a water-based network device indicating an emergency event has occurred on a body of water. The water based network device comprising one or more processors, one or more sensors or one or more actuators, a wireless connection interface including a wireless low power wide-area ultra-narrowband network interface and a wireless low earth orbit satellite network connection interface. The water-based network device further comprising an automated network device capable of sensing is own environment and automatically sending out the one or more emergency messages or one or more emergency text messages without operator input. The water-based network device further comprising a switch for allowing manual operator input for sending out the one or more emergency messages or one or more emergency text messages during an emergency event. At Step 314, the server application determines a current set of 3D (X, Y, Z) geo-space coordinates for the water-based network device with the current location information extracted from the received one or more emergency messages or the one or more emergency text messages. At Step 316, the server application determines with the determined current set of 3D (X, Y, Z) geo-space coordinates a current physical geographic location for the water-based network device on a body of water. In FIG. 31B, at Step 318, the server application determines a geographic distance from the determined current physical geographic location for the water-based network device on the body of water to a nearest shoreline. At Step 320, the server application determines a desired emergency response server based on the determined geographic distance of the water-based network device from the nearest shoreline. At Step 322, the server application sends an emergency response message or a 911-to-text response message including the determined current physical geographic location for the water-based network device via a second communications network to the desired emergency response server. At Step 324, the server network device or another server network device with one or more processors displays in real-time on a graphical map the determined current physical geographic location for the water-based network device for one or more desired emergency response agencies.

Method 310 is illustrated with one exemplary embodiment. However, the present invention is not limited to such an embodiment and other embodiments can also be used to practice the invention.

In such an exemplary embodiment in FIG. 31A at Step 312, a server application 26' on a server network device (e.g., 20, etc.) with one or more processors receives one or more emergency messages or one or more emergency text message via a wireless communications network 18, 18' with current location information from a water-based network device 284 indicating an emergency event has occurred on a body of water 302.

The water based network device 284 comprising one or more processors 288, a battery, 290, one or more sensors 292 or one or more actuators 294, a wireless connection interface 296 including a wireless low power wide-area ultra-narrowband network interface 298 and a wireless low earth orbit satellite network connection interface 300. The water-based network device 284 further comprising an automated network device capable of sensing is own environment and automatically sending out the one or more emergency messages or one or more emergency text messages without operator input. The water-based network device 284 further comprising an emergency button 302 for allowing manual operator input for sending out the one or more emergency messages or one or more emergency text messages during an emergency event.

The emergency event includes, but is not limited to, a health event, medical event, fitness event, accident event, fire event, terrorist attack event, military event, weather event, flood event, crime event and/or other type of emergency event.

The emergency event includes an emergency event automatically detected by an accelerometer, radio frequency identifier (RFID) sensor, a barometric sensor, heart rate sensor, blood pressure sensor, other pressure sensor, a moisture sensor, an altimeter, a depth sensor, a crash sensor, a speed sensor, a velocity sensor, an acceleration sensor, a de-acceleration sensor, an activity sensor, a biometric sensor, a medical sensor, a temperature sensor, a water temperature sensor, a biometric sensor, an immersion sensor, EPIRB sensor, ELB sensor, PLB sensor, ELT sensor, and/or other sensor or actuator included on and/or connected to the water-based network device 284.

The emergency event also includes emergency events manually detected with emergency button 300 by a user of the water-based network device 284.

The body of water 306, includes, but is not limited to swimming pools, ponds, lakes, streams, creeks, rivers, bays, seas, oceans, etc.

The water-based network device 284 is included as an integral component to, and/or included as a component on and/or in vehicles 302 including, but not limited to, boats, ships, barges, personal watercraft, kayaks, canoes, rafts, floating inner tubes, and/or other types of water craft, and/or included as a component on and/or in objects 304, including, but not limited to, personal flotation devices, scuba equipment, surfing equipment, fishing equipment, swimming equipment and/or other types of vehicles 302 and/or types of objects 304 that is used in and/or around bodies of water 306. However, the present invention is not limited to the vehicles and objects described and more, fewer or other vehicles and objects can be used to practice the invention.

In one embodiment, a wireless communications interface on the server network device 20 includes a wireless connection interface comprising a wireless low power wide-area ultra-narrowband network interface 296' and a wireless low earth orbit satellite network connection interface 298'. In such an embodiment, the water-based network device 284 determines that the one or more emergency messages or one or more emergency text messages arrive on the a wireless low power wide-area ultra-narrowband network interface 296' and a wireless low earth orbit satellite network connection interface 298' from the water-based network device 284. However, the present invention is not limited to such an embodiment and other embodiments can be used to practice the invention.

In another embodiment, the server network device 20 includes a single wireless connection interface capable of accepting wireless messages from low power wide-area ultra-narrowband network connections and wireless low earth orbit satellite network connections. However, the present invention is not limited to such an embodiment and other embodiments can be used to practice the invention.

In another embodiment, another network device (e.g., 22, 24, 26, etc.) would include wireless connection interface comprising a wireless low power wide-area ultra-narrowband network interface 296' and a wireless low earth orbit satellite network connection interface 298' and would compose and send messages to the server network device 20 via the communications network 18, 18' in a protocol understood by the server network device 20.

At Step 314, the server application 26' determines a current set of 3D (X, Y, Z) geo-space coordinates for the water-based network device 284 with the current location information on the body of water 306 extracted from the received one or more emergency messages or the one or more emergency text messages.

The current 3D (X, Y, Z) geo-space coordinates at the current location includes, but are not limited to, current 3D (X, Y, Z) geo-space coordinates for a location in and/or on a body of water 308.

In one embodiment, the (Z) geo-space coordinate from the 3D (X, Y, Z) geo-space coordinates includes, but is not limited to, elevation, altitude, height, depth, speed, velocity, acceleration, de-acceleration, air temperature, moisture, water temperature, water pressure, and/or barometric pressure information. However, the present invention is not limited to such an embodiment and more, fewer or other information can be included in the (Z) geo-space coordinate.

In one embodiment, Method 310 further includes a set of 2D (X, Y) geo-space coordinates. The current 2D (X, Y) geo-space coordinates of the water-based network device 284 are included within the emergency message sent to a desired emergency response server 25-land, and/or server 25-water.

In one embodiment, Step 314 further includes determining automatically visually visual physical geographic information around the water-based network device from the water-based network device 284 with an audiovisual component 293 on the water-based network device 284 and determining from the water-based network device 284 a current set of 3D (X, Y, Z) geo-space coordinates with the determined visual physical geographic information. However, the present invention is not limited to such an embodiment.

At Step 316, the server application 26' determines with the determined current set of 3D (X, Y, Z) geo-space coordinates a current physical geographic location 308 for the water-based network device 284 on the body of water 306.

The current physical geographic location 308 for the water-based network device 284, includes, but is not limited to, latitude, longitude, vertical distance, horizontal distance, elevation, altitude, height, depth, speed, velocity, acceleration, de-acceleration, air temperature, water temperature, moisture, barometric pressure, water pressure, other pressure information, and/or other information for the water-based network device.

FIG. 31A at Step 318, the server application 26' determines a geographic distance from the determined current physical geographic location 308 for the water-based network device 284 on the body of water 306 to a nearest shoreline on the body of water 306.

At Step 320, the server application 26' determines one or more desired emergency response servers such as 25-land and/or 25-water based on the determined geographic distance of the water-based network device 284 from the nearest shoreline.

At Step 322, the server application 26' sends an emergency response message or a 911-to-text response message including the determined current physical geographic location 308 for the water-based network device 284 via a second communications network to the one or more desired emergency response servers.

The emergency message includes an E911 communication message, a legacy 911 communication message, NG-911 communication message, a Common Alerting Protocol (CAP) message, a Public safety answering point (PSAP) to AutoMatic location identification (ALI) (PAM) interface protocol message, aviation frequency emergency message (e.g., VHF 108 to 136 MHz), marine frequency emergency message (e.g., VHF156-160 MHz), satellite frequency emergency message (e.g., 1-40 GHz), and/or other type of emergency message.

The desired emergency response server 25-water and/or 25-land includes an E911 or 911 emergency response server, a text-to-911 server, a Public Safety Answering Point (PSAP) server, an Emergency Services IP networks (ESInet) server, military server, aviation server, marine server, government security server, and/or other emergency gateway network server device and/or other emergency server network device.

For example, if the water-based network device 284 is within a pre-determined geographic distance (e.g., less about 5 miles (8 km) or less, etc.) from the shoreline of the body of water 302, then an emergency response server 25-land for a land based emergency responders would be selected. Land based emergency responders, include but are not limited to, police department, sheriff department, fire department, emergency medical services, life guard services, department of natural resources, military (e.g., U.S. Army, Air Force, Marines, etc.), government security (e.g., U.S. FBI, Department of Homeland Security, Customs and Border Patrol, etc.) that initiate an emergency response and/or rescue action from land including the shoreline around the body of water 306.

If the water-based network device 284 is not within a pre-determined geographic distance (e.g., greater than about 5 miles (8 km) or less, etc.) from the shoreline of the body of water 302, then an emergency response server 25-water for a water based emergency responders would be selected. Water based emergency responders, include but are not limited to, police marine unit, fire marine unit, military (e.g., U.S. Marines, Navy, Coast Guard, etc.), government security, etc. that initiate an emergency response and/or rescue action from the body of water 306.

In one embodiment, both land based and water based emergency response servers 25-land and 25-water are selected. In such and embodiment, the pre-determined geographic distance from the shoreline of the body of water 302, and/or the emergency event may require a response from both land-based and water-based emergency responders. However, the present invention is not limited to such an embodiment.

At Step 324, the server network device 20 or another server network device 25-land, 25-water with one or more processors displays in real-time on a graphical map the determined current physical geographic location 308 for the water-based network device 284 for one or more desired emergency response agencies.

In one embodiment, the water-based network device 284 automatically determines that one or more pre-determined conditions have been exceeded indicating that an emergency event is likely to occur as was discussed above for Method 274 in FIG. 29. In such an embodiment, the IoT Device 248 described in Method 274 includes the water-based network 284 instead IoT Device 248. In such an embodiment, the one or pre-determined conditions, include, but are not limited to, a pre-determined: latitude, longitude, vertical distance, horizontal distance, elevation, altitude, height, depth, speed, velocity, acceleration, de-acceleration, air temperature, water temperature, moisture, barometric pressure, water pressure, other pressure information, heart rate, blood pressure, other medical information and/or other types of information with pre-determined conditions. However, the present invention is not limited to such an embodiment and other embodiments can be used to practice the invention. Method 274 is not repeated again here for simplicity.

The methods and systems presented herein provide an emergency location information service (E-LIS) for water-based network devices. The E-LIS includes a server application and server network devices that accepts emergency messages from water-based network devices. The water based network devices comprise one or more sensors or one or more actuators, a wireless connection interface including a wireless low power wide-area ultra-narrowband network interface and a wireless low earth orbit satellite network connection interface and is an automated network device capable of sensing is own environment and automatically sending out the one or more emergency messages or one or more emergency text messages without operator input to an E-LIS server network device when an emergency event occurs on a body of water. The E-LIS server network device provides a current physical geographic location for such water-based network devices and/or users of the water-based network devices in an emergency situation on the body of water such as a river, lake, sea, ocean, etc.

Proxy Network Devices

A "proxy network device" is a network device that acts as an intermediary for requests from other network devices seeking resources from other network devices that provide those resources. A proxy network device functions on behalf of a network device when requesting a desired service.

Figure 32:
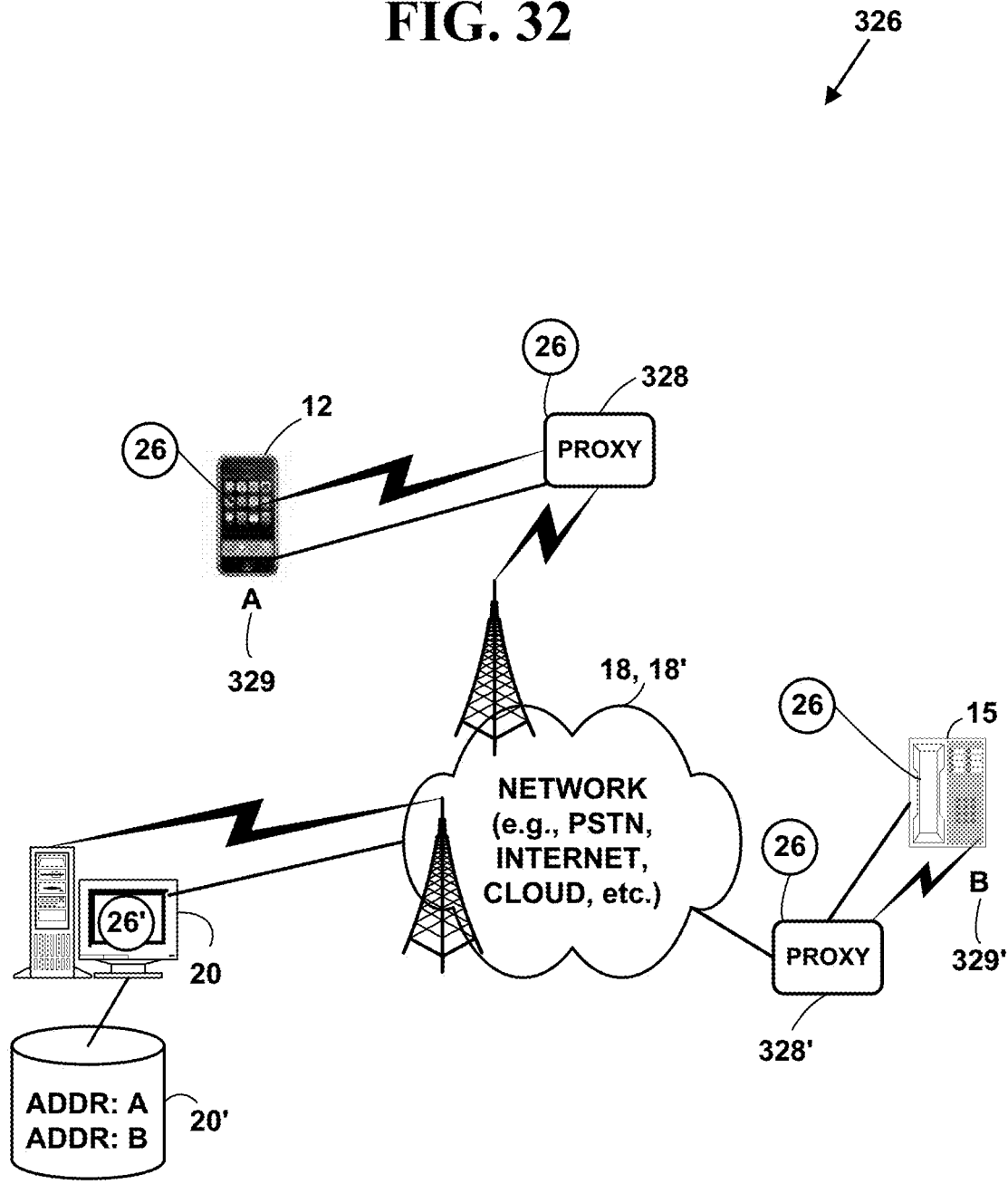
FIG. 32 is a block diagram illustrating an emergency location information system (E-LIS) for a network device connected to proxy network device.

FIG. 32 is a block diagram 326 illustrating an emergency location information system (E-LIS) for a network device 12, 15 connected to proxy network device 328, 328'. FIG. 32 illustrates a mobile network device 12 connected to a proxy network device 328' by a wireless or wired connection. The proxy network device 328 is connected to the communications network 18, 18' via a wireless connection. FIG. 32 also illustrates a non-mobile network device 15 connected to a proxy network device 328'. The proxy network device 328' is connected to the communications network 18, 18' with a wired connection. A current physical location 329 for mobile network device 12 and 329' for non-mobile network device 15 is also illustrated in FIG. 32. However, the present invention is not limited to this embodiment and other embodiment with other connections and combinations of connections can be used to practice the invention.

One such proxy network device 328 is an analog terminal adapter (ATA). An ATA includes systems for connecting traditional analog telephones, fax machines, other customer-premises devices to a digital telephone system or a voice over IP (VoIP) telephony network, Using such an ATA, it is possible to connect a conventional telephone to a remote Vol P server. The ATA communicates with the server using a protocol such as H.323, SIP, Media Gateway Control Protocol (MGCP), Skinny Client Control Protocol (SCCP) and/or Inter-Asterisk eXchange (IAX), Hyper Text Transfer Protocol (HTTP) Enabled Location Delivery, (HELD), HELD Plus (HELD+) and/or other protocols. The ATA encodes and decodes a voice signal using a voice codec such as G.711, G.729, Global System for Mobile Communications (GSM). Internet Low Bitrate Codec (iLBC) and/or other encoder/decoders. Since the ATA communicates directly with the VoIP server, it does not require a personal computer or any software such as a softphone.

Exemplary ATA proxy network devices include the CISCO ATA-191 VoIP Phone Adapter, OOMA ATA Adapter, GRANDSTREAM GS-HT814 4 Port ATA and/or other ATA proxy network devices. However, the present invention is not limited to such embodiments and other embodiments including ATA proxy network devices from other manufacturers can be used to practice the invention.

Another type of proxy network device 328' includes a Digital Enhanced Cordless Telecommunications (DECT) network device. A DECT system includes two components that constantly communicate with each other. The two components are a base station, also called the fixed part, and at least one handset; or portable part.

The base station forms the bridge between the digital telephone system or a voice over IP (VoIP) telephony network and the handsets. This can be in the form of a simple DECT base station with or without an answering machine or a Digital Subscriber Line (DSL) router with DECT function.

A DECT network device is also Generic Access Profile (GAP) ready. GAP is a standard that enables DECT network devices from different manufacturers to communicate with each other.

Exemplary DECT proxy network devices, include but are not limited to, a CISCO Multi-Line DECT SPA232D-G1, AT&T BL102-W DECT 6.0, PANASONIC DECT 6.0, VTECH VS112-W DECT 6.0 and/or other types of DECT proxy network devices. Another type of exemplary DECT proxy network device includes the CISCO SG200-08 8-port DECT Gigabit smart switch. However, the present invention is not limited to such embodiments and other embodiments including DECT proxy network devices from other manufacturers can be used to practice the invention.

Other proxy network devices 328, 328', including, but are not limited to, gateway network device, router network device, bridge network device or electronic switch network device, each with one or more processors.

FIGS. 33A, 33B, 33C and 33D are a flow diagram illustrating a Method 330 for an emergency location information system (E-LIS) for network device connected to proxy network device.

In FIG. 33A at Step 332, a secure connection location message is received on an emergency location server application on an emergency location information server network device with one or more processors from a proxy network device with one or more processor connected to a network device with one or more processors via a communications network, the secure connection location message including unique identification information that uniquely identifies the network device and the proxy network device on the communications network. At Step 334, the emergency location server application determines from the secure connection location message a current physical geographic location and/or a current set of two-dimensional (2D) (X,Y) geo-coordinates and/or a current sent of three-dimensional (3D) (X,Y,Z) geo-coordinates for the network device from the unique identification information. At Step 336, the emergency location server application stores in a database as current location information, the received unique identification information, the determined current physical geographic location and/or the determined current set of 2D (X,Y) geo-space coordinates, and/or the determined current set of 3D (X,Y,Z) geo-space coordinates, for the network device. In FIG. 33B at Step 338, the emergency location server application securely sends a connection response message from the server network device to the proxy network device via the communications network, the secure connection response message including a pre-determined emergency location indicator the proxy network device will use if the network device sends an emergency message indicating that an emergency event has occurred. The pre-determined emergency location indicator includes location-by-reference emergency location information or location-by-value emergency location information, wherein the location-by-reference emergency location information includes a database key into the database to access the stored location information for the network device. The location-by-value emergency location information includes a location component including additional location information, the determined current physical location and/or, the determined current set of 2D (X,Y) geo-space coordinates, and/or the determined current set of 3D (X,Y,Z) geo-space coordinates, for the network device for the network device. At Step 340, an emergency message is securely received on the emergency location application on the emergency location information server network device from the proxy network device via the communications network, the emergency message including unique network device identification and the pre-determined emergency location indicator sent to the proxy network device in a geo-location header included with the connection response message. In FIG. 33C at Step 342, a test is conducted on the emergency location application on the emergency location information server network device to determine from the emergency message whether the pre-determined emergency location indicator includes location-by-reference information, and if so, at Step 344 determining from the database key included in a location-by-reference component in the emergency message the stored determined current physical geographic location, or the determined current set of 2D (X,Y) geo-space coordinates, or the determined current set of 3D (X,Y,Z) geo-space coordinates, for the network device for the network device stored in the database for the network device. In the test at 342, if the pre-determined emergency location indicator in the emergency messages does not includes location-by-reference information, then at Step 346, determining from the location component in a location-by-value component in the emergency message the determined current physical geographic location, and/or the determined current set of 2D (X,Y) geo-space coordinates, and/or the determined current set of 3D (X,Y,Z) geo-space coordinates, for the network device. At Step 348, the emergency location application adds an emergency location information extension component to the received emergency location message, determined current physical geographic location, and/or the determined current set of 2D (X,Y) geo-space coordinates, and/or the determined current set of 3D (X,Y,Z) geo-space coordinates, for the network device. In FIG. 33D, at Step 350, the received emergency message emergency with the location information extension component is sent in real-time from the emergency location application on the emergency location information server network device to one or more determined emergency response server network devices with one or more processors via the communications network indicating that an emergency event has occurred with the network device. At Step 352, the emergency location application displays in real-time on the one or more determined emergency response server network devices or another server network device with one or more processors on a graphical map the determined current physical geographic location for network device for one or more desired emergency response agencies.

Method 330 is illustrated with one exemplary embodiment. However, the present invention is not limited to such an embodiment and other embodiments can also be used to practice the invention.

In such an exemplary embodiment in FIG. 33A at Step 332, a secure connection location message is received on an emergency location server application 26' on an emergency location information server network device 20 with one or more processors from a proxy network device 328, 328' with one or more processor connected to a network device 12, 14, 16, 150, 158-164, 162, 167, 227, 248, 284 with one or more processors via a communications network 18, 18' The secure connection location message including unique identification information that uniquely identifies the network device and the proxy network device on the communications network.

In one embodiment, the unique identification information, includes, but is not limited to, a port, a channel, a device identifier (DID), a user name, an e-mail address, (e.g., joe.smith@abc.com, etc.), an IP address for the proxy network device 328, 328', a MAC address for the proxy network device 328, 328' a MAC address for the network device 12, 14, 16, 150, 158-164, 162, 167, 227, 248, 284, a telephone number, a social media identifier, etc., including both unique analog and digital unique identifiers. However, the present invention is not limited to such an embodiment and other unique identification information can be used to practice the invention.

In one embodiment, the connection message is received securely using any of the encryption and/or security methods described herein.

At Step 334, the emergency location server application 26' determines from the secure connection location message a current physical geographic location 134, 165, 329 and/or a current set of two-dimensional (2D) (X,Y) geo-coordinates and/or a current sent of three-dimensional (3D) (X,Y,Z) geo-coordinates for the network device 12, 14, 16, 150, 158-164, 162, 167, 227, 248, 284 from the received unique identification information.

At Step 336, the emergency location server application 26' stores in a database 20' as current location information, the received unique identification information, the determined current physical geographic location 134, 165, 329, and/or the determined current set of 2D (X,Y) geo-space coordinates, and/or the determined current set of 3D (X,Y,Z) geo-space coordinates, for the network device 12, 14, 16, 150, 158-164, 162, 167, 227, 248, 284.

In FIG. 33B at Step 338, the emergency location server application 26' securely sends a connection response message from the server network device 20 to the proxy network device 328, 328' via the communications network 18, 18', the secure connection response message including a pre-determined emergency location indicator the proxy network device 328, 328' will use if the network device 12, 14, 16,

150, 158-164, 162, 167, 227, 248, 284 sends an emergency message indicating that an emergency event has occurred. The pre-determined emergency location indicator includes location-by-reference emergency location information or location-by-value emergency location information, wherein the location-by-reference emergency location information includes a database key into the database 20' to access the stored location information for the network device 12, 14, 16, 150, 158-164, 162, 167, 227, 248, 284. The location-by-value emergency location information includes a location component including the determined current physical geographic location 134, 165, 329, and/or the determined current set of 2D (X,Y) geo-space coordinates, and/or the determined current set of 3D (X,Y,Z) geo-space coordinates, for the network device 12, 14, 16, 150, 158-164, 162, 167, 227, 248, 284. The additional location information includes, but is not limited to, civic street address (e.g. 333 N. Michigan Avenue, Chicago, Ill. 60601, etc.), a zone (e.g., geo-fenced, geo-graphic, etc.), a floor in a building (e.g., 16$^{th}$ floor, etc.), etc.

In one embodiment, the connection response message is sent securely using any of the encryption and/or security methods described herein.

At Step 340, an emergency message is securely received on the emergency location application 26' on the emergency location information server network device 20, from the proxy network device 328, 328' via the communications network 18, 18', the emergency message including the unique identification information for the network device 12, 14, 16, 150, 158-164, 162, 167, 227, 248, 284 and the pre-determined emergency location indicator sent to the proxy network device 328, 328' in a geo-location header included with the connection response message.

In one embodiment, the secure emergency message includes a SIP geo-location header and/or message body with a geo-location header. In one embodiment, the geo-location header includes a PIDF-LO extension (i.e., RFC-4119) for the device. When a PIDF-LO is present, the header will indicate to SIP proxies along the call path where in the message body the PIDF-LO can be found, otherwise the geo-location header will have the SIP URI (i.e., address) of the E-LIS where the device's location is stored.

In another embodiment, the secure emergency message includes a SIP geo-location header and/or message body without a PIDF-LO extension. In another embodiment, the emergency message includes an E911 message. However, the present invention is not limited to these embodiments and other embodiments with other emergency message types and other geo-location headers can be used to practice the invention.

Table 6 illustrates an exemplary XML Presence Information Data Format Location Object (PIDF-LO) layout. However, the present invention is not limited to this layout and other XML layouts and other types of target network device 12, 14, 16, 150, 158-164, 162, 167, 227, 248, 284 location information objects can be used to practice the invention.

TABLE 6

```
<presence xmlns="urn:ietf:params:xml:ns:pidf"
xmlns:dm="urn:ietf:params:xml:ns:pidf:data-model"
xmlns:gp="urn:ietf:params:xml:ns:pidf:geopriv 10"
    xmlns:gml="http://www.opengis.net/gml"
    xmlns:cl="urn:ietf:params:xml:ns:pidf:geopriv 10:civicAddr"
    entity="pres:312.431.4321">
```

TABLE 6-continued

```
<dm:device id="ATA">
   <gp:geopriv>
     <gp:location-info>
        <gml:Point srsName="urn:ogc:def:crs:EPSG::4326">
           <gml:pos41.881832, -87.623177</gml:pos>
        </gml:Point>
        <cl:civicAddress>333 N. Michigan Avenue, Chicago, IL
60601</cl:civiAddress>
           <cl:FLR>9th</cl:FLR>
           <cl:ROOM>Conferenee Room 3</cl:ROOM>
        <gp:location-info>41.881832, -87.623177</gp:location-info>
        <gp:usage-rules/>
        <gp:method>Wiremap</gp:method>
     </gp:geopriv>
     <dm:deviceID>mac:8asd7d7d70cf</dm:deviceID>
     <dm:timestamp>2020-01-22T20:57:29Z</dm:timestamp>
   </dm:device>
</presence>
```

In another embodiment, the determined additional location information is added in additional fields of the XML Presence Information Data Format Location Object (PIDF-LO) layout (Table 6). This determined additional location information is exemplary only and other embodiments can be used to practice the invention. The data structures described in Tables 6-7 are exemplary only and other data structures layouts, with more, fewer and other fields and other mark-up and non-mark-up languages can be used to practice the invention.

TABLE 7

Exemplary determined additional location information message field layout

```
{
"tn":"312.432.4321",
"locationName":"Conference Room 3",
"street":"333 N Michigan Ave",
"locationInfo":"9th floor",
"city":"Chicago",
"state":"IL",
"postalCode":"60601",
"companyID" : 6f2f2d50-c385-,b72-b8,a-ce0ca3a77cb7
"proxy-device-port": mac:8asd7d7d70cf
"proxy-device-DID": 1234567
"proxy-device-channel": 2f7
}
```

In FIG. 33C at Step 342, a test is conducted on the emergency location application 26' on the emergency location information server network device 20 to determine from the emergency message whether the pre-determined emergency location indicator includes location-by-reference information, and if so, at Step 344 determining from the database key included in a location-by-reference component in the emergency message the stored determined current physical geographic location 134, 165, 329, and/or the determined current set of 2D (X,Y) geo-space coordinates, and/or the determined current set of 3D (X,Y,Z) geo-space coordinates, stored in the database 20' for the network device 12, 14, 16, 150, 158-164, 162, 167, 227, 248, 284.

In one embodiment, the PIDF-LO includes an Emergency Location-By-Reference (LbR) component including a database 20' key (e.g., including an electronic token, etc.) for accessing a unique Uniform Resource Identifier (URI) stored in the database or a Location-by-Value (LbV) component (e.g., including an electronic string, etc.) including the unique URI for the network device 12, 14, 16, 150, 158-164, 162, 167, 227, 248, 284. However, the present invention is not limited to such an embodiment and other embodiments and other components in a PIDF-LO object can be used to practice the invention.

In one embodiment, the emergency messages, includes, but is not limited to, an E911 communication message, a legacy 911 communication message, a NG-911 communication message, a Common Alerting Protocol (CAP) message, a Public Safety Answering Point (PSAP) to Automatic Location Identification (ALI) (PAM) interface protocol message and/or satellite frequency emergency message. However, the present invention is not limited to such embodiments and other embodiments and other types of emergency messages can be used to practice the invention.

In the test at 342, if the pre-determined emergency location indicator in the emergency messages does not includes location-by-reference information, then at Step 346, the emergency location information application 26' determines from the location component in a location-by-value component in the emergency message, the determined current physical geographic location 134, 165, 329, and/or the determined current set of 2D (X,Y) geo-space coordinates, and/or the determined current set of 3D (X,Y,Z) geo-space coordinates, for the network device for the network device 12, 14, 16, 150, 158-164, 162, 167, 227, 248, 284.

At Step 348, the emergency location application 26' adds an emergency location information extension component to the received emergency location message, the emergency location extension component including the determined current physical geographic location 134,134', 165,165', 329, 329' and/or the determined current set of 2D (X,Y) geo-space coordinates, and/or the determined current set of 3D (X,Y,Z) geo-space coordinates, for the network device for the network device 12, 14, 16, 150, 158-164, 162, 167, 227, 248, 284.

In FIG. 33D, at Step 350, the received emergency message emergency with the location information extension component is sent in real-time from the emergency location application 26' on the emergency location information server network device 20 to one or more determined emergency response server network devices 22, 24 with one or more processors via the communications network 18, 18' indicating that an emergency event has occurred with the network device 12, 14, 16, 150, 158-164, 162, 167, 227, 248, 284.

In one embodiment, the one or more determined emergency response server network devices 22, 24 include, but are not limited to, a Session Border Controller (SBC), a NG9-1-1 emergency response server, E911 emergency response server or 911 emergency response server, a text-to-911 server, a Public Safety Answering Point (PSAP) server, an Emergency Services IP networks (ESInet) server, a military server, an aviation server, a marine server or an emergency gateway network server device, or a combination thereof, each with one or more processors. However, the present invention is not limited to such embodiments and other embodiments and other types of determined emergency response server network devices can be used to practice the invention.

At Step 352, the emergency location application displays in real-time on the one or more determined emergency response server network devices 22, 24 or another server network devices 22, 24 with one or more processors on a graphical map the determined current physical geographic location 134,134', 165,165', 329, 329' for the network device 12, 14, 16, 150, 158-164, 162, 167, 227, 248, 284 for one or more desired emergency response agencies.

FIG. 34 is flow diagram illustrating a Method 354 for an emergency location information system (E-LIS) for a network device connected to proxy network device. At Step 356, a proxy network device connected to a network device securely sends connection location message to an emergency location application on the emergency location information server network device via the communications network. The secure connection message including a request for location-by-reference emergency location information to be used when an emergency event occurs. At Step 358, the proxy network device receives securely a connection response message on from the emergency location server application on the server network device via the communications network, the secure connection response message including the pre-determined emergency location indicator with the requested location-by-reference emergency location information the proxy network device will use if the network device sends the emergency message indicating that the emergency event has occurred.

Method 334 is illustrated with one exemplary embodiment. However, the present invention is not limited to such an embodiment and other embodiments can also be used to practice the invention.

In such an exemplary embodiment in FIG. 34 at Step 356, a proxy network device 328, 328' connected to a network device 12, 15 (illustrated with just two network devices for simplicity, etc.) securely sends connection location message to an emergency location application 26' on the emergency location information server network device 20 via the communications network 18, 18'. The secure connection message including a request for location-by-reference emergency location information to be used when an emergency event occurs.

At Step 358, the proxy network device 328, 328' receives securely a connection response message from the emergency location server application 26' on the server network device 20 via the communications network 18, 18', the secure connection response message including the pre-determined emergency location indicator with the requested location-by-reference emergency location information the proxy network device 328, 328' will use if the network device sends 12, 15 the emergency message indicating that the emergency event has occurred.

FIG. 35 is a flow diagram illustrating a Method 360 for an emergency location information system (E-LIS) for a network device connected to proxy network device. At Step 362, a proxy network device connected to a network device sends a secure connection location message to an emergency location application on an emergency location information server network device via a communications network, the secure connection message including a request for location-by-value emergency location information to be used when an emergency event occurs. At Step 364, the proxy network device receives securely the connection response message from the emergency location server application on the server network device via the communications network, the secure connection response message including the pre-determined emergency location indicator with the requested location-by-value emergency location information the proxy network device will use if the network device sends the emergency message indicating that the emergency event has occurred.

Method 360 is illustrated with one exemplary embodiment. However, the present invention is not limited to such an embodiment and other embodiments can also be used to practice the invention.

In such an exemplary embodiment in FIG. 35, at Step 362, a proxy network device 328, 328' connected to a network device 12, 15 sends a secure connection location message to an emergency location application 26' on an emergency location information server network device 20 via a communications network 18, 18', the secure connection message including a request for location-by-value emergency location information to be used when an emergency event occurs.

At Step 364, the proxy network device 328, 328' receives securely the connection response message from the emergency location server application 26' on the server network device 20 via the communications network 18, 18', the secure connection response message including the pre-determined emergency location indicator with the requested location-by-value emergency location information the proxy network device 328, 328' will use if the network device 12, 15 sends the emergency message indicating that the emergency event has occurred.

The methods and systems presented herein provide an emergency location information service (E-LIS) for network devices connected to proxy network devices. The proxy network devices are both analog and digital network devices. The proxy network devices send unique identification information for the network device connected to it and request either a location-by-reference (indirect location information) component or location-by-reference (direct location information) component to identify the network device when an emergency event occurs.

It should be understood that the architecture, programs, processes, methods and systems described herein are not related or limited to any particular type of computer or network system (hardware or software), unless indicated otherwise. Various types of general purpose or specialized computer systems may be used with or perform operations in accordance with the teachings described herein.

In view of the wide variety of embodiments to which the principles of the present invention can be applied, it should be understood that the illustrated embodiments are exemplary only, and should not be taken as limiting the scope of the present invention. For example, the steps of the flow diagrams may be taken in sequences other than those described, and more or fewer elements may be used in the block diagrams.

While various elements of the preferred embodiments have been described as being implemented in software, in other embodiments hardware or firmware implementations may alternatively be used, and vice-versa.

The claims should not be read as limited to the described order or elements unless stated to that effect. In addition, use of the term "means" in any claim is intended to invoke 35 U.S.C. § 112, paragraph 6, and any claim without the word "means" is not so intended.

Therefore, all embodiments that come within the scope and spirit of the following claims and equivalents thereto are claimed as the invention.

We claim:

1. A method for locating a network device using a network device connected to a proxy network device during an emergency with an emergency information system (E-LIS), comprising:

receiving a secure connection location message on an emergency location server application on an emergency location information server network device with one or more processors from a proxy network device with one or more processor connected to a network device with one or more processors via a communications network, the secure connection location message including unique identification information that uniquely identifies the network device and the proxy network device on the communications network;

determining on the emergency location server application from the connection location message a current physical geographic location, or a current set of two-dimensional (2D) (X,Y) geo-space coordinates or a current set three-dimensional 3D (X, Y, Z) geo-space coordinates for the network device and the unique identification information the network device;

storing in a database on the emergency location server application as current location information, the received unique identification information, the determined current physical geographic location, or the determined current set of 2D (X,Y) geo-space coordinates, or the determined current set of 3D (X,Y,Z) geo-space coordinates, for the network device;

sending securely a connection response message from the emergency location server application on the server network device to the proxy network device via the communications network, the secure connection response message including a pre-determined emergency location indicator the proxy network device will use if the network device sends an emergency message indicating that an emergency event has occurred, wherein the pre-determined emergency location indicator includes location-by-reference emergency location information or location-by-value emergency location information, wherein the location-by-reference emergency location information includes a database key into the database to access the stored location information for the network device, and wherein the location-by-value emergency location information includes a location component including additional location information for the network device, the determined current physical geographic location, or the determined current set of 2D (X,Y) geo-space coordinates, or the determined current set of 3D (X,Y,Z) geo-space coordinates, for the network device;

receiving securely an emergency message on the emergency location application on the emergency location information server network device from the proxy network device via the communications network, the emergency message including the unique identification information and the pre-determined emergency location indicator sent to the proxy network device in a geo-location header included with the connection response message;

determining on the emergency location application on the emergency location information server network device from the emergency message whether the pre-determined emergency location indicator includes location-by-reference information, and if so, determining from the database key included in a location-by-reference component in the emergency message the stored determined current physical geographic location, or the determined current set of 2D (X,Y) geo-space coordinates, or the determined current set of 3D (X,Y,Z) geo-space coordinates, for the network device and if not, determining from the location component in a location-by-value component in the emergency message the determined current physical geographic location, or the determined current set of 2D (X,Y) geo-space coordinates, or the determined current set of 3D (X,Y,Z) geo-space coordinates, for the network device for the network device;

adding from emergency location application an emergency location information extension component to the received emergency location message, the emergency location extension component including the determined current physical geographic location, or the determined current set of 2D (X,Y) geo-space coordinates, or the determined current set of 3D (X,Y, Z) geo-space coordinates, for the network device for the network device;

sending in real-time the received emergency message emergency with the location information extension component from the emergency location application on the emergency location information server network device to one or more determined emergency response server network devices with one or more processors via the communications network indicating that an emergency event has occurred with the network device; and displaying in real-time on the one or more determined emergency response server network devices or another server network device with one or more processors on a graphical map the determined current physical geographic location for network device for one or more desired emergency response agencies.

2. The method of claim 1 wherein the proxy network device includes an analog terminal adapter (ATA) network device, a Digital Enhanced Cordless Telecommunications (DECT) network device, gateway network device, router network device, bridge network device or electronic switch network device.

3. The method of claim 1 wherein the network device includes a mobile phone, smart phone, electronic tablet, mobile computer, unmanned aerial vehicle (UAV), driverless vehicle, vehicle with a driver, Internet of Things (IoT) network device, wearable network device, portable gaming platform, non-portable gaming platform, non-mobile computer, non-mobile phone, analog phones, spread spectrum wireless device, Internet appliance, cable television set-top box, Internet television set-top box, satellite television box, and network devices embedded into home appliances or intelligent building control and monitoring systems, each with one or more processor, connected to the proxy network device with a wired or wireless connection.

4. The method of claim 1 network device includes a wireless interface for connecting to the proxy network device comprising: an IEEE 802.11a, 802.11ac, 802.11b, 802.11g, 802.11n, Wireless Fidelity (Wi-Fi), Wi-Fi Aware, Worldwide Interoperability for Microwave Access (WiMAX), ETSI High Performance Radio Metropolitan Area Network (HIPERMAN), Zigbee, Bluetooth, Infrared, Radio Frequency (RF), Industrial Scientific and Medical (ISM), Radio Frequency Identifier (RFID), Real-Time Text (RTT), spread spectrum, Near Field Communications (NFC) or Machine-to-Machine (M2M), wireless interface.

5. The method of claim 1 wherein the network device includes a wired interface for connecting to the proxy network device with a wired connection comprising: a Cable Television (CATV), High Density Television (HDTV), Digital Subscriber Line (DSL), Asymmetric DSL (ADSL), Variable-speed DSL (VDSL), coaxial or fiber optic, or twisted-pair cooper wire, wired connection.

6. The method of claim 1 wherein the secure connection location message includes a Hyper Text Transfer Protocol (HTTP) Enabled Location Delivery (HELD) or HELD Plus (HELD+) message.

7. The message of claim 1 wherein the emergency message includes a Session Initiation Protocol (SIP) with the geo-location header.

8. The method of claim 1 wherein the geo-location header includes a Presence Information Data Format Location Object (PIDF-LO).

9. The method of claim 8 wherein the PIDF-LO includes an Emergency Location-By-Reference (LbR) component including a database key for accessing a unique Uniform Resource Identifier (URI) stored in the database or a Location-by-Value (LbV) component including the unique URI for the network device.

10. The method of claim 9 wherein the URI includes the determined current physical location for the network device.

11. The method of claim 1 wherein the emergency message includes an E911 communication message, a legacy 911 communication message, a NG9-1-1 communication message, a Common Alerting Protocol (CAP) message, a Public Safety Answering Point (PSAP) to Automatic Location Identification (ALI) (PAM) interface protocol message or satellite frequency emergency message.

12. The method of claim 1 wherein the emergency event includes an emergency event automatically detected by, an accelerometer, radio frequency identifier (RFID) sensor, a barometric pressure sensor, other pressure sensor, a moisture sensor, an altimeter, a crash sensor, an activity sensor, a biometric sensor, a medical sensor, a temperature sensor, an immersion sensor, or one or more actuators, included on, or connected to, the network device.

13. The method of claim 1 wherein the (Z) geo-space coordinate from the 3D (X, Y, Z) geo-space coordinates includes desk, elevation, altitude, height, depth, speed, velocity, acceleration, de-acceleration, air temperature, moisture, or barometric pressure information.

14. The method of claim 1 the 3D (X, Y, Z) geo-space coordinates include coordinates for a building, floor in a building, floor location on a floor, zone, room, office, desk or cubicle.

15. The method of claim 1 wherein the determined current physical geographic location for the network device comprises: Global Positioning System (GPS) information, street address information, building location information, floor in a building information, desk on a floor in a building information, latitude, longitude, vertical distance, horizontal distance, elevation, altitude, height, depth, speed, velocity, acceleration, de-acceleration, air temperature, moisture, or barometric pressure information, detected for the network device.

16. The method of claim 1 wherein the one or more determined emergency response server network devices include a NG-9-1-1 emergency response server, E911 emergency response server or 911 emergency response server, a text-to-911 server, a Public Safety Answering Point (PSAP) server, an Emergency Services IP networks (ESInet) server, a military server, an aviation server, a marine server or an emergency gateway network server device, or a combination thereof, each with one or more processors.

17. The method of claim 1 further comprising:
sending the secure connection location message from the proxy network device connected to the network device, to the emergency location application on the emergency location information server network device via the communications network, the secure connection message including a request for location-by-reference emergency location information to be used when the emergency event occurs; and receiving securely the connection response message on the proxy network device from the emergency location server application on the emergency location information server network device via the communications network, the secure connection response message including the pre-determined emergency location indicator with the requested location-by-reference emergency location information the proxy network device will use if the network device sends the emergency message indicating that the emergency event has occurred.

18. The method of claim 1 further comprising:
sending the secure connection location message from the proxy network device connected to the network device to the emergency location application on the emergency location information server network device via the communications network,
the secure connection message including a request for location-by-value emergency location information to be used when the emergency event occurs; and
receiving securely the connection response message on the proxy network device from the emergency location server application on the emergency location information server network device via the communications network,
the secure connection response message including the pre-determined emergency location indicator with the requested location-by-value emergency location information the proxy network device will use if the network device sends the emergency message indicating that the emergency event has occurred.

19. The method of claim 1 further comprising a cloud emergency location server application on a cloud emergency location information server network device with a cloud database providing emergency location information as a cloud service with a cloud Software as a Service (SaaS) emergency location information service.

20. A non-transitory computer readable medium having stored therein a plurality of instructions for causing one or more processors on one or more network devices to execute the steps of:
receiving a secure connection location message on an emergency location server application on an emergency location information server network device with one or more processors from a proxy network device with one or more processor connected to a network device with one or more processors via a communications network,
the secure connection location message including unique identification information that uniquely identifies the network device and the proxy network device on the communications network;
determining on the emergency location server application from the connection location message a current physical geographic location, or a current set of two-dimensional (2D) (X,Y) geo-space coordinates or a current set three-dimensional 3D (X, Y, Z) geo-space coordinates for the network device and the unique identification information the network device;
storing in a database on the emergency location server application as current location information, the received unique identification information, the determined current physical geographic location, or the determined current set of 2D (X,Y) geo-space coordinates, or the determined current set of 3D (X,Y,Z) geo-space coordinates, for the network device;
sending securely a connection response message from the emergency location server application on the server network device to the proxy network device via the communications network,
the secure connection response message including a pre-determined emergency location indicator the proxy network device will use if the network device sends an emergency message indicating that an emergency event has occurred,
wherein the pre-determined emergency location indicator includes location-by-reference emergency location information or location-by-value emergency location information,
wherein the location-by-reference emergency location information includes a database key into the database to access the stored location information for the network device, and
wherein the location-by-value emergency location information includes a location component including additional location information for the network device, the determined current physical geographic location, or the determined current set of 2D (X,Y) geo-space coordinates, or the determined current set of 3D (X,Y,Z) geo-space coordinates, for the network device;
receiving securely an emergency message on the emergency location application on the emergency location information server network device from the proxy network device via the communications network,
the emergency message including the unique identification information and the pre-determined emergency location indicator sent to the proxy network device in a geo-location header included with the connection response message;
determining on the emergency location application on the emergency location information server network device from the emergency message whether the pre-determined emergency location indicator includes location-by-reference information, and if so,
determining from the database key included in a location-by-reference component in the emergency message the stored determined current physical geographic location, or the determined current set of 2D (X,Y) geo-space coordinates, or the determined current set of 3D (X,Y,Z) geo-space coordinates, for the network device and if not,
determining from the location component in a location-by-value component in the emergency message the determined current physical geographic location, or the determined current set of 2D (X,Y) geo-space coordinates, or the determined current set of 3D (X,Y,Z) geo-space coordinates, for the network device for the network device;
adding from emergency location application an emergency location information extension component to the received emergency location message,
the emergency location extension component including the determined current physical geographic location, or the determined current set of 2D (X,Y) geo-space coordinates, or the determined current set of 3D (X,Y,Z) geo-space coordinates, for the network device for the network device;
sending in real-time the received emergency message emergency with the location information extension component from the emergency location application on the emergency location information server network device to one or more determined emergency response server network devices with one or more processors via the communications network indicating that an emergency event has occurred with the network device; and
displaying in real-time on the one or more determined emergency response server network devices or another server network device with one or more processors on a graphical map the determined current physical geographic location for network device for one or more desired emergency response agencies.

21. An emergency location information system (E-LIS) for network devices connected to proxy network devices, comprising in combination:

one or more network devices each with one or more processors;

one or more proxy network devices, each with one or more processors;

one or more server network devices each with one or more processors;

one or more emergency response servers each with one or more processors;

the one or more processors including a plurality of instructions configuring the one or more processors:

for receiving a secure connection location message on an emergency location server application on an emergency location information server network device with one or more processors from a proxy network device with one or more processor connected to a network device with one or more processors via a communications network, the secure connection location message including unique identification information that uniquely identifies the network device and the proxy network device on the communications network;

for determining on the emergency location server application from the connection location message a current physical geographic location, or a current set of two-dimensional (2D) (X,Y) geo-space coordinates or a current set three-dimensional 3D (X, Y, Z) geo-space coordinates for the network device and the unique identification information the network device;

for storing in a database on the emergency location server application as current location information, the received unique identification information, the determined current physical geographic location, or the determined current set of 2D (X,Y) geo-space coordinates, or the determined current set of 3D (X,Y,Z) geo-space coordinates, for the network device;

for sending securely a connection response message from the emergency location server application on the server network device to the proxy network device via the communications network, the secure connection response message including a pre-determined emergency location indicator the proxy network device will use if the network device sends an emergency message indicating that an emergency event has occurred, wherein the pre-determined emergency location indicator includes location-by-reference emergency location information or location-by-value emergency location information, wherein the location-by-reference emergency location information includes a database key into the database to access the stored location information for the network device, and wherein the location-by-value emergency location information includes a location component including additional location information for the network device, the determined current physical geographic location, or the determined current set of 2D (X,Y) geo-space coordinates, or the determined current set of 3D (X,Y,Z) geo-space coordinates, for the network device;

for receiving securely an emergency message on the emergency location application on the emergency location information server network device from the proxy network device via the communications network, the emergency message including the unique identification information and the pre-determined emergency location indicator sent to the proxy network device in a geo-location header included with the connection response message;

for determining on the emergency location application on the emergency location information server network device from the emergency message whether the pre-determined emergency location indicator includes location-by-reference information, and if so, for determining from the database key included in a location-by-reference component in the emergency message the stored determined current physical geographic location, or the determined current set of 2D (X,Y) geo-space coordinates, or the determined current set of 3D (X,Y,Z) geo-space coordinates, for the network device and if not, for determining from the location component in a location-by-value component in the emergency message the determined current physical geographic location, or the determined current set of 2D (X,Y) geo-space coordinates, or the determined current set of 3D (X,Y, Z) geo-space coordinates, for the network device for the network device;

for adding from emergency location application an emergency location information extension component to the received emergency location message, the emergency location extension component including the determined current physical geographic location, or the determined current set of 2D (X,Y) geo-space coordinates, or the determined current set of 3D (X,Y, Z) geo-space coordinates, for the network device for the network device;

for sending in real-time the received emergency message emergency with the location information extension component from the emergency location application on the emergency location information server network device to one or more determined emergency response server network devices with one or more processors via the communications network indicating that an emergency event has occurred with the network device; and for displaying in real-time on the one or more determined emergency response server network devices or another server network device with one or more processors on a graphical map the determined current physical geographic location for network device for one or more desired emergency response agencies.

* * * * *